(12) United States Patent
Kurasawa et al.

(10) Patent No.: US 10,739,890 B2
(45) Date of Patent: Aug. 11, 2020

(54) DISPLAY DEVICE

(71) Applicant: Japan Display Inc., Minato-ku (JP)

(72) Inventors: Hayato Kurasawa, Minato-ku (JP);
Toshinori Uehara, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/171,561

(22) Filed: Oct. 26, 2018

(65) Prior Publication Data

US 2019/0146619 A1    May 16, 2019

(30) Foreign Application Priority Data

Nov. 15, 2017 (JP) ................................. 2017-220142

(51) Int. Cl.
*G06F 3/041* (2006.01)
*G02F 1/1343* (2006.01)
(Continued)

(52) U.S. Cl.
CPC ......... *G06F 3/0412* (2013.01); *G02B 6/0056* (2013.01); *G02B 6/0088* (2013.01); *G02F 1/13338* (2013.01); *G02F 1/133528* (2013.01); *G02F 1/134309* (2013.01); *G06F 3/044* (2013.01); *G06F 3/046* (2013.01); *G06F 3/0416* (2013.01); *G06F 3/0446* (2019.05);
(Continued)

(58) Field of Classification Search
CPC ...... G06F 3/0412; G06F 3/0416; G06F 3/044; G02B 6/0056; G02B 6/0088; G02F 1/13338; G02F 1/133528; G02F 1/134309

USPC ............ 345/87, 104, 173, 178; 455/550.01; 73/504.04
See application file for complete search history.

(56) References Cited

U.S. PATENT DOCUMENTS 5,854,881 A * 12/1998 Yoshida ................ G06F 3/0412
345/104
5,896,120 A * 4/1999 Iguchi .................... G06F 3/041
345/102
(Continued)

FOREIGN PATENT DOCUMENTS

JP         10-49301      2/1998
JP       2010-128648     6/2010
(Continued)

*Primary Examiner* — Prabodh M Dharia
(74) *Attorney, Agent, or Firm* — Oblon, McClelland, Maier & Neustadt, L.L.P.

(57) ABSTRACT

A display device includes: a first substrate; a display functional layer; a plurality of first electrodes; a light guide plate; a plurality of second electrodes; and a controller configured to control the first and second electrodes. The first substrate, the display functional layer, the first electrodes, the light guide plate, and the second electrodes are stacked in this order. The controller performs operations during a plurality of display periods to display an image, during a first sensing period, and during a second sensing period in a time-division manner. The first electrodes are supplied with a first drive signal and an electromotive force caused by electromagnetic induction is generated in the second electrodes during the first sensing period. The first electrodes are supplied with a second drive signal to generate electrostatic capacitance between the first electrodes and the second electrodes during the second sensing period.

4 Claims, 35 Drawing Sheets

(51) Int. Cl.
*G02F 1/1333* (2006.01)
*G06F 3/044* (2006.01)
*F21V 8/00* (2006.01)
*G02F 1/1335* (2006.01)
*G06F 3/046* (2006.01)

(52) U.S. Cl.
CPC .... G06F 3/04166 (2019.05); *G02F 2201/121* (2013.01); *G02F 2201/123* (2013.01); *G02F 2202/28* (2013.01); *G06F 2203/04106* (2013.01); *G06F 2203/04112* (2013.01)

(56) References Cited

U.S. PATENT DOCUMENTS

| | | | | |
|---|---|---|---|---|
| 6,020,867 | A * | 2/2000 | Shimada | G02F 1/133382 345/87 |
| 6,158,280 | A * | 12/2000 | Nonomura | G01C 19/5719 73/504.04 |
| 10,268,061 | B2 * | 4/2019 | Katsuta | G02F 1/1343 |
| 10,386,668 | B2 * | 8/2019 | Katsuta | G06F 3/046 |
| 10,430,012 | B2 * | 10/2019 | Mizuhashi | G02F 1/13338 |
| 2006/0009251 | A1 * | 1/2006 | Noda | H01Q 1/22 455/550.1 |
| 2008/0055270 | A1 * | 3/2008 | Cho | G06F 3/045 345/173 |
| 2012/0154326 | A1 * | 6/2012 | Liu | G06F 3/0412 345/174 |
| 2012/0212375 | A1 * | 8/2012 | Depree, IV | B82Y 10/00 343/700 MS |
| 2014/0036166 | A1 | 2/2014 | Kurasawa et al. | |
| 2014/0145996 | A1 * | 5/2014 | Sugita | G06F 3/044 345/173 |
| 2014/0204038 | A1 * | 7/2014 | Ohba | G06F 3/03545 345/173 |
| 2014/0253501 | A1 * | 9/2014 | Noguchi | G02F 1/13338 345/174 |
| 2016/0041677 | A1 * | 2/2016 | Tahara | G06F 3/0416 345/174 |
| 2016/0299279 | A1 | 10/2016 | Uehara et al. | |
| 2017/0090674 | A1 * | 3/2017 | Meng | G02F 1/13338 |
| 2018/0129324 | A1 * | 5/2018 | Soh | G06F 3/0418 |
| 2018/0328799 | A1 * | 11/2018 | Park | G06F 3/0416 |
| 2019/0196639 | A1 * | 6/2019 | Mugiraneza | G06F 3/044 |

FOREIGN PATENT DOCUMENTS

| | | |
|---|---|---|
| JP | 2014-32437 | 2/2014 |
| JP | 2016-200727 | 12/2016 |

* cited by examiner

DISPLAY DEVICE

CROSS-REFERENCE TO RELATED APPLICATIONS

This application claims priority from Japanese Application No. 2017-220142, filed on Nov. 15, 2017, the contents of which are incorporated by reference herein in its entirety.

BACKGROUND

1. Technical Field

The present disclosure relates to a display device.

2. Description of the Related Art

In recent years, touch detection devices commonly called touchscreen panels that are capable of detecting an external proximate object have been attracted to attention. Such a touchscreen panel is mounted on or integrated with a display device, such as a liquid crystal display device, which is used as a display device with a touch detection function. It is known that there are touchscreen panels using a capacitance method or an electromagnetic induction method as a detection method for such a display device. In the electromagnetic induction method, coils for generating magnetic fields and coils for detecting the magnetic fields are provided in the display device. An external object to be detected, such as a pen, is provided with a coil and a capacitive element forming a resonant circuit. The pen is detected through electromagnetic induction between the coils in the display device and the coil in the pen. Japanese Patent Application Laid-open Publication No. 10-49301 describes a technology for a coordinate input device using the electromagnetic induction method. Japanese Patent Application Laid-open Publication No. 2016-200727 (JP-A-2016-200727) describes a display device in which a light guide plate is provided with a plurality of detection electrodes.

The capacitance method greatly differs from the electromagnetic induction method in the configuration of a detection target and the detection electrodes. Therefore, if the electrodes and a driving configuration designed for the capacitive touch detection are employed without modification in the electromagnetic induction method, the electromagnetic induction touch detection may be difficult to be satisfactorily performed. JP-A-2016-200727 does not describe the electromagnetic induction touch detection.

SUMMARY

According to an aspect, a display device includes: a first substrate; a display functional layer; a plurality of first electrodes; a light guide plate; a plurality of second electrodes; and a controller configured to control the first electrodes and the second electrodes. The first substrate, the display functional layer, the first electrodes, the light guide plate, and the second electrodes are stacked in this order. The controller performs operations during a plurality of display periods to display an image, during a first sensing period, and during a second sensing period in a time-division manner. The first electrodes are supplied with a first drive signal and an electromotive force caused by electromagnetic induction is generated in the second electrodes during the first sensing period. The first electrodes are supplied with a second drive signal to generate electrostatic capacitance between the first electrodes and the second electrodes during the second sensing period.

DETAILED DESCRIPTION

Figure 1:
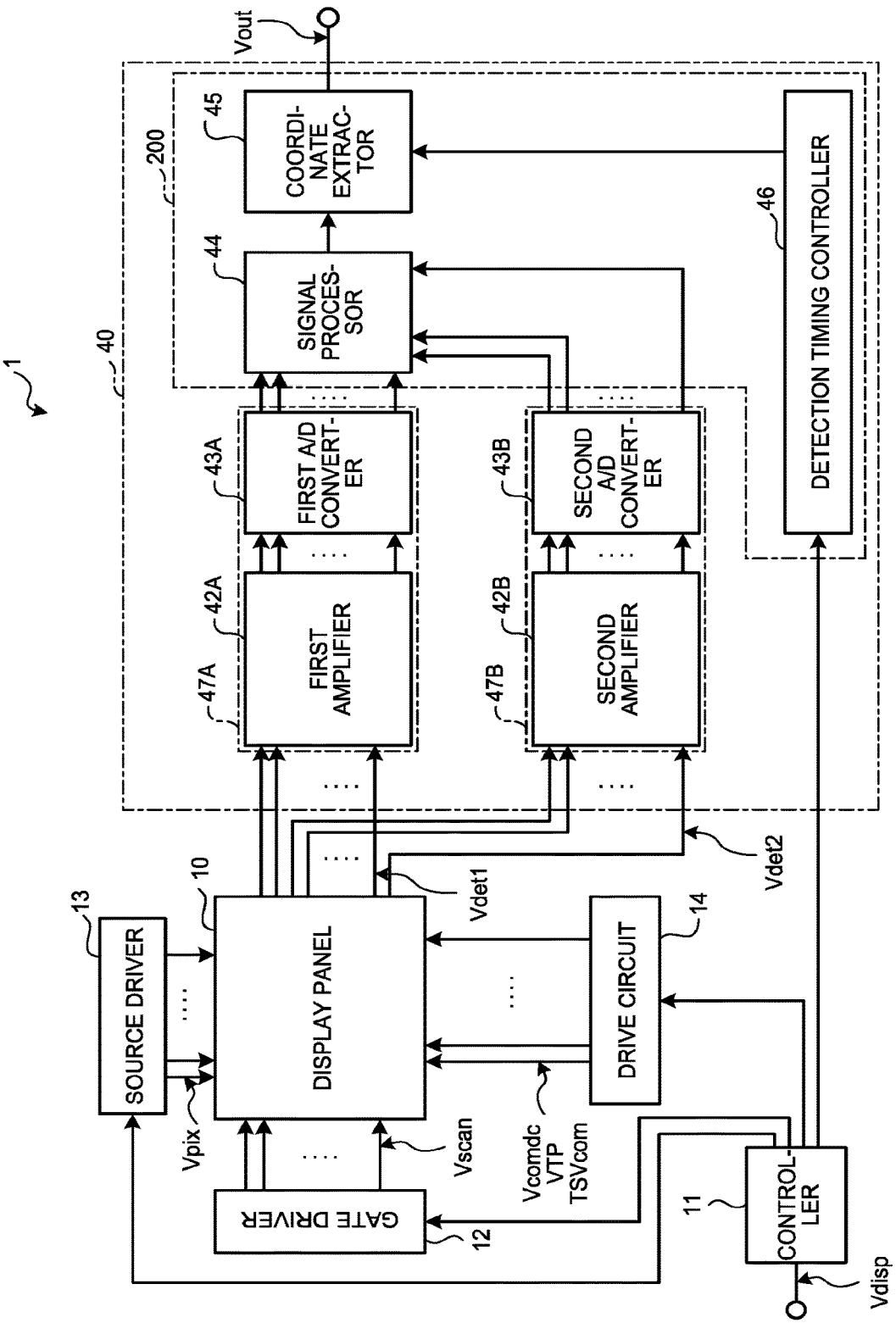
FIG. 1 is a block diagram illustrating a configuration example of a display device according to a first embodiment of the present disclosure.

The following describes embodiments for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. The disclosure is merely an example, and the present disclosure naturally encompasses appropriate modifications easily conceivable by those skilled in the art while maintaining the gist of the present disclosure. To further clarify the description, widths, thicknesses, shapes, and other properties of various parts are schematically illustrated as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating a configuration example of a display device according to a first embodiment of the present disclosure. A display device 1 of this embodiment incorporates a detection function to detect contact or proximity of a detection target body with or to a display surface. As illustrated in FIG. 1, the display device 1 includes a display panel 10, a controller 11, a gate driver 12, a source driver 13, a drive circuit 14, and a detector 40.

The display panel 10 includes a plurality of pixels including display elements. The display panel 10 has a display surface facing the pixels. The display panel 10 receives a video signal Vdisp and displays an image formed by the pixels on the display surface.

The controller 11 is a circuit that controls mainly display operations by supplying control signals to the gate driver 12, the source driver 13, and the drive circuit 14 based on an externally supplied video signal Vdisp.

The gate driver 12 has a function to sequentially select one horizontal line as a target of display driving of the display panel 10 based on a control signal supplied from the controller 11.

The source driver 13 is a circuit that supplies a pixel signal Vpix to each sub-pixel SPix of the display panel 10 based on the control signal supplied from the controller 11. The present disclosure is, however, not limited to this configuration. The controller 11 may generate the pixel signal Vpix and supply the pixel signal Vpix to the source driver 13.

The drive circuit 14 supplies a display drive signal Vcomdc, and a first drive signal VTP and a second drive signal TSVcom for detection, to the first electrodes COML (refer to FIG. 5) based on the control signal supplied from the controller 11.

The controller 11 controls a detection operation to detect a detection target body such as a finger or a touch pen of a user (hereinafter, simply called the detection target body) on or above the display panel 10. The display panel 10 has a function to detect a position of a finger in contact with or in proximity to the display surface of the display panel 10 based on the basic principle of touch detection using a mutual-capacitive touch detection method. The display panel 10 has a function to detect a force applied by the finger to the display surface of the display panel 10 based on the basic principle of the touch detection using the mutual-capacitive touch detection method. The display panel 10 also has a function to detect a position of a touch pen in contact with or in proximity to the display surface based on the basic principle of touch detection using an electromagnetic induction method.

When the contact or the proximity of the touch pen is detected using the electromagnetic induction method, the display panel 10 outputs a first detection signal Vdet1 to the detector 40. When the contact or the proximity of the finger and the force applied by the finger are detected using the mutual-capacitance method, the display panel 10 outputs a second detection signal Vdet2 to the detector 40.

During the electromagnetic induction touch detection, the detector 40 detects whether the display surface of the display panel 10 is touched by the touch pen based on a control signal supplied from the controller 11 and the first detection signal Vdet1 output from the display panel 10. During the mutual-capacitive touch detection, the detector 40 detects whether the display surface is touched by the finger based on the control signal supplied from the controller 11 and the second detection signal Vdet2 output from the display panel 10. If the display surface is touched, the detector 40 obtains, for example, coordinates where the touch input is performed.

As illustrated in FIG. 1, the detector 40 includes a first analog front-end circuit 47A (hereinafter, referred to as the first AFE 47A), a second analog front-end circuit 47B (hereinafter, referred to as the second AFE 47B), a signal processor 44, a coordinate extractor 45, and a detection timing controller 46.

The first AFE 47A includes a first amplifier 42A and a first analog-to-digital (A/D) converter 43A. The second AFE 47B includes a second amplifier 42B and a second A/D converter 43B. The first amplifier 42A amplifies the first detection signal Vdet1 supplied from the display panel 10. The second amplifier 42B amplifies the second detection signal Vdet2 supplied from the display panel 10. The first A/D converter 43A samples analog signals output from the first amplifier 42A and converts them into digital signals at times synchronized with the first drive signal VTP. The second A/D converter 43B samples analog signals output from the second amplifier 42B and converts them into digital signals at times synchronized with the second drive signal TSVcom. The first AFE 47A is an analog signal processing circuit that converts the first detection signals Vdet1 into the digital signals and outputs them to the signal processor 44. The second AFE 47B is an analog signal processing circuit that converts the second detection signals Vdet2 into the digital signal and outputs them to the signal processor 44.

The signal processor 44 is a logic circuit that detects whether the display panel 10 is touched, based on the output signals from the first AFE 47A and the second AFE 47B. The signal processor 44 performs processing of extracting a signal of difference (absolute value |ΔV|) in the detection signals caused by the detection target body. The signal processor 44 compares the absolute value |ΔV| with a predetermined threshold voltage. If the absolute value |ΔV| is lower than the threshold voltage, the signal processor 44 determines that the detection target body is in a non-contact state. If, instead, the absolute value |ΔV| is equal to or higher than the threshold voltage, the signal processor 44 determines that the detection target body is in a contact state or a proximate state. In this manner, the detector 40 can perform the touch detection.

In this specification, the term "contact state" includes a state where the detection target body is in contact with the display surface and a state where the detection target body is so proximate to the display surface as to be treatable as in contact therewith, and the term "non-contact state" includes a state where the detection target body is not in contact with the display surface and a state where the detection target body is not so proximate to the display surface as to be treatable as in contact therewith.

The coordinate extractor 45 is a logic circuit that obtains touchscreen panel coordinates of the touch when the touch is detected by the signal processor 44. The coordinate extractor 45 outputs the touchscreen panel coordinates as an output signal Vout. The coordinate extractor 45 may output the output signal Vout to the controller 11. The controller 11 can perform a predetermined operation of display or detection based on the output signal Vout.

The detection timing controller 46 controls, based on the control signal supplied from the controller 11, the first and second AFEs 47A and 47B, the signal processor 44, and the coordinate extractor 45 so as to operate them in synchronization with one another.

The first and second AFEs 47A and 47B, the signal processor 44, the coordinate extractor 45, and the detection timing controller 46 of the detector 40 are mounted on the display device 1. The present disclosure is, however, not limited to this configuration. All or some of the functions of the detector 40 may be incorporated in an external processor or the like. For example, the signal processor 44 and the coordinate extractor 45 may be incorporated in an external controller 200 separate from the display device 1.

Figure 2:
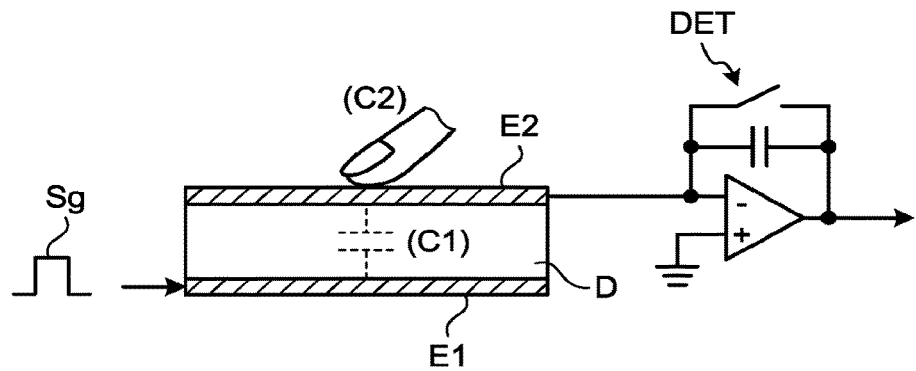
FIG. 2 is an explanatory diagram for explaining the basic principle of mutual-capacitive touch detection.

The display panel 10 performs touch control based on the basic principle of the capacitive touch detection and touch control based on the basic principle of the electromagnetic induction touch detection. The following describes the basic principle of the touch detection using the mutual-capacitive touch detection method performed by the display panel 10 of this embodiment, with reference to FIG. 2. FIG. 2 is an explanatory diagram for explaining the basic principle of the mutual-capacitive touch detection. FIG. 2 illustrates also a detection circuit. Although the following describes a case where the finger serving as the detection target body is in contact with or in proximity to the display surface, the detection target body is not limited to the finger, but may be an object including a conductor, such as a stylus pen.

For example, as illustrated in FIG. 2, a capacitive element C1 includes a pair of electrodes, that is, a drive electrode E1 and a detection electrode E2 that are disposed opposite to each other with a dielectric material D interposed therebetween. The capacitive element C1 generates lines of electric force between opposite surfaces of the drive electrode E1 and the detection electrode E2, and in addition, generates fringe components of the lines of electric force extending from ends of the drive electrode E1 toward the upper surface of the detection electrode E2. One end of the capacitive element C1 is coupled to an alternating-current signal source, and the other end thereof is coupled to a voltage detector DET. The voltage detector DET is included, for example, in the detector 40 illustrated in FIG. 1.

An alternating-current rectangular wave Sg having a predetermined frequency (ranging, for example, roughly from several kilohertz to several hundred kilohertz) is applied from the alternating-current signal source to the drive electrode E1 (one end of the capacitive element C1). A current corresponding to the capacitance value of the capacitive element C1 flows in the voltage detector DET. The voltage detector DET converts variation in current corresponding to the alternating-current rectangular wave Sg into variation in voltage.

In the contact state, electrostatic capacitance C2 generated by the finger is in contact with the detection electrode E2 or is so proximate thereto as to be treatable as in contact therewith, as illustrated in FIG. 2. This condition causes the conductor (finger) to interrupt the fringe components of the lines of electric force present between the drive electrode E1 and the detection electrode E2. This interruption causes the capacitive element C1 to act as a capacitive element having a smaller capacitance value than that in the non-contact state.

The amplitude of the voltage signal output from the voltage detector DET is smaller in the contact state than that in the non-contact state. The absolute value |ΔV| of the difference in the voltage signal varies depending on whether the detection target body is present. The detector 40 compares the absolute value |ΔV| with the predetermined threshold voltage to determine whether the detection target body is in the non-contact state, or in either the contact state or the proximate state.

Figure 3:
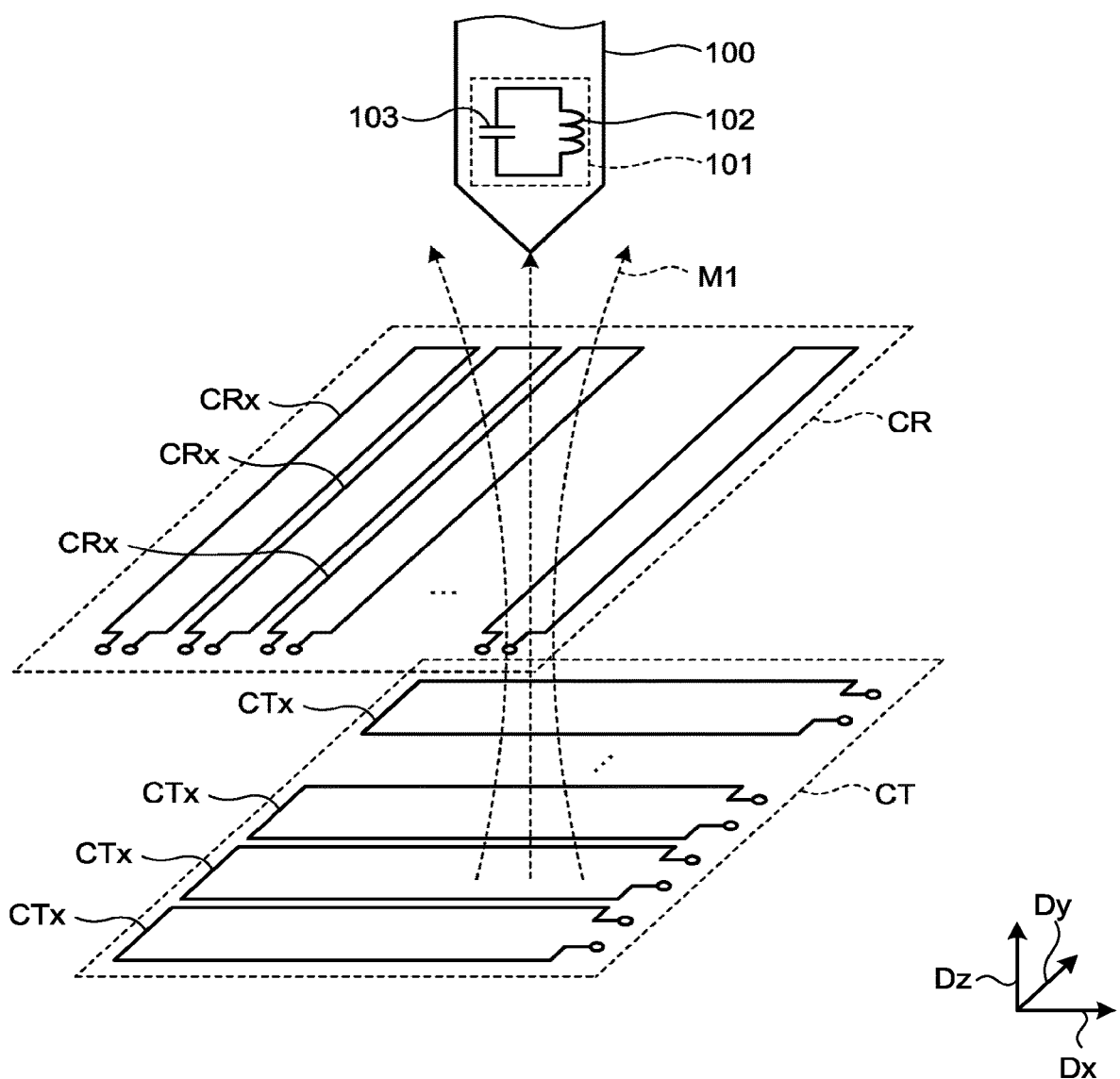
FIG. 3 is an explanatory diagram of a magnetic field generation period for explaining the basic principle of electromagnetic induction touch detection.
Figure 4:
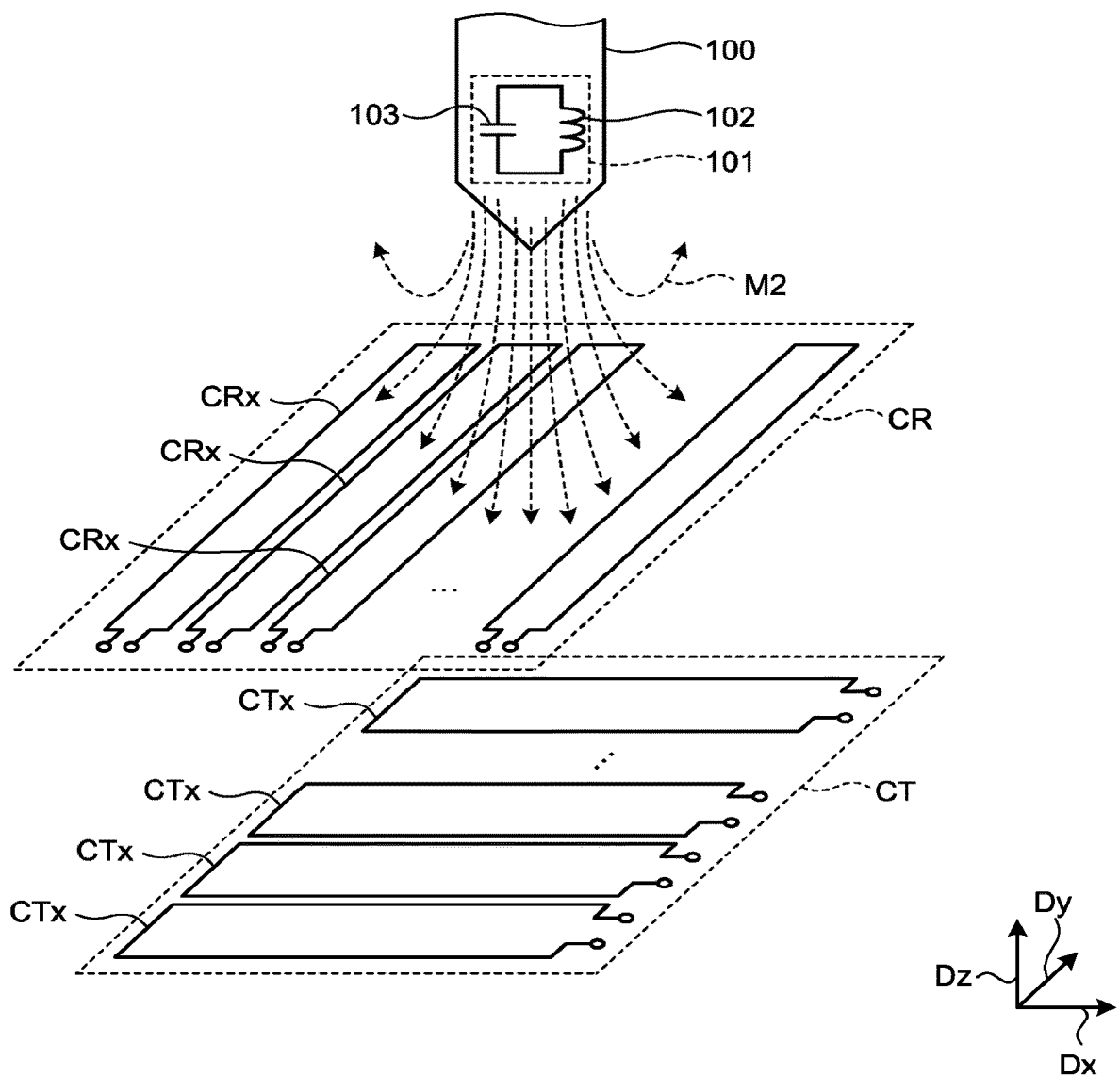
FIG. 4 is an explanatory diagram of a magnetic field detection period for explaining the basic principle of the electromagnetic induction touch detection.

The following describes the basic principle of the touch detection using the electromagnetic induction method performed by the display panel 10 of this embodiment, with reference to FIGS. 3 and 4. FIG. 3 is an explanatory diagram of a magnetic field generation period for explaining the basic principle of the electromagnetic induction touch detection. FIG. 4 is an explanatory diagram of a magnetic field detection period for explaining the basic principle of the electromagnetic induction touch detection.

As illustrated in FIGS. 3 and 4, in the electromagnetic induction touch detection, the contact or the proximity of a touch pen 100 is detected. A resonant circuit 101 is provided in the touch pen 100. The resonant circuit 101 is configured by coupling a coil 102 to a capacitive element 103 in parallel.

In the electromagnetic induction method, transmitting coils CT and receiving coils CR are provided so as to overlap with each other. A longitudinal direction of each transmitting coil CTx corresponds to a first direction Dx. A longitudinal direction of each receiving coil CRx corresponds to a second direction Dy. The receiving coils CRx are provided so as to intersect with the transmitting coils CTx in a plan view. The transmitting coil CTx is coupled to the alternating-current signal source (drive signal source). The receiving coil CRx is coupled to the voltage detector DET (refer to FIG. 2).

As illustrated in FIG. 3, during the magnetic field generation period, an alternating-current rectangular wave having a predetermined frequency (ranging, for example, roughly from several kilohertz to several hundred kilohertz) is applied from an alternating-current signal source to the transmitting coil CTx. As a result, a current flows in the transmitting coil CTx, and the transmitting coil CTx generate a magnetic field M1 corresponding to the change in current. When the touch pen 100 is in contact with or in proximity to the display surface, an electromotive force is generated in the coil 102 by mutual induction between the transmitting coils CTx and the coil 102, whereby the capacitive element 103 is charged.

Then, during the magnetic field detection period illustrated in FIG. 4, the coil 102 of the touch pen 100 generates a magnetic field M2 that varies with the resonant frequency of the resonant circuit 101. The magnetic field M2 passes through the receiving coils CRx, and as a result, an electromotive force is generated in the receiving coils CRx by mutual induction between the receiving coils CRx and the coil 102. A current corresponding to the electromotive force of the receiving coils CRx flows in the voltage detector DET. The touch pen 100 is detected by scanning the transmitting coils CTx and the receiving coils CRx.

Figure 5:
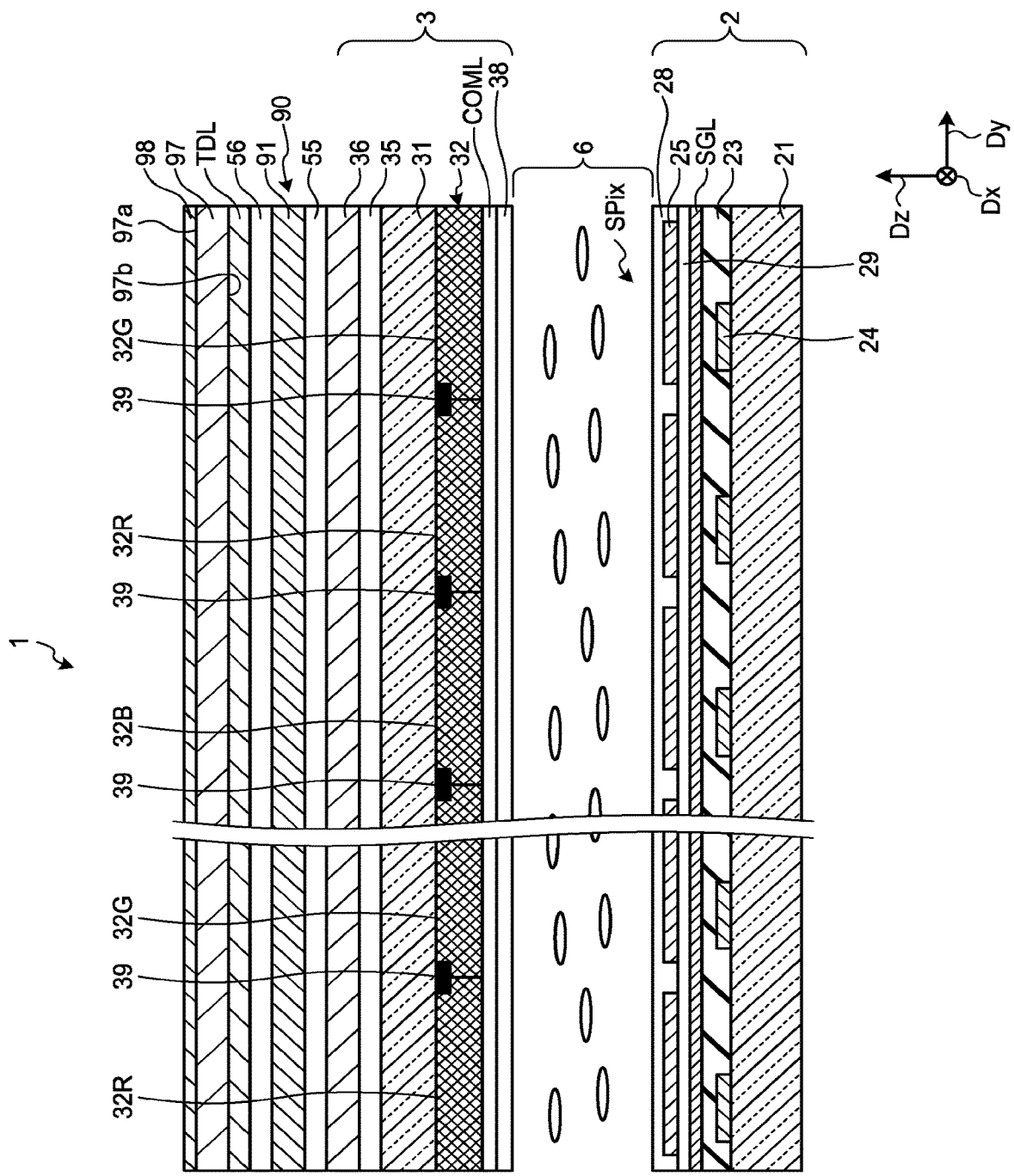
FIG. 5 is a schematic diagram illustrating a sectional structure of the display device according to the first embodiment.
Figure 6:
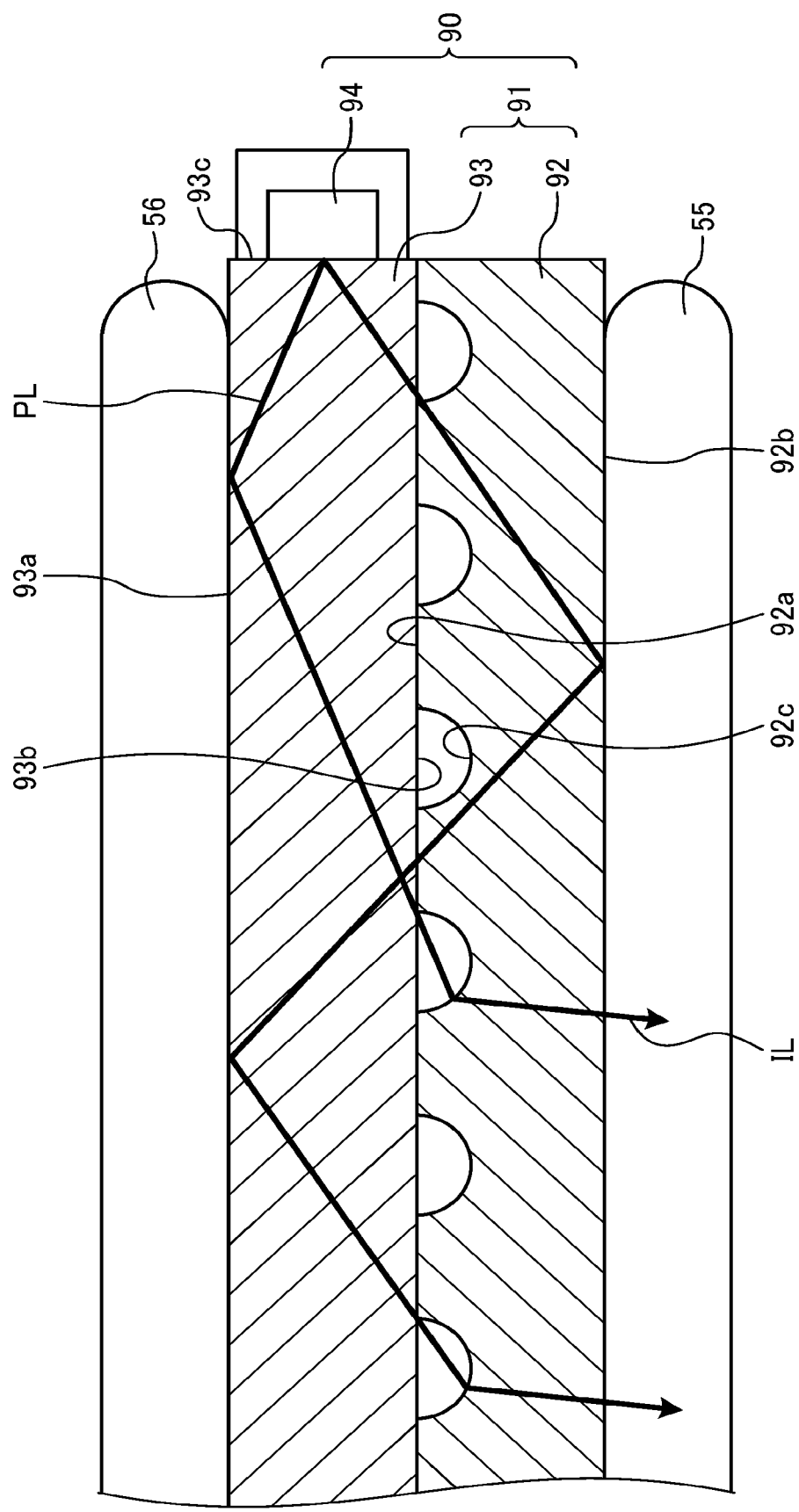
FIG. 6 is a schematic diagram illustrating a sectional structure of a frontlight according to the first embodiment.

The following describes a configuration example of the display device 1 of this embodiment. FIG. 5 is a schematic diagram illustrating a sectional structure of the display device according to the first embodiment. FIG. 6 is a schematic diagram illustrating a sectional structure of a frontlight according to the first embodiment. As illustrated in FIG. 5, the display device 1 includes a pixel substrate 2, a counter substrate 3, a liquid crystal layer 6 serving as a display functional layer, a frontlight 90, and a sensor substrate 97. The counter substrate 3 is disposed so as to be opposed in the orthogonal direction to a surface of the pixel substrate 2. The liquid crystal layer 6 is provided between the pixel substrate 2 and the counter substrate 3.

The pixel substrate 2 includes a first substrate 21, third electrodes 24, pixel electrodes 25, signal lines SGL, an insulating layer 23, a planarizing film 29, and an orientation film 28. The third electrodes 24, the signal lines SGL, and the pixel electrodes 25 are provided in this order to the first substrate 21. For example, a glass substrate is used as the first substrate 21. The first substrate 21 is provided with circuit elements and various types of wiring, such as gate lines GCL, which are not illustrated, in addition to the signal lines SGL. The circuit elements include switching elements, such as thin-film transistors (TFTs), and capacitive elements.

The pixel electrodes 25 are provided on the planarizing film 29. The orientation film 28 is provided between the pixel electrodes 25 and the liquid crystal layer 6. The pixel electrodes 25 are made of, for example, a metal, such as aluminum (Al) or silver (Ag). The pixel electrodes 25 may also have a configuration stacked with such a metal material and a light-transmitting conductive material, such as indium tin oxide (ITO). The pixel electrodes 25 are made using a material having good reflectance, and are provided as reflective electrodes that diffusively reflect light incident from outside.

The third electrodes 24 are provided between the first substrate 21 and the pixel electrodes 25 in the direction orthogonal to the surface of the first substrate 21. The third electrodes 24 are provided so as to overlap the pixel electrodes 25 with the insulating layer 23 and the planarizing film 29 interposed therebetween. This configuration generates retention capacitance 53 (refer to FIG. 7) between the third electrodes 24 and the pixel electrodes 25.

The counter substrate 3 includes a second substrate 31, a color filter 32 provided on one surface of the second substrate 31, the first electrodes COML, an orientation film 38, an adhesive layer 35 provided on the other surface of the second substrate 31, and a polarizing plate 36. In this embodiment, the second substrate 31 is, for example, a glass substrate or a resin substrate. Second electrodes TDL serve as the detection electrodes or the receiving coils CRx of the display panel 10.

The color filter 32 is opposed to the liquid crystal layer 6 in the direction orthogonal to the first substrate 21. The color filter 32 may be disposed on the first substrate 21. The color filter 32 includes, for example, three filters having a color region 32R (red), a color region 32G (green), and a color region 32B (blue). The color filter 32 may include a white (W) filter, or may include filters having five or more different colors. A light-shielding layer 39 is provided at boundary portions between the color regions 32R, 32G, and 32B. The light-shielding layer 39 is a colored resin layer or metal layer commonly called a black matrix.

The first electrodes COML are provided on a side of the second substrate 31 opposite to a side thereof facing the polarizing plate 36, and are provided between the color filter 32 and the liquid crystal layer 6 in the direction orthogonal to the first substrate 21. The first electrodes COML are made of a light-transmitting conductive material, such as ITO.

The liquid crystal layer 6 includes, for example, nematic liquid crystals. Changing the level of a voltage between the first electrodes COML and the pixel electrodes 25 causes the liquid crystal layer 6 to modulate light passing through the liquid crystal layer 6 on a per sub-pixel SPix basis.

The frontlight 90 is provided on a surface of the counter substrate 3. The frontlight 90 is provided on the upper side of the polarizing plate 36 with an adhesive layer 55 interposed therebetween. The frontlight 90 is an illuminator that emits light toward the counter substrate 3 and the pixel substrate 2. Specifically, as illustrated in FIG. 6, the frontlight 90 includes a light guide plate 91 and a light source 94.

The light guide plate 91 includes a first light guide plate 92 and a second light guide plate 93. The first light guide plate 92 is a plate-like member having a first surface 92a and a second surface 92b on a side thereof opposite to the first surface 92a. The second light guide plate 93 is a plate-like member having a first surface 93a and a second surface 93b on a side thereof opposite to the first surface 93a. The first light guide plate 92 and the second light guide plate 93 are made of a light-transmitting resin, such as an acrylic resin. The first light guide plate 92 and the second light guide plate 93 have the same refractive index and the same coefficient of linear expansion.

The first light guide plate 92 and the second light guide plate 93 are provided so as to overlap with each other, with the first surface 92a of the first light guide plate 92 being in contact with the second surface 93b of the second light guide plate 93. The second surface 92b of the first light guide plate 92 is provided with the polarizing plate 36 (refer to FIG. 5) with the adhesive layer 55 interposed therebetween. The first surface 93a of the second light guide plate 93 is provided with the sensor substrate 97 and the second electrodes TDL (refer to FIG. 5) with an adhesive layer 56 interposed therebetween. In the light guide plate 91 of this embodiment in which the first light guide plate 92 is combined with the second light guide plate 93, the second surface 92b serves as a first principal surface opposed to the first substrate 21 and the second substrate 31 (refer to FIG. 5), and the first surface 93a serves as a second principal surface on the side opposite to the first principal surface. A plurality of recesses 92c are formed on the first surface 92a of the first light guide plate 92. The recesses 92c are hemispherical or partially spherical. Spaces between the recesses 92c and the second surface 93b form an air layer.

The light source 94 is provided on a side surface 93c of the second light guide plate 93. The light source 94 is, for example, a light-emitting diode (LED). Light PL from the light source 94 travels in the first light guide plate 92 and the second light guide plate 93 while being repeatedly reflected on an interface between the first light guide plate 92 and the adhesive layer 55 and on an interface between the second light guide plate 93 and the adhesive layer 56. Light IL of the light PL refracted on the recesses 92c is transmitted from the second surface 92b of the first light guide plate 92 toward the counter substrate 3.

The air layer surrounded by the recesses 92c and the second surface 93b is formed between the first light guide plate 92 and the second light guide plate 93, that is, in the light guide plate 91. This configuration restrains the recesses 92c from coming in contact with another member when a force is applied from outside, for example, in the case of the touch input. As a result, the recesses 92c are restrained from being damaged, and thus, the frontlight 90 can be improved in durability.

As illustrated in FIG. 5, the sensor substrate 97 is provided on a surface of the frontlight 90. A first surface 97a of the sensor substrate 97 is the display surface on which an image is displayed, and is a detection surface to which the detection target body comes in contact or proximity. The first surface 97a of the sensor substrate 97 is provided with a protective layer 98. A second surface 97b of the sensor substrate 97 is provided with the second electrodes TDL. The second electrodes TDL are bonded to the light guide plate 91 of the frontlight 90 with the adhesive layer 56 interposed therebetween. In other words, the second electrodes TDL are provided between the sensor substrate 97 and the light guide plate 91. The sensor substrate 97 may be a film-like base material made of, for example, a light-transmitting resin material. The sensor substrate 97 may also be a thin glass substrate. With the configuration described above, the first substrate 21, the pixel electrodes 25, the liquid crystal layer 6 serving as the display functional layer, the first electrodes COML, the light guide plate 91, and the second electrodes TDL are stacked in this order.

In this embodiment, the touch detection includes a case of detecting the detection target body directly in contact with a surface of the protective layer 98. The touch detection also includes a case of detecting the detection target body in contact with the first surface 97a if the protective layer 98 is not provided. With the configuration described above, the light IL from the frontlight 90 (refer to FIG. 6) passes through the counter substrate 3 and the liquid crystal layer 6 and reaches the pixel electrodes 25 of the pixel substrate 2. The light reflected by pixel electrodes 25 passes through the liquid crystal layer 6 to be modulated on a per sub-pixel SPix basis and goes out from the first surface 97a. The display device 1 of this embodiment is a reflective liquid crystal display device that displays the image using this reflected light. In addition to the light IL from the frontlight 90, the light incident from outside may be reflected by the pixel electrodes 25 and used as the reflected light.

In this specification, the first direction Dx refers to a direction parallel to the first surface 97a, and the second direction Dy refers to a direction intersecting with the first direction Dx in a plane parallel to the first surface 97a. A third direction Dz refers to a direction orthogonal to the first surface 97a. In this specification, in a direction orthogonal to the first substrate 21, the term "upper side" refers to a direction from the first substrate 21 toward the second substrate 31, and the term "lower side" refers to a direction from the second substrate 31 toward the first substrate 21. The term "plan view" refers to a case of viewing from a direction orthogonal to a surface of the first substrate 21.

Figure 7:
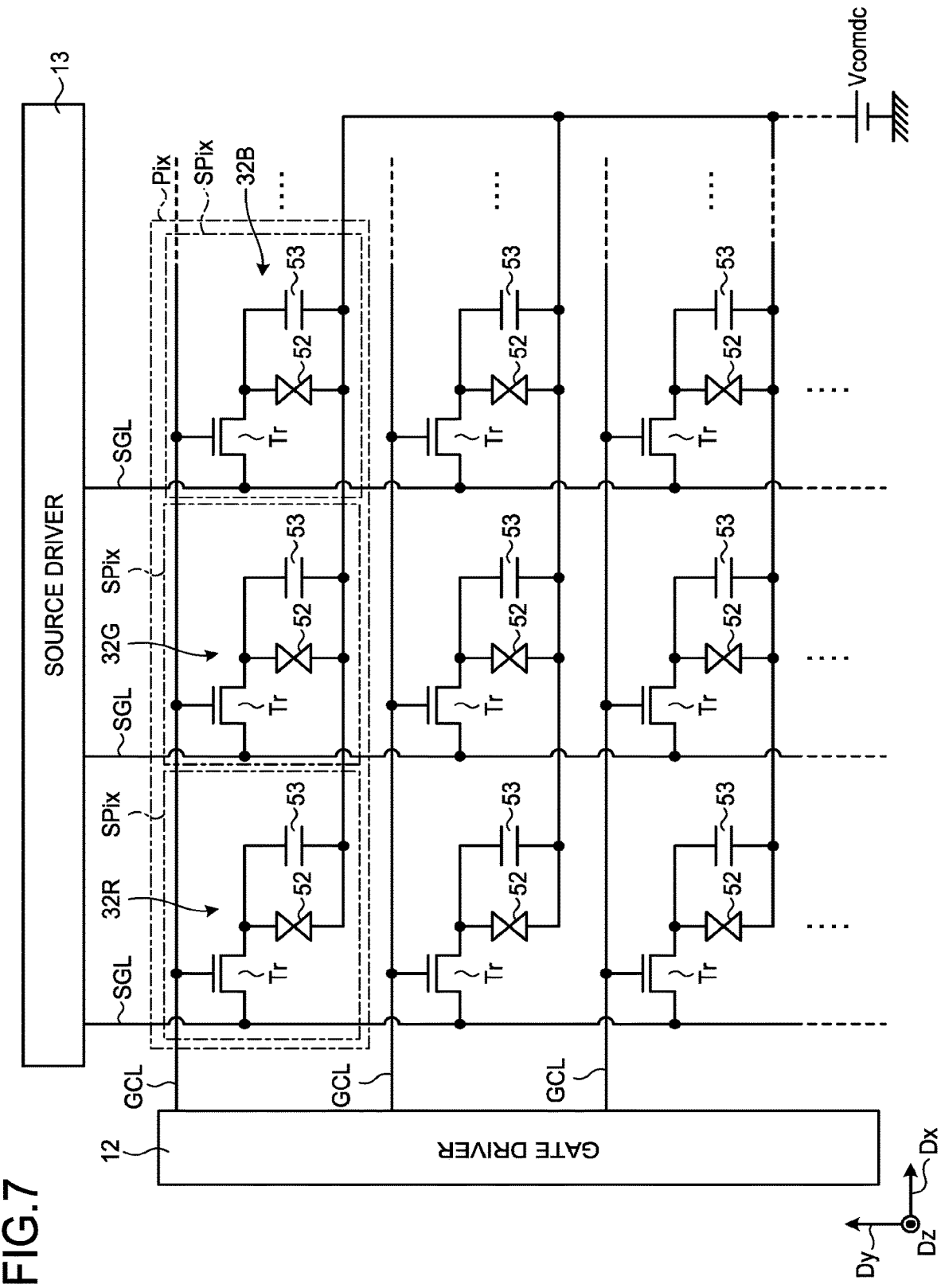
FIG. 7 is a circuit diagram illustrating a pixel array of the display device according to the first embodiment.

The following describes the display operation of the display device 1. FIG. 7 is a circuit diagram illustrating a pixel array of the display device according to the first embodiment. The first substrate 21 illustrated in FIG. 5 is provided with, for example, switching elements Tr of the respective sub-pixels SPix, the signal lines SGL, and the gate lines GCL. The signal lines SGL are wiring that supplies the pixel signals to the pixel electrodes 25. The gate lines GCL are wiring that supplies the drive signals for driving the switching elements Tr.

As illustrated in FIG. 7, the display device 1 includes the sub-pixels SPix arranged in a matrix (row-column configuration). Each of the sub-pixels SPix includes the switching element Tr, a liquid crystal element 52, and the retention capacitance 53. Each of the switching elements Tr is fabricated from a thin-film transistor (TFT), and in this example, fabricated from an n-channel metal oxide semiconductor (MOS) TFT. The liquid crystal elements 52 include liquid crystal capacitance generated between the pixel electrodes 25 and the first electrodes COML. Capacitance generated between the pixel electrodes 25 and the third electrodes 24 can be used as the retention capacitance 53. The sub-pixel SPix is not limited to this configuration, and may be provided with a capacitive element as the retention capacitance 53.

The gate lines GCL are coupled to the gate driver 12. The gate driver 12 sequentially selects the gate lines GCL. The gate driver 12 applies a scan signal Vscan (refer to FIG. 1) to the gate of each of the switching elements Tr through the selected one of the gate lines GCL. This operation sequentially selects one row (one horizontal line) of the sub-pixels SPix as a target of display driving. The signal lines SGL are coupled to the source driver 13. The source driver 13 supplies the pixel signal Vpix to each of the sub-pixels SPix included in the selected one horizontal line through the signal lines SGL. These sub-pixels SPix perform display of each horizontal line according to the supplied pixel signals.

When this display operation is performed, the drive circuit 14 (refer to FIG. 1) applies the display drive signal Vcomdc to the first electrodes COML and the third electrodes 24. As a result, the first electrodes COML and the third electrodes 24 serve as common electrodes for the pixel electrodes 25 during the display operation. In this embodiment, the first electrodes COML and the third electrodes 24 are provided along the gate lines GCL, and intersect with the signal lines SGL. The first electrodes COML and the third electrodes 24 are not limited to this configuration and may be provided so as to intersect with the gate lines GCL.

The color regions 32R, 32G, and 32B of the three colors R, G, and B correspond to the sub-pixels SPix illustrated in FIG. 7 described above. The combination of the color regions 32R, 32G, and 32B is regarded as a set. The sub-pixels SPix corresponding to the color regions 32R, 32G, and 32B of the three colors R, G, and B as a set constitute a pixel Pix.

Figure 8:
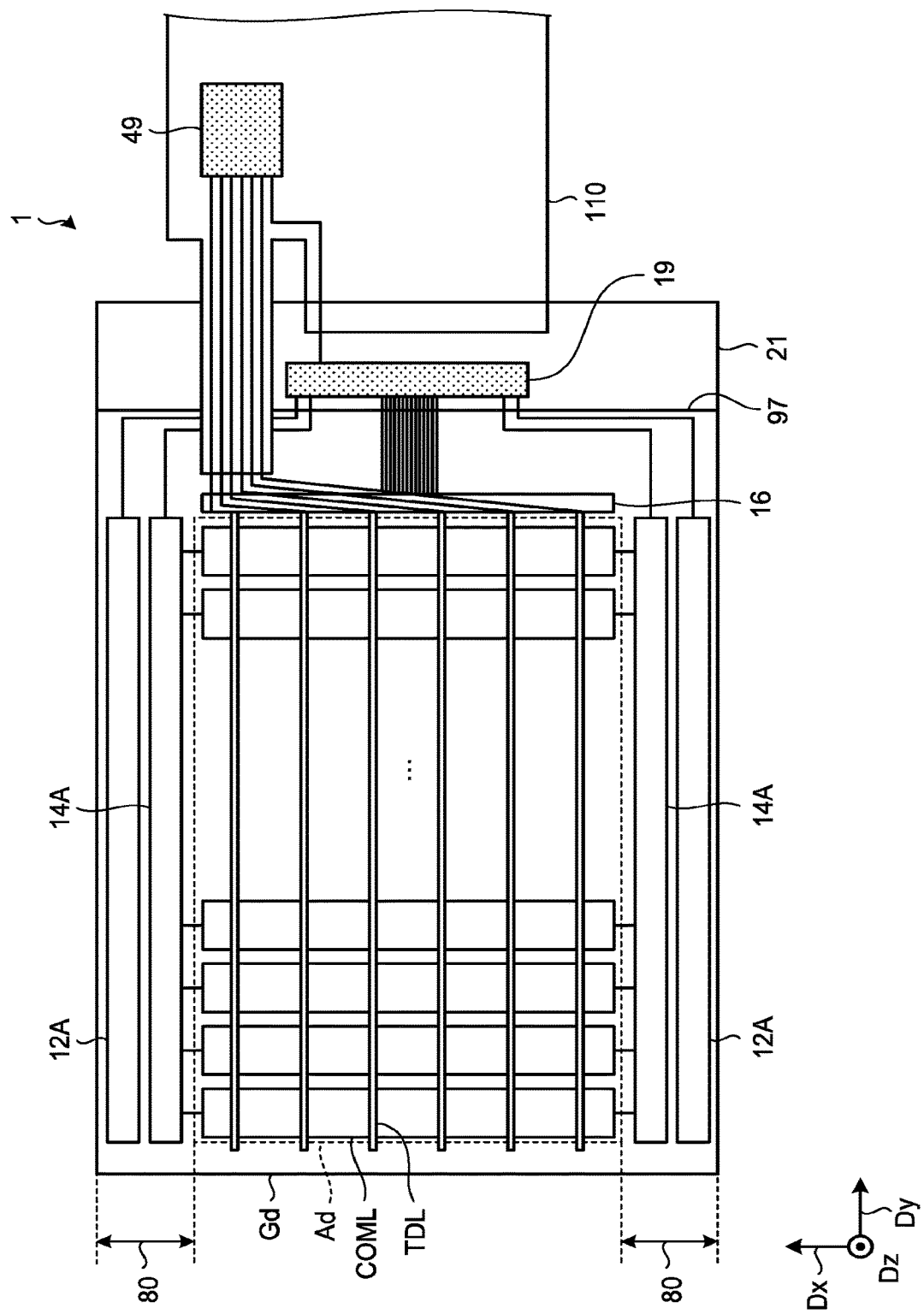
FIG. 8 is a plan view schematically illustrating the display device according to the first embodiment.

The following describes the configuration of the first electrodes COML and the second electrodes TDL, and the touch detection operation. FIG. 8 is a plan view schematically illustrating the display device according to the first embodiment. As illustrated in FIG. 8, the display device 1 includes a display region Ad and a peripheral region Gd. In this specification, the display region Ad is a region for displaying the image, and is a region overlapping with the pixels Pix (sub-pixels SPix). In this embodiment, a direction along a long side of the display region Ad is assumed to be the second direction Dy, and a direction intersecting with the second direction Dy is assumed to be the first direction Dx.

As illustrated in FIG. 8, the first electrodes COML are provided in the display region Ad. The first electrodes COML are provided so as to extend in the first direction Dx, and are arranged in the second direction Dy. The second electrodes TDL are provided in the display region Ad. The second electrodes TDL extend in the second direction Dy and are arranged in the first direction Dx. That is, the second electrodes TDL intersect with the first electrodes COML in the plan view. Both the first electrodes COML and the second electrodes TDL are formed into strips. Electrostatic capacitance is generated at intersecting portions between the first electrodes COML and the second electrodes TDL, and at the peripheries thereof.

The second electrodes TDL are made by forming thin metal wires having a width of several micrometers to several tens micrometers into zigzag lines, wavy lines, or a mesh. In the same manner as the first electrodes COML, the second electrodes TDL may be made using a light-transmitting conductive material, such as ITO.

As illustrated in FIG. 8, a flexible substrate 110 is coupled to the first substrate 21 and the sensor substrate 97 in the peripheral region Gd. The flexible substrate 110 is provided with a touch integrated circuit (IC) 49 for controlling the detection operation of the display panel 10. The second electrodes TDL are each electrically coupled to the touch IC 49. In addition, the first substrate 21 in the peripheral region Gd is provided with a driver IC 19 for controlling the display operation of the display panel 10. The first electrodes COML are each electrically coupled to the driver IC 19. The various circuits, such as the source driver 13 and the drive circuit 14, illustrated in FIG. 1 are provided in the driver IC 19. A multiplexer 16 is provided between the driver IC 19 and the display region Ad. The first and second AFEs 47A and 47B illustrated in FIG. 1 are provided in the touch IC 49.

The long sides of the peripheral region Gd of the first substrate 21 are provided with various circuits, such as a gate scanner 12A and a first electrode scanner 14A. The gate scanner 12A is a circuit included in the gate driver 12 (refer to FIG. 1), and sequentially selects the gate lines GCL. The first electrode scanners 14A are circuits that sequentially or simultaneously select the first electrodes COML. The first electrode scanner 14A is electrically coupled to the first electrodes COML, and supplies various drive signals from the driver IC 19 to the first electrodes COML. A region of the peripheral region Gd provided with the various circuits is a peripheral circuit region 80.

With this configuration, when the mutual-capacitive touch detection is performed, the driver IC 19 supplies the second drive signal TSVcom to the first electrodes COML in a time-division manner. In this case, the first electrode scanner 14A may simultaneously select a drive electrode block Bk (refer to FIG. 11) including a plurality of first electrodes COML and sequentially supply the second drive signal TSVcom on a per drive electrode block Bk basis. The second detection signal Vdet2 corresponding to a change in electrostatic capacitance between the first electrode COML and the second electrode TDL is output from the second electrode TDL to the touch IC 49, and thus, the touch of the detection target body is detected. That is, each of the first electrodes COML corresponds to the drive electrode E1, and each of the second electrodes TDL corresponds to the detection electrode E2, in the basic principle of the mutual-capacitive touch detection described above.

In this embodiment, the second electrodes TDL are provided on the upper side of the light guide plate 91, as illustrated in FIG. 5. As a result, the distance between the second electrode TDL and a detection target body, such as a finger, is smaller than that in the case where the second electrodes TDL are provided between the light guide plate 91 and the second substrate 31. In addition, a fringe component of an electric field generated between the second electrodes TDL and the first electrodes COML is more easily generated on the upper side of the first surface 97a of the sensor substrate 97. As a result, the display device 1 can be improved in touch detection sensitivity.

Figure 9:
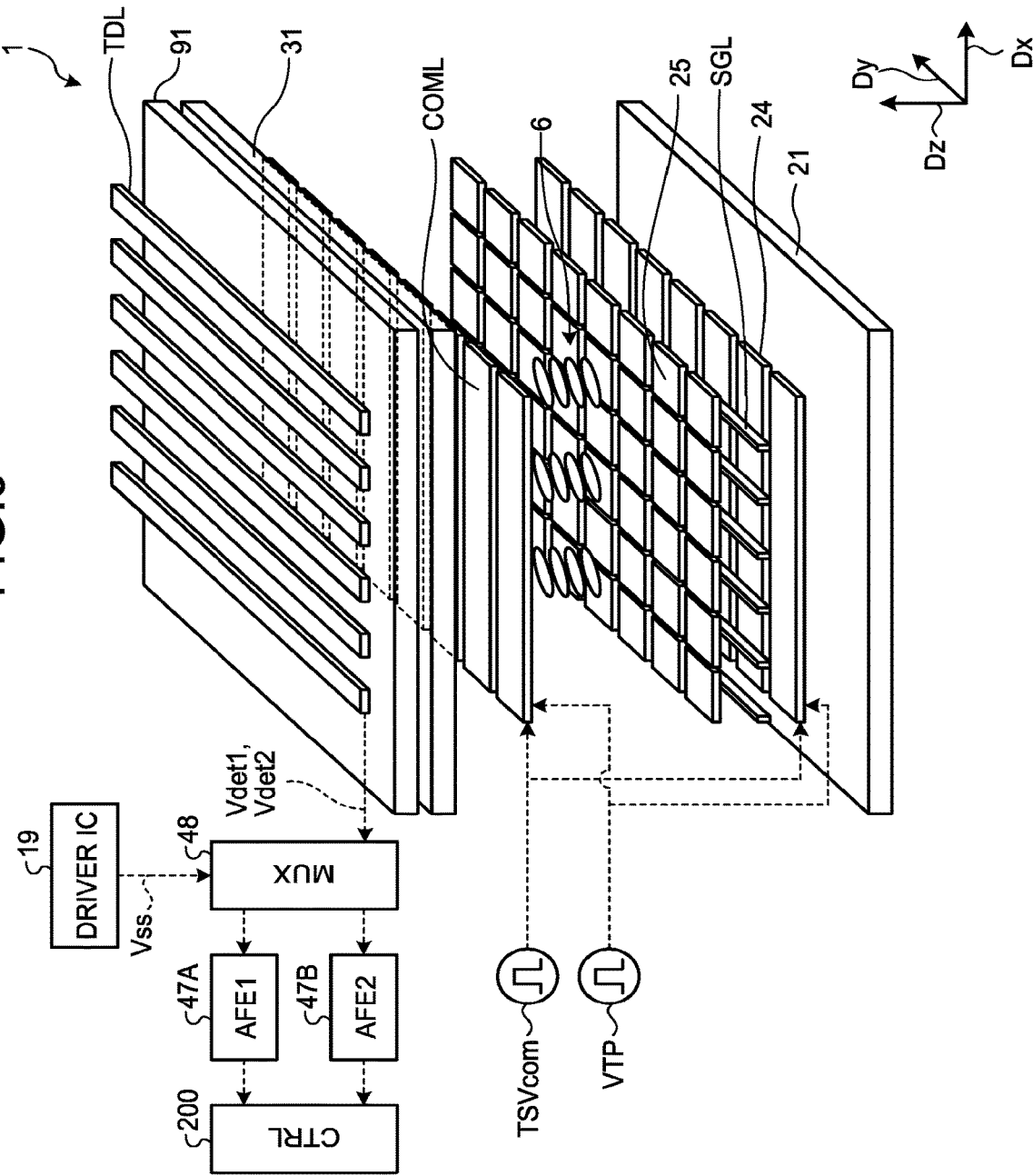
FIG. 9 is an exploded perspective view of the display device according to the first embodiment.

The following describes the electromagnetic induction touch detection. FIG. 9 is an exploded perspective view of the display device according to the first embodiment. As illustrated in FIG. 9, the third electrodes 24 are provided so as to extend in the first direction Dx and are arranged in the second direction Dy. The third electrodes 24 are provided so as to overlap with the first electrodes COML in the plan view. Each of the third electrodes 24 has a strip shape, and a longitudinal direction of the third electrode 24 is the same direction as that of the first electrodes COML. The signal lines SGL are disposed between the first substrate 21 and the liquid crystal layer 6. The signal lines SGL extend in the second direction Dy and are arranged in the first direction Dx. Each of the first electrodes COML and each of the third electrodes 24 intersect with the signal lines SGL in the plan view.

The first and second AFEs 47A and 47B are electrically coupled to the second electrodes TDL through a multiplexer 48. The driver IC 19 supplies a switching signal Vss to the multiplexer 48. The multiplexer 48 is a circuit that changes the coupling state between the second electrodes TDL and the first and second AFEs 47A and 47B based on the switching signal Vss. The multiplexer 48 couples the second electrodes TDL to the first AFE 47A when the electromagnetic induction method is used, and couples the second electrodes TDL to the second AFE 47B when the mutual-capacitance method is used. The multiplexer 48 may be provided on the second substrate 31 or provided in the touch IC 49. The output signals from the first and second AFEs 47A and 47B are supplied to the external controller 200. The controller 200 is, for example, a host IC mounted on a control board.

When the electromagnetic induction touch detection is performed, the driver IC 19 supplies the first drive signal VTP to the first electrodes COML. The first electrodes COML serve as the transmitting coils CTx when the electromagnetic induction touch detection is performed. As a result, the electromagnetic induction is generated among the first electrodes COML, the touch pen 100, and the second electrodes TDL. The electromotive force is generated in the second electrodes TDL by the mutual induction with the touch pen 100. The first detection signal Vdet1 corresponding to the electromotive force is supplied from the second electrodes TDL to the first AFE 47A through the multiplexer 48. As a result, the electromagnetic induction touch detection is performed.

In this embodiment, when the electromagnetic induction touch detection is performed, the driver IC 19 supplies the first drive signal VTP also to the third electrodes 24. When the mutual-capacitive touch detection is performed, the driver IC 19 supplies the first drive signal VTP also to the third electrodes 24. That is, in the same manner as the first electrodes COML, the third electrodes 24 serve as drive electrodes E1 in the mutual-capacitance method and serve as the transmitting coils CTx in the electromagnetic induction method. This configuration can improve detection sensitivity in the touch detection using the mutual-capacitance method and the electromagnetic induction method.

Figure 10:
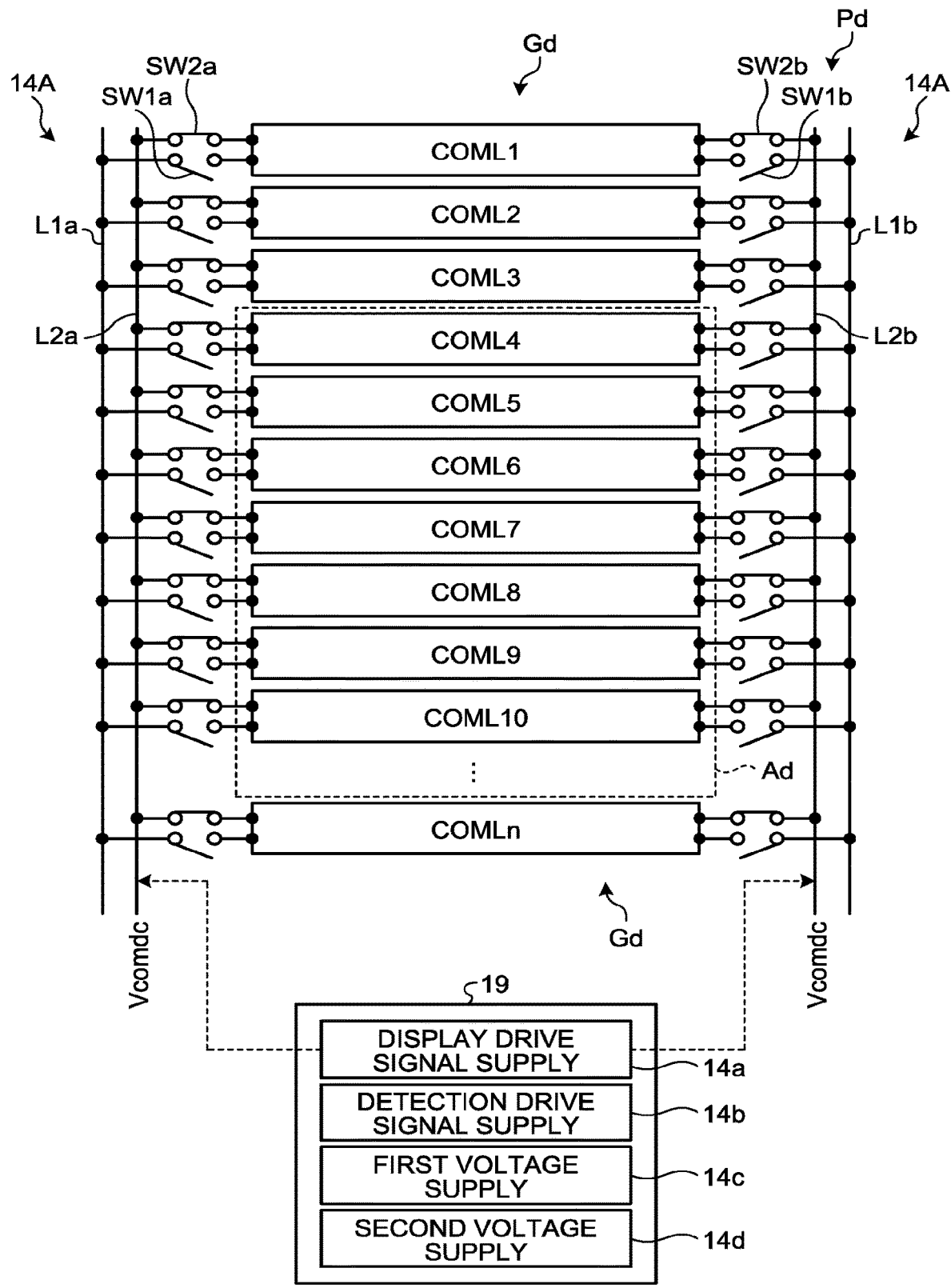
FIG. 10 is a circuit diagram illustrating a coupling configuration of first electrodes during a display period.
Figure 11:
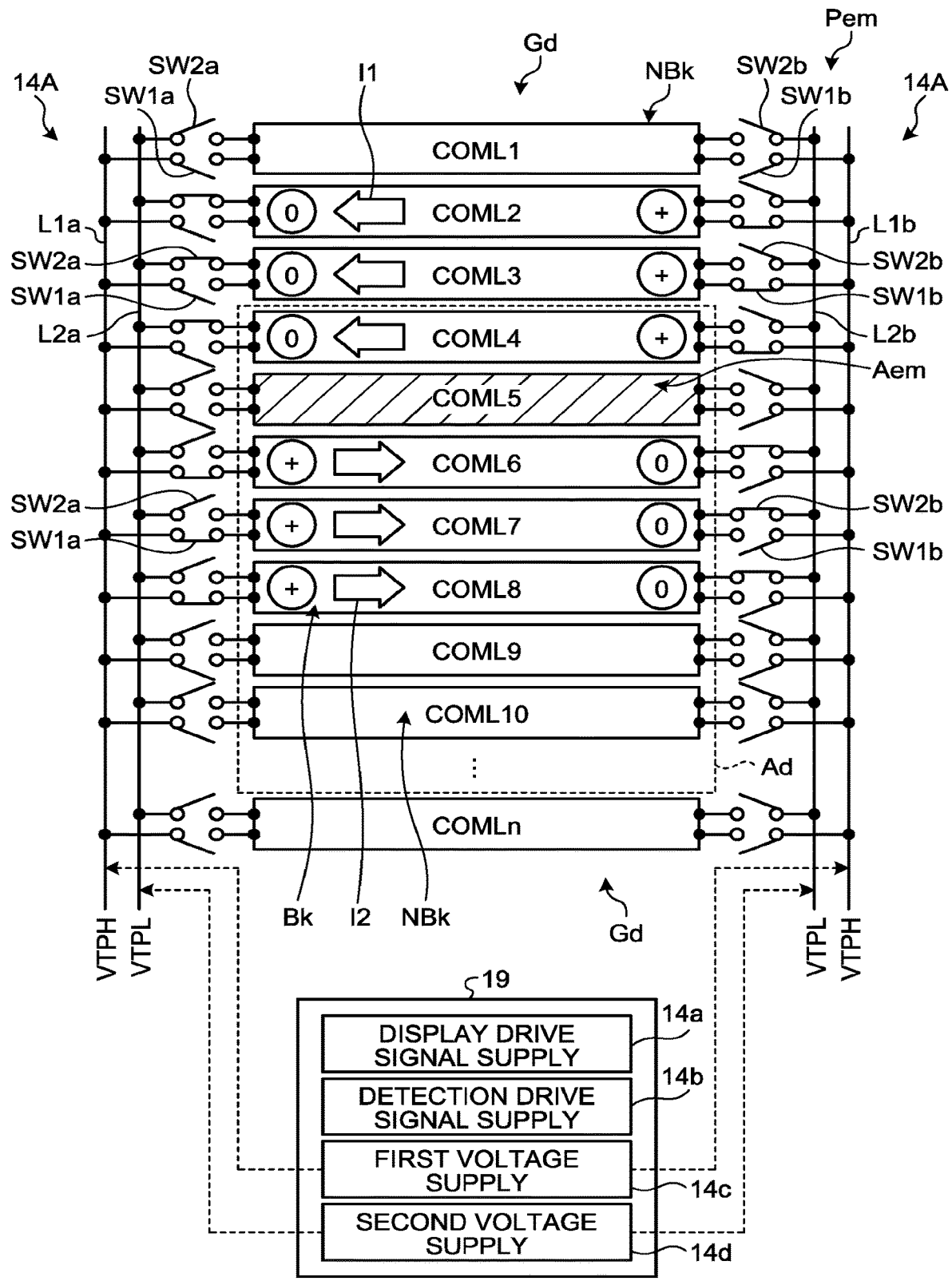
FIG. 11 is a circuit diagram illustrating a coupling configuration of the first electrodes during a first sensing period.
Figure 12:
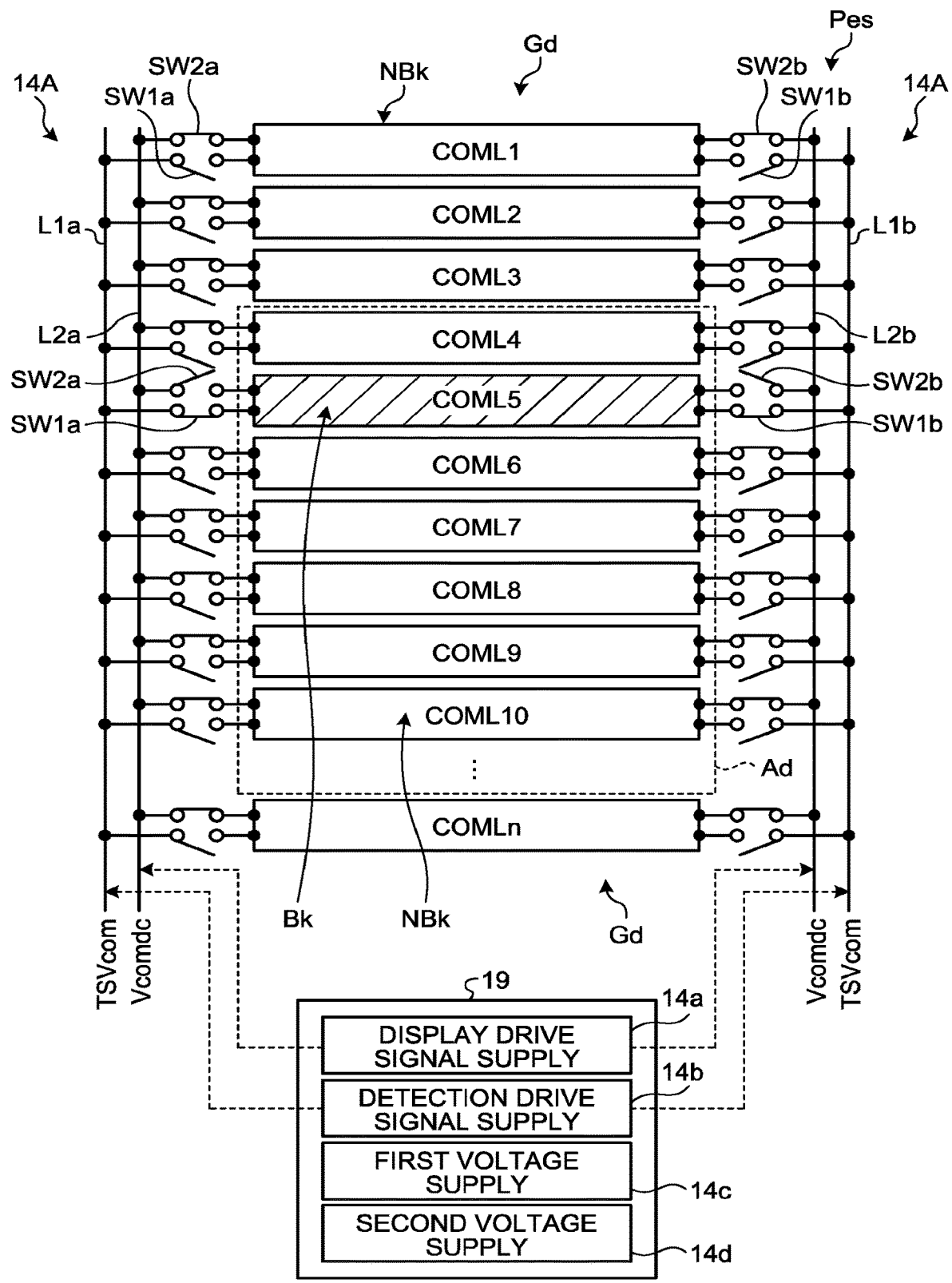
FIG. 12 is a circuit diagram illustrating the coupling configuration of the first electrodes during a second sensing period.

The first electrodes COML function as the common electrodes during the display, as the drive electrodes during the touch detection using the mutual-capacitance method, and as the transmitting coils during the touch detection using the electromagnetic induction method. Therefore, the coupling state needs to be changed according to the operations. The following describes coupling configurations of the first electrodes COML. FIG. 10 is a circuit diagram illustrating a coupling configuration of the first electrodes during a display period. FIG. 11 is a circuit diagram illustrating a coupling configuration of the first electrodes during a first sensing period. FIG. 12 is a circuit diagram illustrating still a coupling configuration of the first electrodes during a second sensing period.

As illustrated in FIGS. 10 to 12, a plurality of first electrodes COML1, ..., COML2, COMLn are arranged. In the following description, the first electrodes COML1, COML2, ..., COMLn will each be referred to as a first electrode COML when they need not be distinguished from one another.

The first electrode scanner 14A includes first wiring L1a and L1b, second wiring L2a and L2b, and switches SW1a, SW1b, SW2a, and SW2b. The first electrode scanner 14A is provided on both one end side and the other end side of the first electrodes COML. In the following description, one end of the first electrode COML is referred to as the left end, and the other end thereof is referred to as the right end, with reference to FIGS. 10 to 12. The first wiring L1a and the second wiring L2a are provided on the left ends of the first electrodes COML, and the first wiring L1b and the second wiring L2b are provided on the right ends of the first electrodes COML.

The switch SW1a is provided between the left end of the first electrode COML and the first wiring L1a. The switch SW2a is provided between the left end of the first electrode COML and the second wiring L2a. The switch SW1a and the switch SW2a are coupled in parallel to the left end of each of the first electrodes COML. The switch SW1b is provided between the right end of the first electrode COML and the first wiring L1b. The switch SW2b is provided between the right end of the first electrode COML and the second wiring L2b. The switch SW1b and the switch SW2b are coupled in parallel to the right end of each of the first electrodes COML.

The driver IC 19 supplies various signals to the first electrodes COML through the first wiring L1a and L1b and the second wiring L2a and L2b. The drive circuit 14 (refer to FIG. 1) includes a display drive signal supply 14a, a detection drive signal supply 14b, a first voltage supply 14c, and a second voltage supply 14d. These supplies are incorporated in the driver IC 19.

The display drive signal supply 14a supplies the display drive signal Vcomdc to the first electrodes COML through the second wiring L2a and L2b. The detection drive signal supply 14b supplies the second drive signal TSVcom for detection to the first electrodes COML through the first wiring L1a and L1b. The first voltage supply 14c supplies a first voltage VTPH of a direct current having a first potential to the first electrodes COML through the first wiring L1a and L1b. The second voltage supply 14d supplies a second voltage VTPL of a direct current having a second potential lower than the first potential to the first electrodes COML through the second wiring L2a and L2b.

As illustrated in FIG. 10, during a display period Pd in which an image is displayed, all the switches SW1a and SW1b are turned off, and all the switches SW2a and SW2b are turned on, in response to a control signal from the controller 11. As a result, all the first electrodes COML are uncoupled from the first wiring L1a and L1b; the second wiring L2a is coupled to the left ends of all the first electrodes COML; and the second wiring L2b is coupled to the right ends of all the first electrodes COML.

As a result, during the display period Pd, the display drive signal supply 14a supplies the display drive signal Vcomdc to all the first electrodes COML through the second wiring L2a and L2b. The display drive signal supply 14a is not limited to this operation, and may supply the display drive signal Vcomdc in a time-division manner to the first electrode COML overlapping one horizontal line serving as a target of the display driving.

As illustrated in FIG. 11, during a first sensing period Pem in which the electromagnetic induction touch detection is performed, the switches SW1a and SW1b and the switches SW2a and SW2b operate in response to the control signal from the controller 11, and the drive electrode block Bk is selected. Specifically, the first electrodes COML2, COML3, COML4, COML6, COML7, and COML8 are selected as the drive electrode block Bk. The other first electrodes COML serve as a non-selected electrode block NBk. A region between the first electrode COML4 and the first electrode COML6 is a detection region Aem that detects the detection target body.

The switches SW1a and SW1b and the switches SW2a and SW2b for the first electrodes COML in the non-selected electrode block NBk are turned off in response to the control signal from the controller 11. This operation brings the first electrodes COML in the non-selected electrode block NBk into a floating state.

On the left side of the first electrodes COML2, COML3, and COML4, the switches SW1a are turned off, and the switches SW2a are turned on. As a result, the left ends of the first electrodes COML2, COML3, and COML4 are electrically coupled to the second wiring L2a. On the right side of the first electrodes COML2, COML3, and COML4, the switches SW1b are turned on, and the switches SW2b are turned off. As a result, the right ends of the first electrodes COML2, COML3, and COML4 are electrically coupled to the first wiring L1b.

On the left side of the first electrodes COML6, COML7, and COML8, the switches SW1a are turned on, and the switches SW2a are turned off. As a result, the left ends of the first electrodes COML6, COML7, and COML8 are electrically coupled to the first wiring L1a. On the right side of the first electrodes COML6, COML7, and COML8, the switches SW1b are turned off, and the switches SW2b are turned on. As a result, the right ends of the first electrodes COML6, COML7, and COML8 are electrically coupled to the second wiring L2b.

As a result, during the first sensing period Pem, in response to the control signal from the controller 11, the first voltage supply 14c is coupled to the left end of at least one first electrode COML (first electrodes COML6, COML7, and COML8), and the second voltage supply 14d is coupled to the right end thereof. In addition, the second voltage supply 14d is coupled to the left end of at least one of the other first electrodes COML (first electrodes COML2, COML3, and COML4), and the first voltage supply 14c is coupled to the right end thereof.

The second voltage supply 14d supplies the second voltage VTPL to the left ends of the first electrodes COML2, COML3, and COML4 through the second wiring L2a. The first voltage supply 14c supplies the first voltage VTPH to the right ends of the first electrodes COML2, COML3, and COML4 through the first wiring L1b. As a result, potential differences between the left ends and the right ends of the first electrodes COML2, COML3, and COML4 are generated to cause currents I1 to flow in a direction from the right ends toward the left ends thereof. Each of the first voltage VTPH and the second voltage VTPL is a direct-current voltage signal. The operations of the switches are switched at a predetermined frequency to generate the first drive signal VTP serving as an alternating-current voltage signal.

The first voltage supply 14c supplies the first voltage VTPH to the left ends of the first electrodes COML6, COML7, and COML8 through the first wiring L1a. The second voltage supply 14d supplies the second voltage VTPL to the right ends of the first electrodes COML6, COML7, and COML8 through the second wiring L2b. As a result, potential differences between the left ends and the right ends of the first electrodes COML6, COML7, and COML8 are generated to cause currents I2 to flow in a direction from the left ends toward the right ends thereof.

In this manner, the first voltage VTPH and the second voltage VTPL supplied to both ends of the first electrodes COML are changed over to each other by switching the operations of the switches SW1a, SW2a, SW1b, and SW2b.

As a result, the first drive signal VTP is supplied to the first electrodes COML. The currents I1 and I2 corresponding to the first drive signal VTP generate magnetic fields.

The currents I1 and the currents I2 flow in directions opposite to each other. As a result, the magnetic field generated by the currents I1 overlaps with the magnetic field generated by the currents I2 in the detection region Aem. The flowing of the currents I1 and the currents I2 in the opposite directions can increase the strength of the magnetic field passing through the detection region Aem. The magnetic field generated by the currents I1 and the currents I2 corresponds to the magnetic field M1 generated during the magnetic field generation period of the electromagnetic induction method illustrated in FIG. 3. The first electrodes COML2, COML3, COML4, COML6, COML7, and COML8 included in the drive electrode block Bk correspond to the transmitting coil CTx.

The controller 11 sequentially selects the first electrodes COML1 to COMLn. As a result, the touch detection is performed over the entire display region Ad using the electromagnetic induction method. As illustrated in FIG. 10, the first electrodes COML1, COML2, COML3, and COMLn are also provided in the peripheral region Gd. This configuration can also generate magnetic fields in the peripheral portion of the display region Ad. In this case, the first electrodes COML1, COML2, COML3, and COMLn are provided at positions not overlapping with the detection region Aem.

The transmitting coil CTx is not limited to the example illustrated in FIG. 11, and may be formed by one or two of the first electrodes COML disposed on one side of the detection region Aem and one or two of the first electrodes COML disposed on the other side of the detection region Aem. The transmitting coil CTx may be formed by four or more of the first electrodes COML disposed on one side of the detection region Aem and four or more of the first electrodes COML disposed on the other side of the detection region Aem. The numbers of the first electrodes COML on both sides of the detection region Aem need not be equal to each other. A configuration can be employed in which the number of the first electrodes COML on one side differs from that of the first electrodes COML on the other side.

As illustrated in FIG. 12, during a second sensing period Pes in which the mutual-capacitive touch detection is performed, the switches SW1a and SW1b coupled to both ends of the first electrodes COML in the drive electrode block Bk are turned on in response to the control signal from the controller 11. In addition, the switches SW2a and SW2b are turned off. As a result, the drive electrode block Bk is selected. For the non-selected electrode block NBk, the switches SW2a and SW2b coupled to both ends of the first electrodes COML are turned on, and the switches SW1a and SW1b are turned off.

The detection drive signal supply 14b supplies the second drive signal TSVcom serving as an alternating-current voltage signal to the first electrodes COML in the drive electrode block Bk through the first wiring L1a and L1b. The display drive signal supply 14a supplies the display drive signal Vcomdc serving as a direct-current voltage signal to the first electrodes COML in the non-selected electrode block NBk through the second wiring L2a and L2b. The controller 11 sequentially selects the first electrodes COML provided in the display region Ad. A configuration can also be employed in which the second voltage supply 14d supplies the second voltage VTPL serving as a direct-current voltage signal to the non-selected electrode block NBk during the second sensing period Pes.

Figure 13:
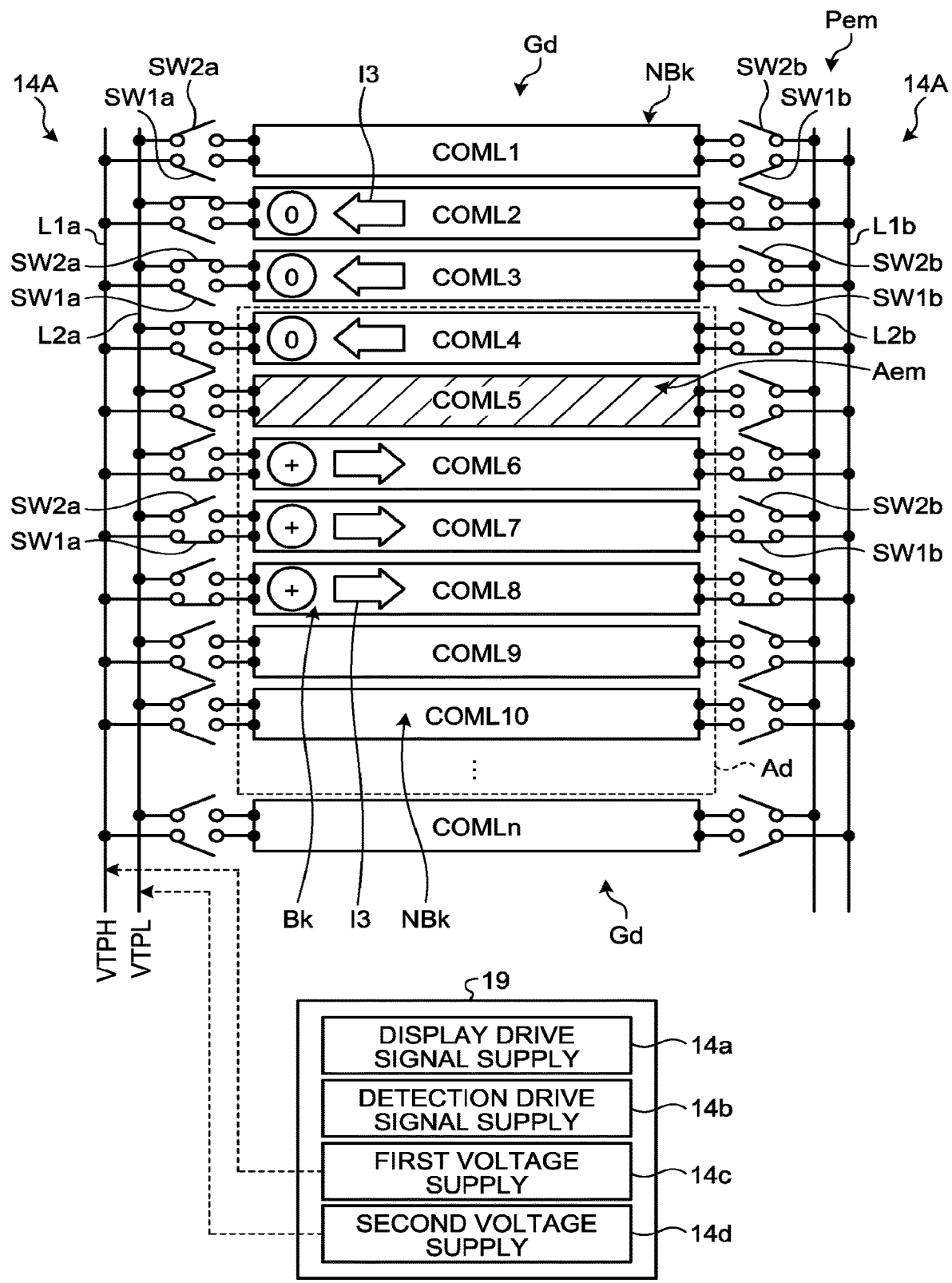
FIG. 13 is a circuit diagram illustrating another example of the coupling configuration of the first electrodes during the first sensing period.

FIG. 13 is a circuit diagram illustrating another example of the coupling configuration of the first electrodes during the first sensing period. As illustrated in FIG. 13, on the right side of the first electrodes COML6, COML7, and COML8, the switches SW1b are turned on, and the switches SW2b are turned off. The operations of the switches SW1a and the switches SW2a on the left side of the first electrodes COML6, COML7, and COML8 are the same as those in the example illustrated in FIG. 11. Also, the operations of the switches SW1a, SW1b, SW2a, and SW2b coupled to the first electrodes COML2, COML3, and COML4 are the same as those in the example illustrated in FIG. 11.

The supplies 14a to 14d of the driver IC 19 do not supply the various signals to the first wiring L1b and the second wiring L2b disposed on the right end side of the first electrodes COML.

With the configuration described above, the right ends of the first electrodes COML2, COML3, and COML4 are electrically coupled to the right ends of the first electrodes COML6, COML7, and COML8 through the switches SW1b and the first wiring L1b. That is, the first electrodes COML2, COML3, and COML4, the first wiring L1b, and the first electrodes COML6, COML7, and COML8 are coupled together so as to form a loop surrounding the detection region Aem.

The first voltage supply 14c supplies the first voltage VTPH to the left ends of the first electrodes COML6, COML7, and COML8 through the first wiring L1a. The second voltage supply 14d supplies the second voltage VTPL to the left ends of the first electrodes COML2, COML3, and COML4 through the second wiring L2a. As a result, currents I3 flow from the first electrodes COML2, COML3, and COML4 to the first electrodes COML6, COML7, and COML8. The currents I3 generate a magnetic field passing through the detection region Aem.

In this manner, the switches SW1b are provided that couple together the ends on the same side of a pair of groups of first electrodes (the first electrodes COML2, COML3, and COML4 and the first electrodes COML6, COML7, and COML8) among the first electrodes COML. During the first sensing period Pem, the controller 11 couples together a pair of groups of first electrodes COML by operating the switches SW1b and SW2b. During a period different from the first sensing period Pem, that is, for example, during the display period Pd, the controller 11 uncouples the pair of groups of first electrodes COML from each other by operating the switches SW1b and SW2b.

Also with the configuration described above, the first electrodes COML constitute the transmitting coils CTx during the first sensing period Pem. The direction of the currents I3 flowing in the first electrodes COML2, COML3, and COML4 is opposite to the direction of the currents I3 flowing in the first electrodes COML6, COML7, and COML8. This configuration can increase the strength of the magnetic field passing through the detection region Aem. Accordingly, the detection sensitivity of the electromagnetic induction method can be increased.

Figure 14:
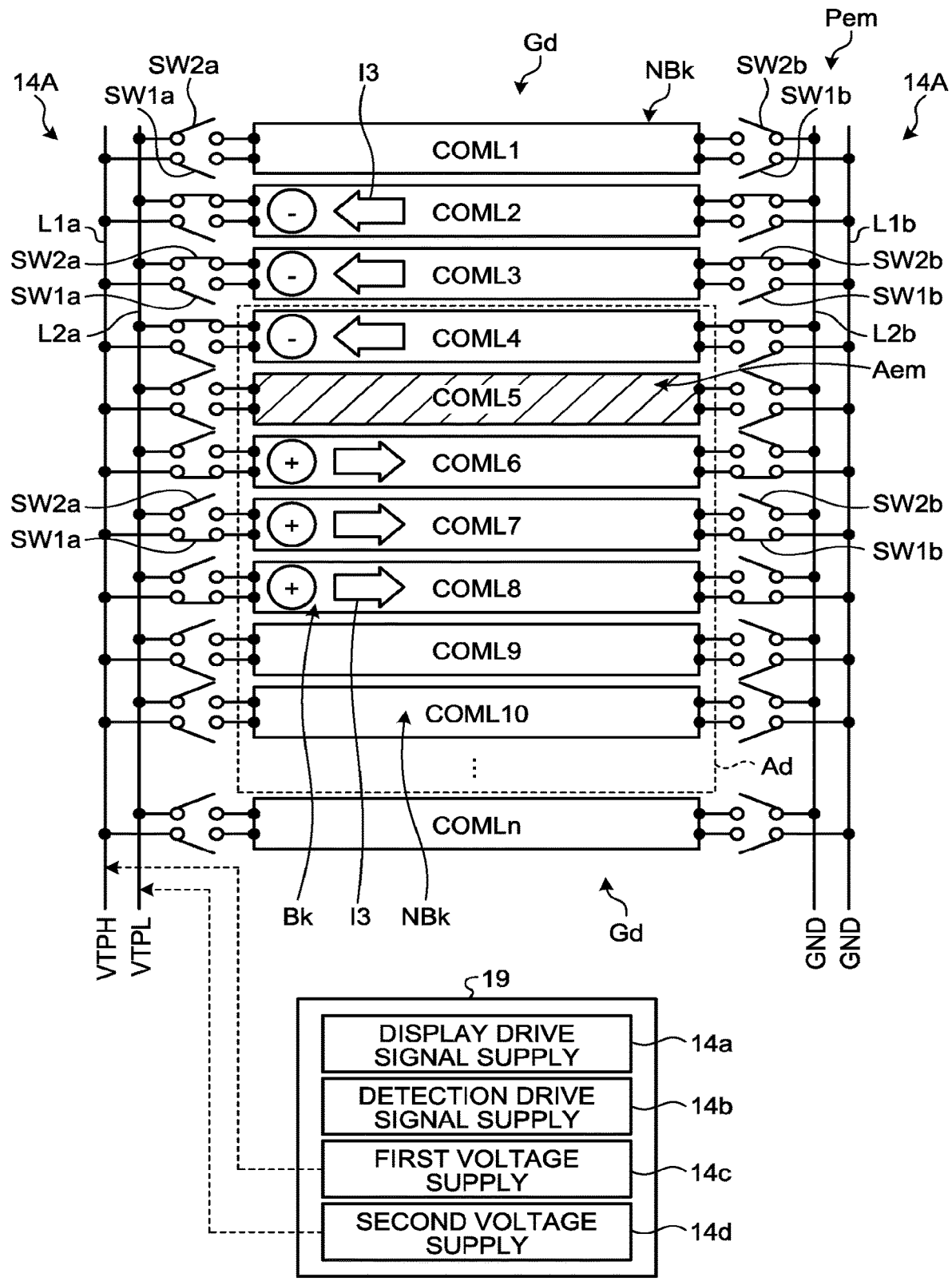
FIG. 14 is a circuit diagram illustrating still another example of the coupling configuration of the first electrodes during the first sensing period.

FIG. 14 is a circuit diagram illustrating still another example of the coupling configuration of the first electrodes during the first sensing period. In FIG. 14, on the right side of the first electrodes COML, the first wiring L1b and the second wiring L2b are supplied with ground potential GND. The right ends of the first electrodes COML2, COML3, and COML4 are coupled to the second wiring L2b through the switches SW2b. The operations of the switches on the left side of the first electrodes COML2, COML3, and COML4 and the first electrodes COML6, COML7, and COML8 are the same as those of the example illustrated in FIG. 13.

The first voltage supply 14c supplies the first voltage VTPH to the left ends of the first electrodes COML6, COML7, and COML8 through the first wiring L1a. A potential difference between the first voltage VTPH and the ground potential GND causes the currents I3 to flow from the left ends toward the right ends of the first electrodes COML6, COML7, and COML8. The second voltage supply 14d supplies the second voltage VTPL to the left ends of the first electrodes COML2, COML3, and COML4 through the second wiring L2a. In the examples illustrated in FIGS. 11 and 13, the second voltage VTPL has substantially the same potential as the ground potential GND. In contrast, in FIG. 14, the second voltage VTPL has a negative potential lower than the ground potential GND. In this manner, the second voltage supply 14d can supply the second voltage VTPL having a negative potential. As illustrated in FIG. 14, a potential difference between the second voltage VTPL and the ground potential GND causes the currents I3 to flow from the right ends toward the left ends of the first electrodes COML2, COML3, and COML4. The currents I3 generate a magnetic field passing through the detection region Aem. Also with the configuration described above, the first electrodes COML constitute the transmitting coils CTx during the first sensing period Pem.

Figure 15:
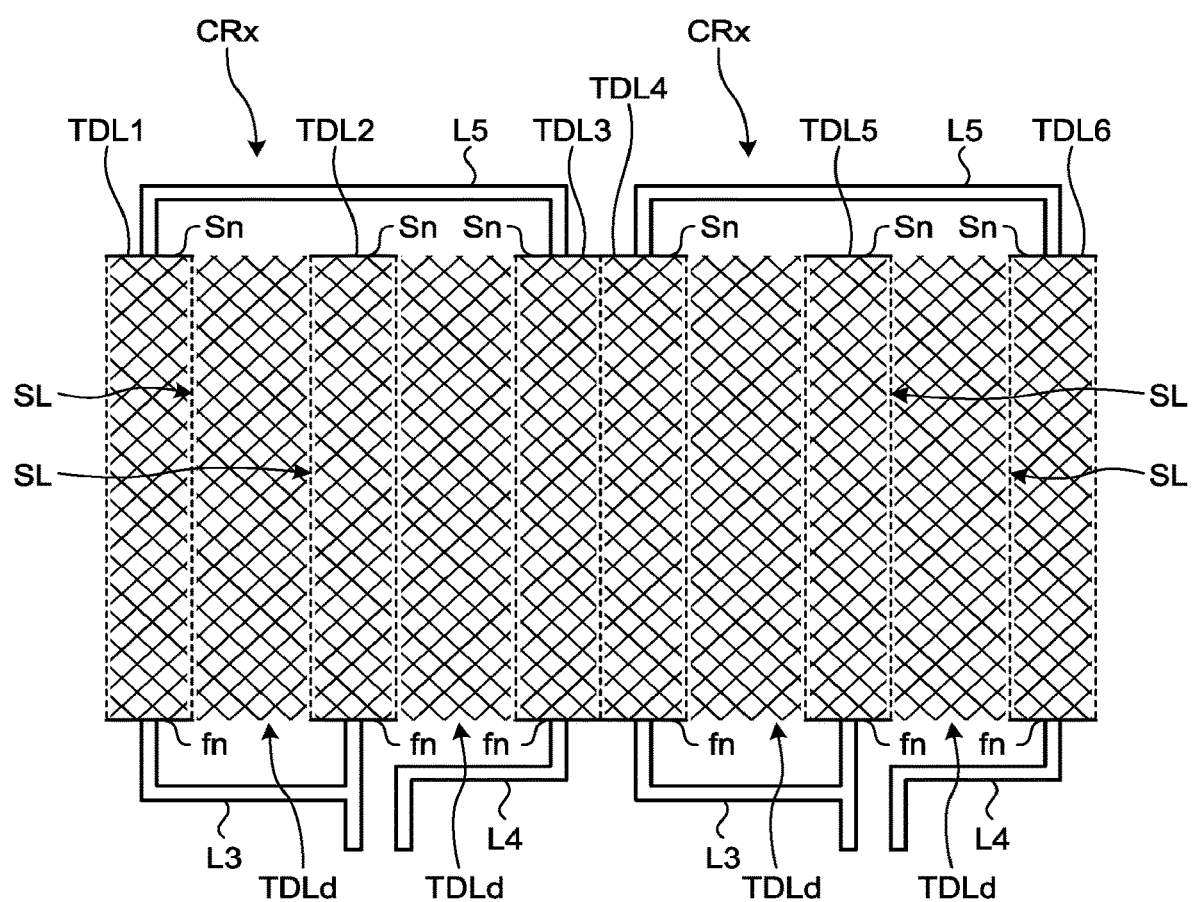
FIG. 15 is a plan view illustrating a configuration of second electrodes.

FIG. 15 is a plan view illustrating a configuration of the second electrodes. FIG. 15 illustrates six second electrodes TDL1, TDL2, TDL3, TDL4, TDL5, and TDL6 of the second electrodes TDL. In the following description, the six second electrodes TDL1, TDL2, TDL3, TDL4, TDL5, and TDL6 will each be referred to as a second electrode TDL when they need not be distinguished from one another.

The second electrode TDL is made by forming thin metal wires having a width of several micrometers to several tens micrometers into a mesh. Dummy electrodes TDLd are provided between adjacent second electrodes TDL. The dummy electrodes TDLd are fabricated from mesh-shaped thin metal wires similar to those of the second electrodes TDL. Each of the dummy electrodes TDLd is isolated by slits SL from the second electrodes TDL and is not coupled to wiring L3, L4, and L5. That is, the dummy electrodes TDLd are in the floating state. The configuration described above reduces a difference in light transmittance between a portion provided with the second electrodes TDL and a portion provided with the dummy electrodes TDLd.

Each of the second electrodes TDL1 to TDL6 has one end Sn and the other end fn. The other end fn of the second electrode TDL1 is coupled to the other end fn of the second electrode TDL2 through the wiring L3. The wiring L4 is coupled to the other end fn of the second electrode TDL3. The one end Sn of the second electrode TDL1 is coupled to the one end Sn of the second electrode TDL3 through the wiring L5. Either the wiring L3 or the wiring L4 is coupled to the first and second AFEs 47A and 47B through the multiplexer 48 (refer to FIG. 9). The other of the wiring L3 and the wiring L4 is coupled to ground (not illustrated). The second electrodes TDL4, TDL5, and TDL6 have the same configuration.

In this manner, the second electrode TDL1, the wiring L5, and the second electrode TDL3 are coupled together so as to form a loop surrounding the dummy electrodes TDLd and the second electrode TDL2. As a result, the second electrode TDL1, the wiring L5, and the second electrode TDL3 constitute one of the receiving coils CRx in the electromagnetic induction method. Specifically, when the magnetic field M2 from the touch pen 100 (refer to FIG. 4) passes through a region surrounded by the second electrode TDL1, the wiring L5, and the second electrode TDL3, an electromotive force corresponding to a variation in the magnetic field M2 is generated in the second electrode TDL1, the wiring L5, and the second electrode TDL3. A signal corresponding to the electromotive force is supplied to the first AFE 47A. Thus, the touch pen 100 can be detected.

In the capacitance method, the second electrodes TDL1, TDL2, and TDL3 are electrically coupled to one another, and serve as one detection electrode block. Each of the second electrodes TDL1, TDL2, and TDL3 supplies a signal corresponding to a change in electrostatic capacitance between the first electrodes and the first electrodes COML to the second AFE 47B. Thus, a detection target body, such as a finger, can be detected.

Figure 16:
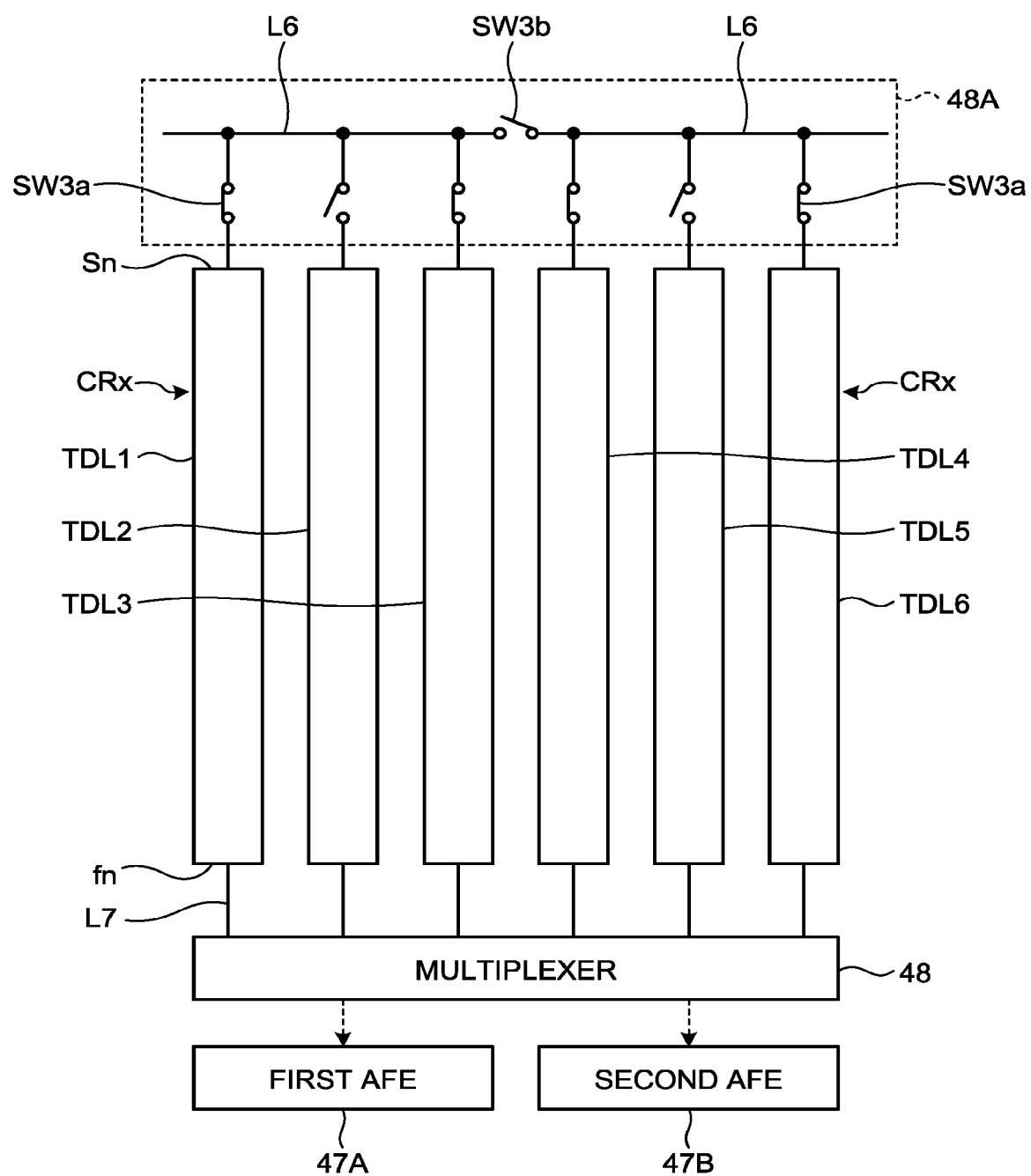
FIG. 16 is an explanatory diagram illustrating another example of the configuration of the second electrodes.

FIG. 16 is an explanatory diagram illustrating another example of the configuration of the second electrodes. As illustrated in FIG. 16, a switching circuit 48A is provided on the one end Sn side of the second electrodes TDL, and the multiplexer 48 is provided on the other end fn side of the second electrodes TDL. The switching circuit 48A switches between coupling and uncoupling between respective ends Sn on the same side of the second electrodes TDL. For ease of viewing, FIG. 16 schematically illustrates the second electrodes TDL while omitting the dummy electrodes TDLd (refer to FIG. 15). Also in FIG. 16, the second electrodes TDL are fabricated from the mesh-shaped thin metal wires in the same manner as in FIG. 15.

The switching circuit 48A includes a plurality of lines of wiring L6, switches SW3a, and a switch SW3b. The switches SW3a are provided between respective ends Sn of the second electrodes TDL and the wiring L6. The switch SW3b is provided between the lines of the wiring L6. The other end fn of the second electrodes TDL are coupled to the multiplexer 48 through respective wirings L7.

In the electromagnetic induction method, in response to the control signal from the controller 11, a pair of the switches SW3a coupled to the second electrode TDL1 and the second electrode TDL3 are turned on, and the switch SW3a coupled to the second electrode TDL2 is turned off. Thus, the switching circuit 48A electrically couples together the respective ends Sn on the same side of the pair of the second electrode TDL1 and the second electrode TDL3 through the wiring L6.

The second electrode TDL1, the wiring L6, and the second electrode TDL3 are coupled together so as to form a loop, and serve as one of the receiving coils CRx in the electromagnetic induction method. The same applies to the second electrode TDL4, the wiring L6, and the second electrode TDL6.

The multiplexer 48 couples the other end fn of either the second electrode TDL1 or the second electrode TDL3 to the first AFE 47A. As a result, a signal corresponding to an electromotive force generated in the pair of the second electrode TDL1 and the second electrode TDL3 is supplied to the first AFE 47A.

During the second sensing period Pes, all the switches SW3a and the SW3b are turned off. As a result, the respective ends Sn of the second electrodes TDL are uncoupled from one another. The multiplexer 48 couples the other end fn of each of the second electrodes TDL to the second AFE 47B. Each of the second electrodes TDL supplies a signal corresponding to a change in electrostatic capacitance between the first electrodes and the first electrodes COML to the second AFE 47B. Thus, the detection target body, such as the finger, can be detected.

In FIG. 16, only one switch SW3b is illustrated. However, the switches SW3b may be provided between adjacent pairs of the second electrodes TDL. The second electrodes TDL constituting the receiving coils CRx can be appropriately changed by switching the operations of the switches SW3a and SW3b in response to the control signal from the controller 11.

Figure 17:
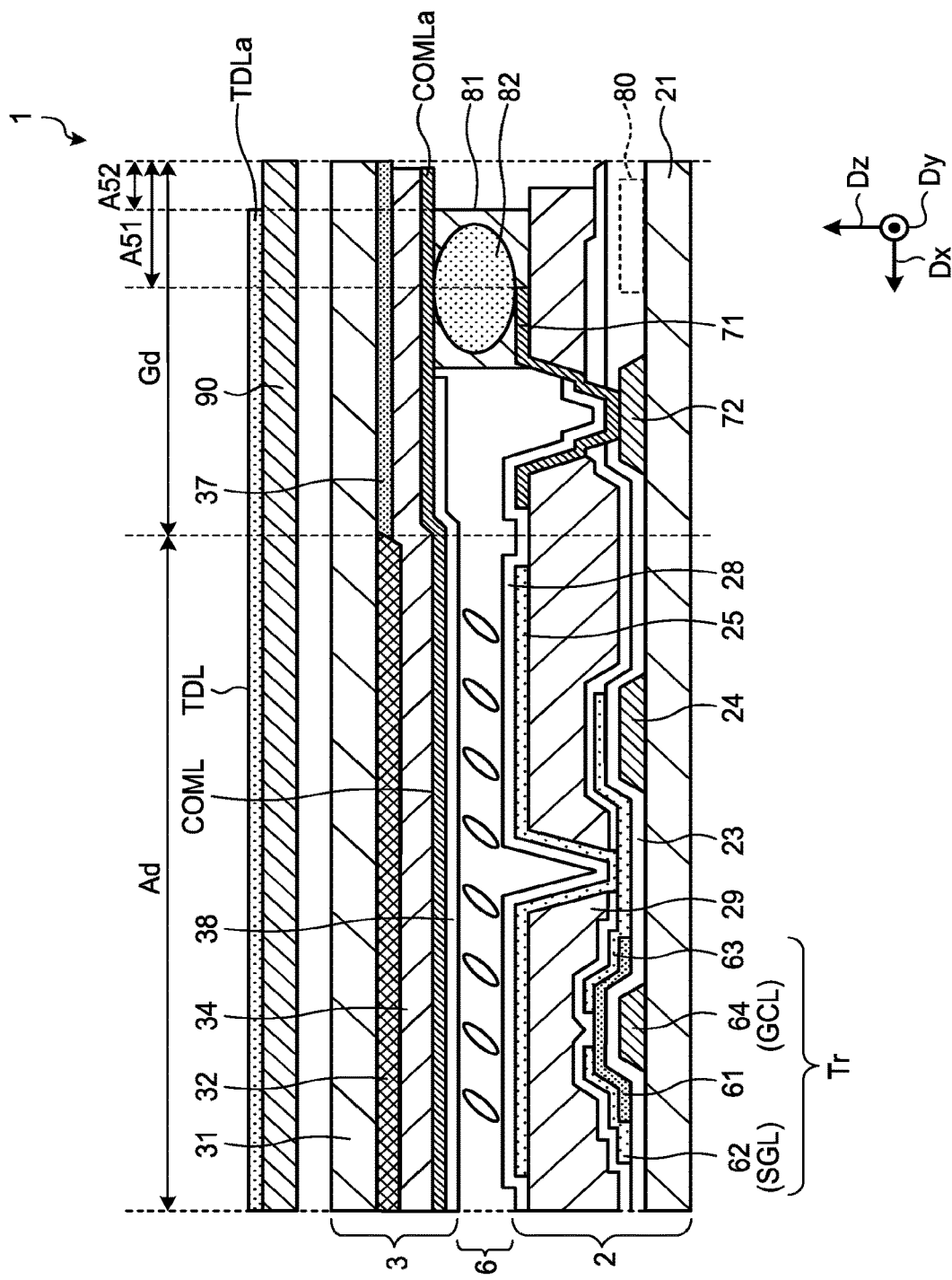
FIG. 17 is a schematic sectional diagram for explaining a coupling configuration between the first electrodes and third electrodes.
Figure 18:
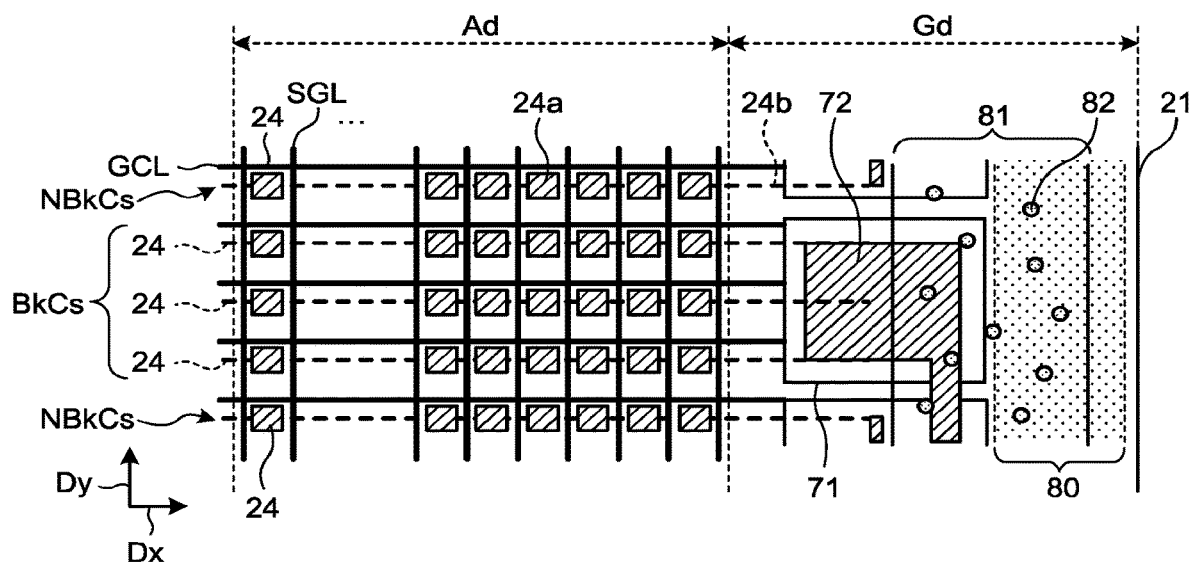
FIG. 18 is a plan view schematically illustrating the third electrodes and a conductive portion.
Figure 19:
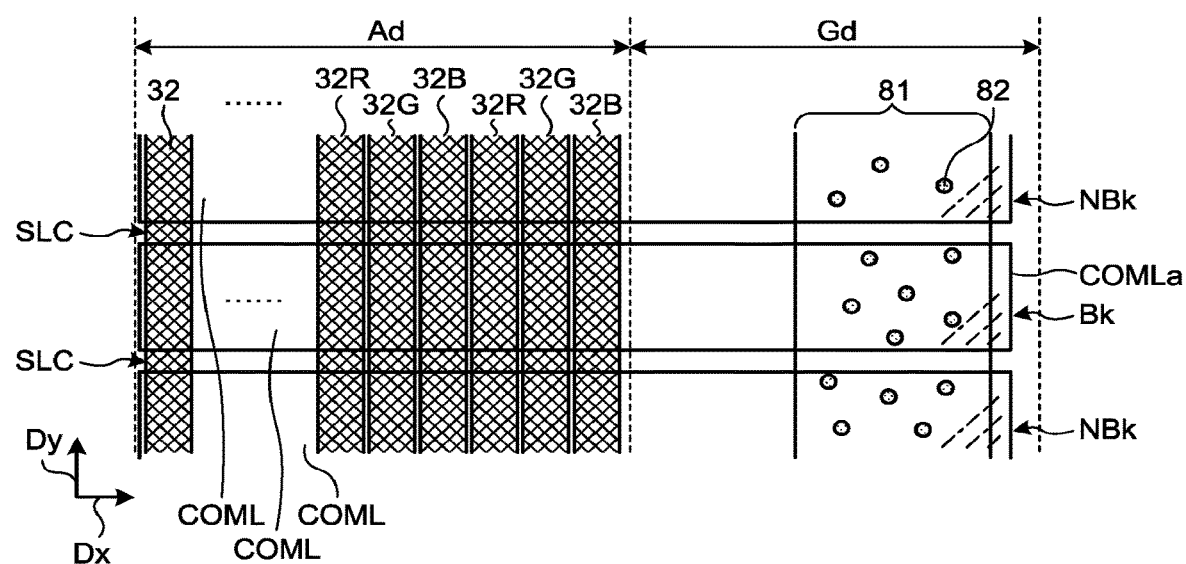
FIG. 19 is a plan view schematically illustrating the first electrodes and the conductive portion.

The following describes a coupling configuration between the third electrodes 24 and the first electrodes COML. FIG. 17 is a schematic sectional diagram for explaining the coupling configuration between the first electrodes and third electrodes. FIG. 18 is a plan view schematically illustrating the third electrodes and a conductive portion. FIG. 19 is a plan view schematically illustrating the first electrodes and the conductive portion.

FIG. 17 illustrates a portion for one pixel at the outermost circumference of the display region Ad and the peripheral region Gd adjacent thereto. As illustrated in FIG. 17, in the pixel substrate 2, for example, the switching elements Tr, the pixel electrodes 25, the third electrodes 24, coupling electrodes 72, the insulating layer 23, the planarizing film 29, and the orientation film 28 are provided on the first substrate 21. The orientation film 28 is provided so as to cover the pixel electrodes 25 in the display region Ad. The orientation film 28 is provided in a region not overlapping with a conductive portion 81 in the peripheral region Gd and overlaps with a part of a conductive layer 71. Each of the switching elements Tr includes a gate electrode 64, a source electrode 62, a semiconductor layer 61, and a drain electrode 63. The gate electrode 64 is provided in the same layer as that of the gate lines GCL. A part of each of the gate lines GCL may be used as the gate electrode 64. The source electrode 62 is provided in the same layer as that of the signal lines SGL. A part of each of the signal lines SGL may be used as the source electrode 62.

Each of the pixel electrodes 25 is coupled to the drain electrode 63 through a contact hole provided in the planarizing film 29. The third electrodes 24 are provided in the same layer as that of the gate electrode 64 (gate line GCL). As illustrated in FIG. 18, the third electrodes 24 are electrically coupled to a corresponding one of the coupling electrodes 72.

In the counter substrate 3, the color filter 32 is provided on one surface of the second substrate 31. A decorative layer 37 is provided in the peripheral region Gd of the second substrate 31. An overcoat layer 34 is provided so as to cover the color filter 32 and the decorative layer 37. The first electrodes COML are provided between the overcoat layer 34 and the liquid crystal layer 6. The second electrodes TDL are provided on the other surface of the second substrate 31. The first electrodes COML are continuously provided from the display region Ad to the peripheral region Gd. Portions of the first electrodes COML provided in the peripheral region Gd serve as coupling portions COMLa. The orientation film 38 is provided so as to cover the first electrodes COML in the display region Ad. The orientation film 38 is provided in the region not overlapping with the conductive portion 81 in the peripheral region Gd and overlaps with parts of the coupling portions COMLa.

In the peripheral region Gd, the conductive portion 81 is provided between the first substrate 21 and the second substrate 31. The conductive portion 81 is made of a seal portion that seals between the first substrate 21 and the second substrate 31. The conductive portion 81 includes a plurality of conductive particles 82 dispersed in a sealing material. The conductive portion 81 is provided above the peripheral circuit region 80 with the planarizing film 29 interposed therebetween.

The conductive layer 71 is coupled to the coupling electrodes 72. The conductive layer 71 is a light-transmitting conductive material, such as ITO. The coupling portions COMLa are coupled to the conductive layer 71 through the conductive particles 82 of the conductive portion 81. As a result, the first electrodes COML are electrically coupled to the third electrodes 24.

A region A51 denotes a region outside the central portion of the conductive portion 81 up to the outer circumference of the second substrate 31. The coupling portions COMLa are preferably provided from the boundary between the display region Ad and the peripheral region Gd up to the region A51. This configuration electrically couples the coupling portions COMLa to the conductive portion 81. A region A52 denotes a region outside end portions TDLa of the second electrodes TDL up to the outer circumference of the second substrate 31, the end portions TDLa being provided in the peripheral region Gd. The coupling portions COMLa are preferably provided up to the region A52. As a result, the coupling portions COMLa are provided between the peripheral circuit region 80 and the second electrodes TDL. This configuration allows the coupling portions COMLa to shield noise from the peripheral circuit region 80.

As illustrated in FIG. 18, the third electrodes 24 include retention capacitance generating portions 24a and wiring 24b. The retention capacitance generating portions 24a are provided so as to overlap with the drain electrodes 63 and generate the retention capacitance between the retention capacitance generating portions 24a and the drain electrodes 63. The wiring 24b couples the retention capacitance generating portions 24a arranged in the first direction Dx. The configuration described above forms the third electrodes 24 into a long shape having a longitudinal direction in the first direction Dx as a whole. That is, a longitudinal direction of the third electrodes 24 and a longitudinal direction of the first electrodes COML illustrated in FIG. 19 are the same direction. As illustrated in FIG. 19, the color regions 32R, 32G, and 32B of the color filter 32 intersect with the first electrodes COML in the plan view.

As illustrated in FIGS. 18 and 19, the coupling electrodes 72 are provided corresponding to the first electrodes COML arranged in the second direction Dy. That is, the coupling electrodes 72 are coupled in a one-to-one relation to the first electrodes COML through the conductive portion 81. A plurality of third electrodes 24 overlapping with one of the first electrodes COML are coupled to one of the coupling electrodes 72. The first electrodes COML adjacent in the second direction Dy are separated by a slit SLC. The width of the slit SLC is greater than the diameter of the conductive particles 82. This configuration electrically isolates the adjacent first electrodes COML from each other.

As illustrated in FIG. 19, one of the first electrodes COML is selected as the drive electrode block Bk. The first electrodes COML other than those selected as the drive electrode block Bk serve as the non-selected electrode block NBk. As described above, the driver IC 19 (refer to FIG. 10) supplies the various drive signals to the drive electrode block Bk.

As illustrated in FIG. 18, a plurality of third electrodes 24 overlapping with and opposed to the drive electrode block Bk are electrically coupled to the drive electrode block Bk through the conductive portion 81. As a result, these third electrodes 24 function as a third electrode block BkCs integrally with the drive electrode block Bk. The third electrode block BkCs is supplied with the same signals as the various drive signals supplied to the drive electrode block Bk.

That is, during the first sensing period Pem illustrated in FIG. 11, a plurality of third electrodes 24 overlapping with and opposed to the first electrodes COML2, COML3, COML4, COML6, COML7, and COML8 also serve as the transmitting coils CTx. Specifically, the third electrodes 24 are supplied with the first voltage VTPH and the second voltage VTPL from the driver IC 19, and generate the magnetic field M1. The magnetic field generated from the third electrodes 24 overlaps with the magnetic field generated from the first electrodes COML in the detection region Aem.

During the second sensing period Pes illustrated in FIG. 12, the third electrodes 24 overlapping with the drive electrode block Bk are also supplied with the second drive signal TSVcom from the driver IC 19. These third electrodes 24 also generate electrostatic capacitance between the third electrodes 24 and the second electrodes TDL. As a result, the detection sensitivity can be improved during the mutual-capacitive touch detection.

Whereas the first electrodes COML in the drive electrode block Bk are made of ITO, the third electrodes 24 in the third electrode block BkCs are made of a metal. Therefore, the third electrodes 24 have a resistance significantly lower than that of the first electrodes COML. As a result, using the third electrodes 24 as the drive electrodes can reduce dulling of the first drive signal VTP and the second drive signal TSVcom each having an alternating-current rectangular wave. This point will be described with reference to FIG. 20.

Figure 20:
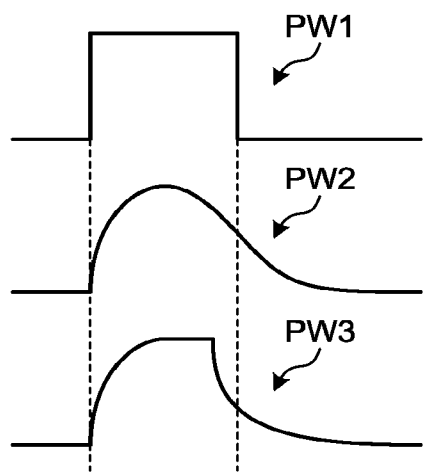
FIG. 20 is an explanatory diagram for explaining a pulse wave applied to drive electrodes.

FIG. 20 is an explanatory diagram for explaining a pulse wave applied to the drive electrodes. Each of a first pulse wave PW1, a second pulse wave PW2, and a third pulse wave PW3, which are illustrated in FIG. 20, exemplifies one pulse wave of a plurality of pulse waves included in the first drive signal VTP and the second drive signal TSVcom. The first pulse wave PW1 represents an ideal waveform of the pulse wave applied to the drive electrodes. The second pulse wave PW2 represents a waveform when only the first electrodes COML made of ITO are used as the drive electrodes. Since ITO has a high resistance, the waveform of the alternating-current rectangular wave applied thereto is made duller than that of the first pulse wave PW1. The waveform is made duller particularly when falling.

In contrast, the third pulse wave PW3 represents a waveform when the first electrodes COML made of ITO and the third electrodes 24 are used in combination as the drive electrodes. The third electrodes 24 are metallic and have a large area including the retention capacitance generating portions 24a, which generates the retention capacitance of the pixels Pix (sub-pixels SPix). Therefore, the third electrodes 24 have a resistance significantly lower than that of ITO. As a result, overall response of the drive electrodes is improved, and in particular, the falling of the waveform of the third pulse wave PW3 is made steeper than that of the second pulse wave PW2. As a result, in this embodiment, responses to the drive signals are improved and the detection sensitivity is improved in both cases of the electromagnetic induction method and the mutual-capacitance method.

The first electrodes COML and the pixel electrodes 25 are between the third electrodes 24 and the second electrodes TDL serving as the detection electrodes. Also in this case, the first electrodes COML are supplied with the same signals as those for the third electrodes 24, and the pixel electrodes 25 are substantially in the floating state. As a result, the first electrodes COML and the pixel electrodes 25 are excited in phase with the third electrodes 24 and can thus be restrained from hindering the function of the third electrodes 24 as the drive electrodes.

Figure 21:
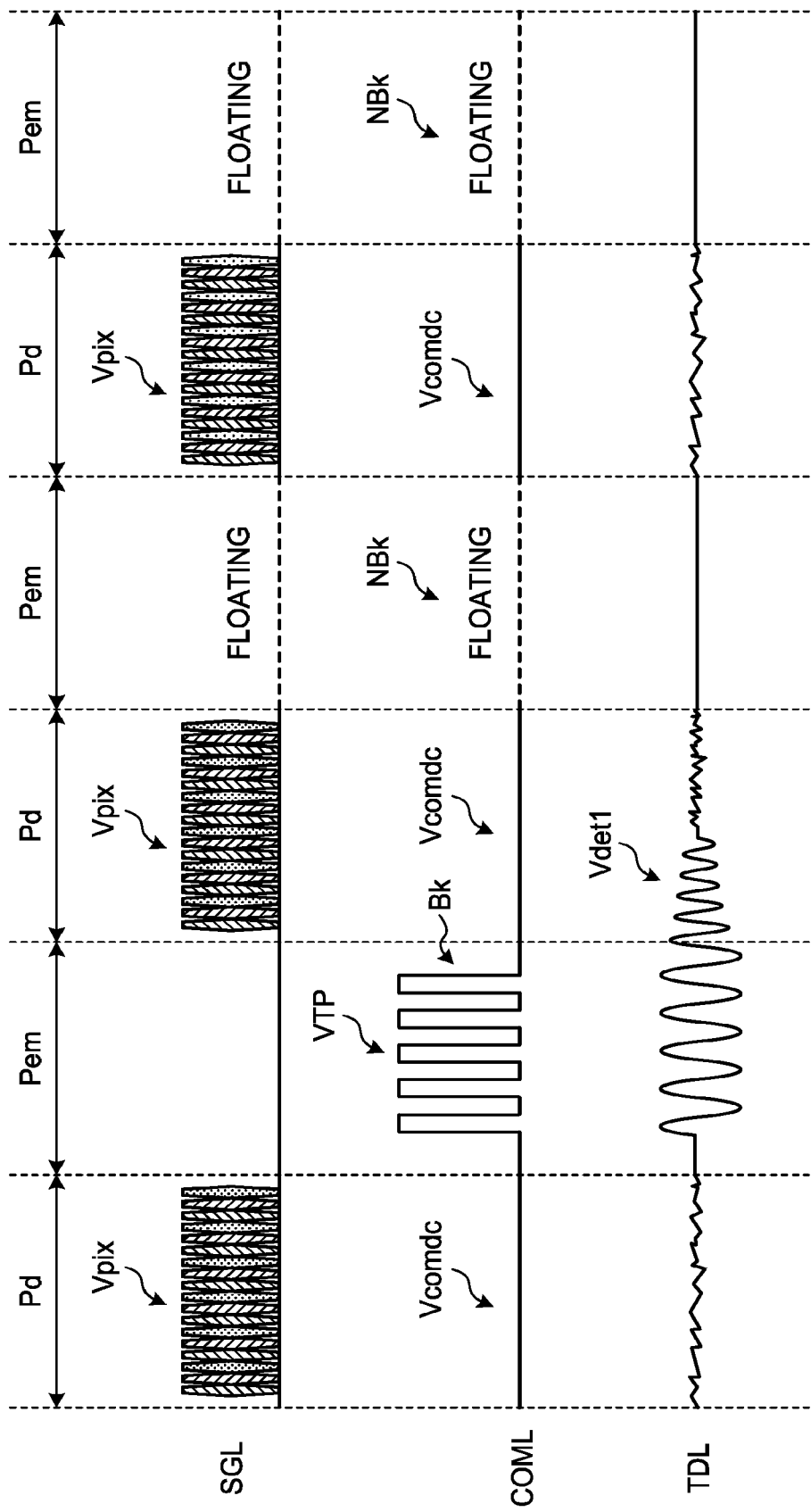
FIG. 21 is a timing waveform diagram illustrating an operation example of the display device according to the first embodiment.
Figure 22:
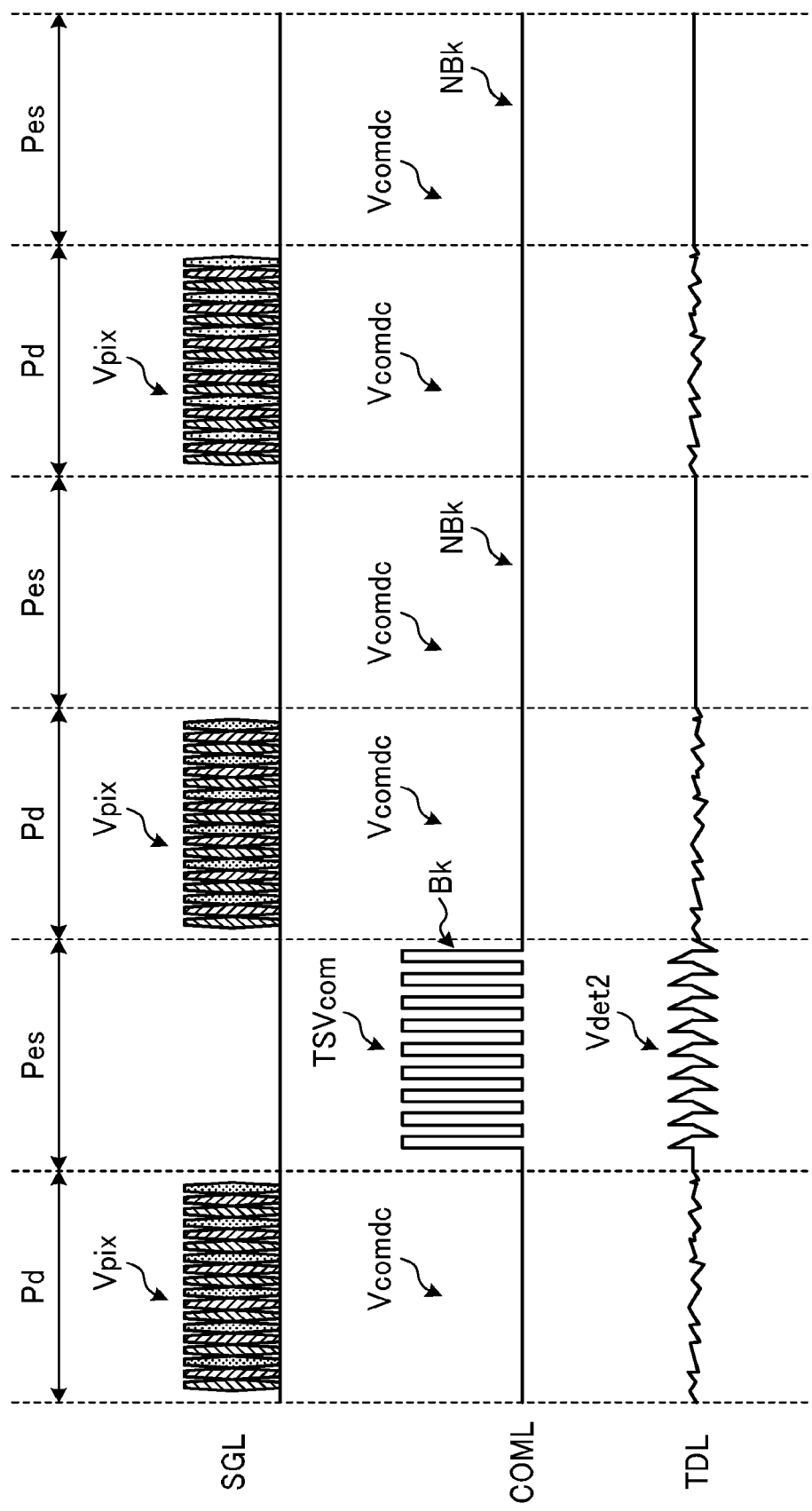
FIG. 22 is a timing waveform diagram illustrating another operation example of the display device according to the first embodiment.

FIG. 21 is a timing waveform diagram illustrating an operation example of the display device according to the first embodiment. FIG. 22 is a timing waveform diagram illustrating another operation example of the display device according to the first embodiment. The display device 1 performs the touch detection operation (detection period) and the display operation (display period) in a time-division manner. The touch detection operation and the display operation may be divided in any way. The following describes, for example, a method in which the touch detection and the display are performed in a time-division manner in one frame period of the display panel 10, that is, in a time required for displaying video information for one screen. FIG. 21 illustrates the example in which the display periods Pd and the first sensing periods Pem are alternately arranged and the operations for the respective periods are alternately performed in a time-division manner. FIG. 22 illustrates the example in which the display periods Pd and the second sensing periods Pes are alternately arranged and the operations for the respective periods are alternately performed in a time-division manner.

As illustrated in FIG. 21, the above-described display operation is performed during the display period Pd. As illustrated in FIG. 10, all the first electrodes COML are selected as the drive electrode block Bk. The driver IC 19 supplies the display drive signal Vcomdc to the drive electrode block Bk through the second wiring L2a and L2b. The display drive signal Vcomdc is also supplied to the third electrode block BkCs opposed to the drive electrode block Bk during the same period.

During the first sensing period Pem, the driver IC 19 alternately supplies the first voltage VTPH and the second voltage VTPL to both ends of the drive electrode block Bk, as illustrated in FIG. 11. This operation supplies the first drive signal VTP to the drive electrode block Bk. The same first drive signal VTP is also supplied to the third electrode block BkCs overlapping with and opposed to the drive electrode block Bk during the same period. The non-selected electrode block NBk and a non-selected third electrode block NBkCs are not supplied with the first drive signal VTP and are placed in the floating state.

In this manner, during the first sensing period Pem, the first electrodes COML provided on the second substrate (refer to FIGS. 5 and 17) and the third electrodes 24 provided on the first substrate 21 are simultaneously driven. As a result, the strength of the magnetic field M2 can be increased. The first electrodes COML in the non-selected electrode block NBk are brought into the floating state.

The electromotive force caused by the electromagnetic induction generated by the first drive signal VTP is generated in the second electrodes TDL. The first detection signal Vdet1 corresponding to this electromotive force is supplied to the first AFE 47A during a period overlapping with the display period Pd. In this embodiment, the second electrodes TDL are provided on a side of the light guide plate 91 (refer to FIGS. 5 and 9) opposite to a side thereof facing the liquid crystal layer 6 serving as the display functional layer. This configuration causes the distance between the second electrode TDL and the liquid crystal layer 6 to be greater than that in the case where the second electrodes TDL are provided between the light guide plate 91 and the second substrate 31, such as between the second substrate 31 and the adhesive layer 35. As a result, during the display period Pd, the first detection signal Vdet1 is restrained from varying the liquid crystal layer 6, and thus, display quality can be restrained from deteriorating.

During the second sensing period Pes illustrated in FIG. 22, the driver IC 19 supplies the second drive signal TSVcom to the drive electrode block Bk, as illustrated in FIG. 11. The same second drive signal TSVcom is also supplied to the third electrode block BkCs overlapping with and opposed to the drive electrode block Bk during the same period. The second detection signal Vdet2 corresponding to the change in the electrostatic capacitance between the first electrodes COML and the second electrodes TDL is supplied from the second electrodes TDL to the second AFE 47B (refer to FIG. 9). The non-selected electrode block NBk and the non-selected third electrode block NBkCs are supplied with the display drive signal Vcomdc. The non-selected electrode block NBk and the non-selected third electrode block NBkCs may have any fixed potential and be supplied with the second voltage VTPL.

During the second sensing period Pes, the display device 1 detects the finger in contact with or in proximity to the detection surface (the first surface 97a of the sensor substrate 97 or the surface of the protective layer 98). However, the display device 1 is not limited to this configuration. The display device 1 can detect, for example, the force applied to the detection surface. The following describes the touch detection and the force detection during the second sensing period Pes, with reference to FIGS. 23 to 34.

Figure 23:
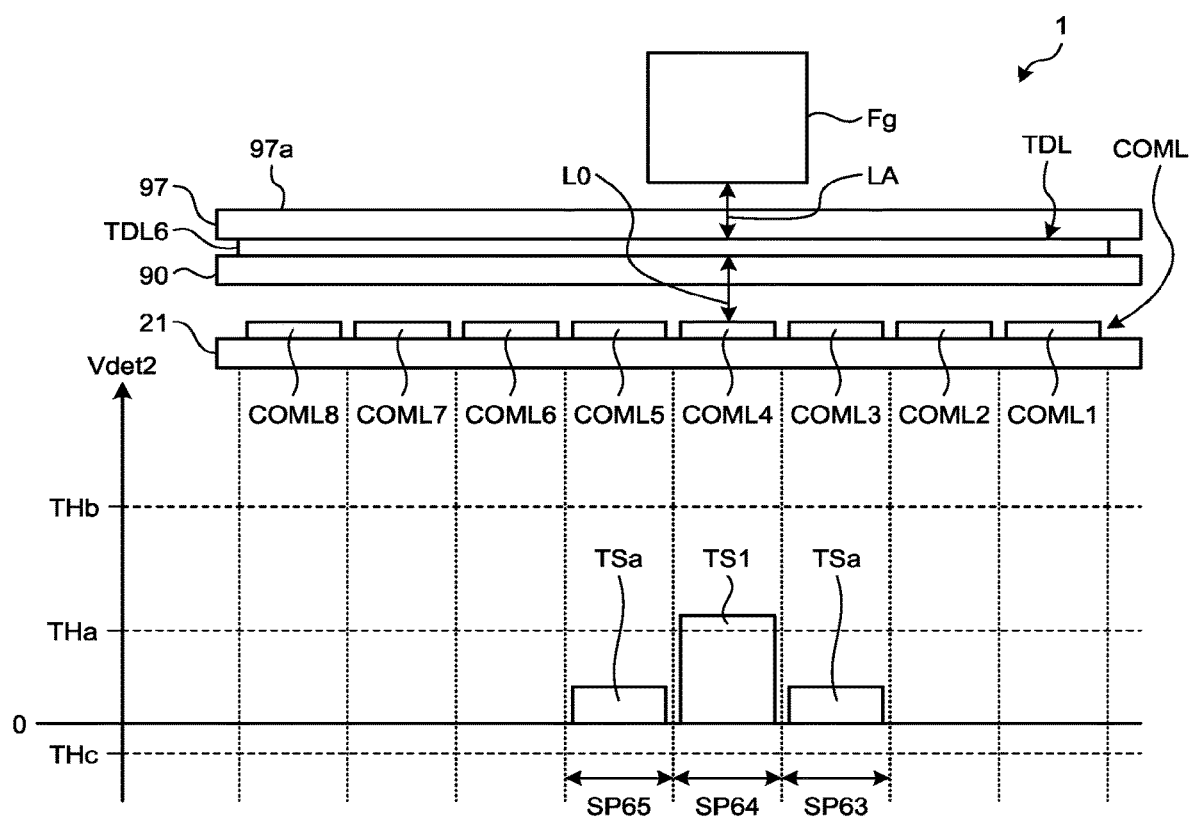
FIG. 23 is an explanatory diagram for explaining a relation between a position of a finger and a second detection signal when the finger is in proximity to a detection surface.
Figure 24:
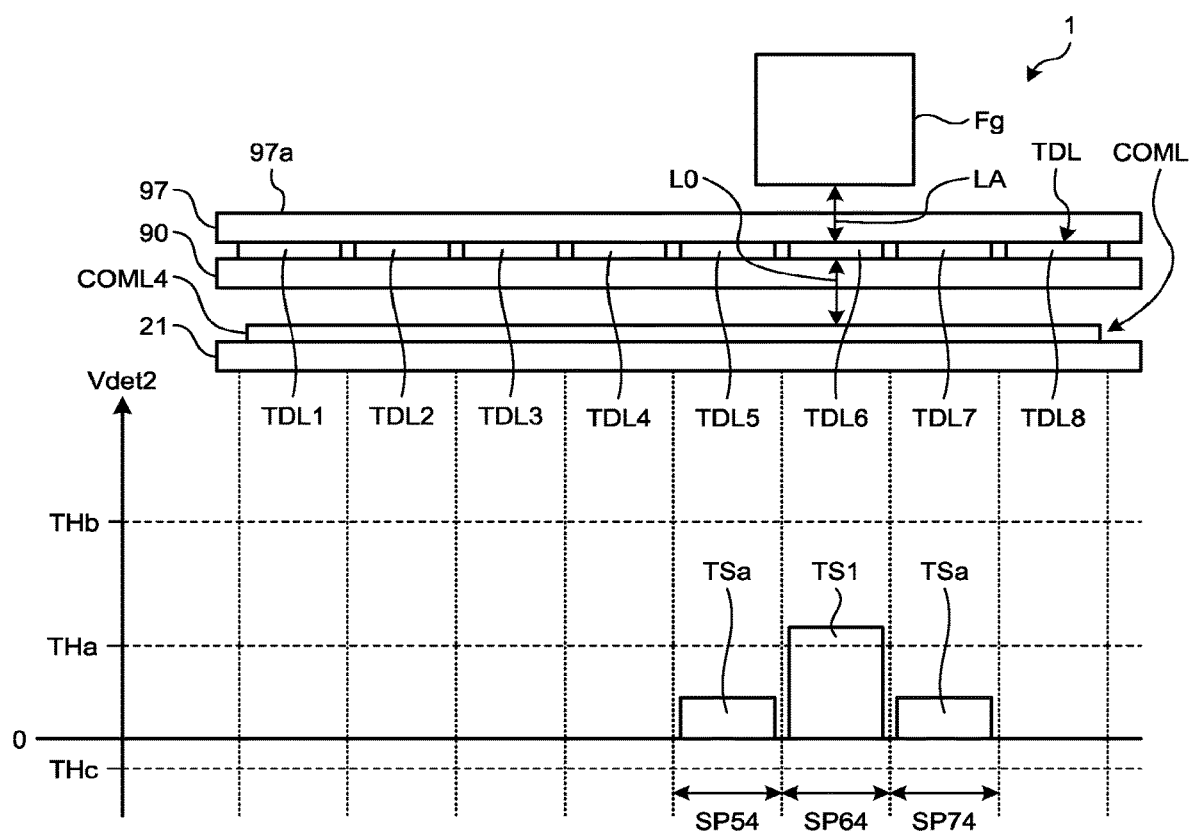
FIG. 24 is another explanatory diagram for explaining the relation between the position of the finger and the second detection signal when the finger is in proximity to the detection surface.
Figure 25:
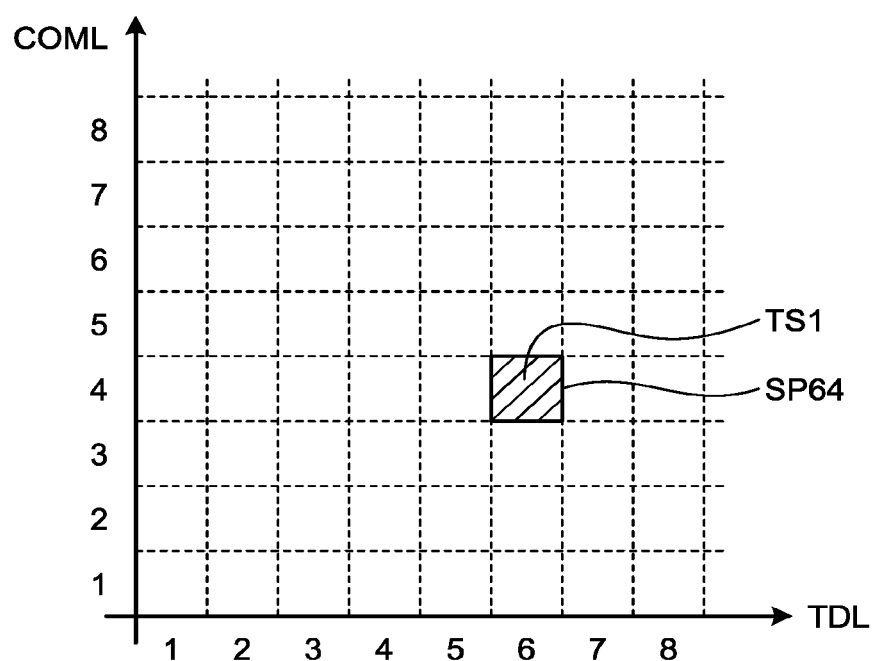
FIG. 25 is an explanatory diagram for explaining a distribution of the second detection signals in a plan view when the finger is in proximity to the detection surface.
Figure 26:
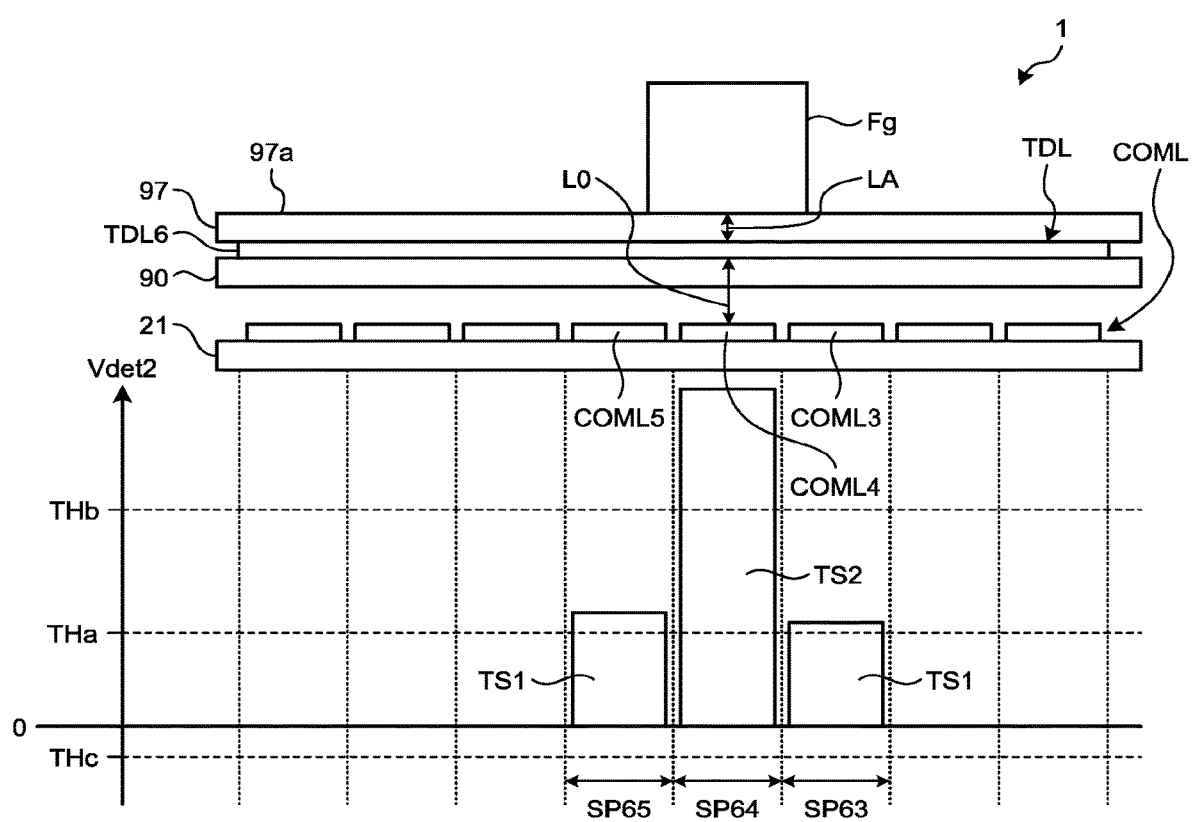
FIG. 26 is an explanatory diagram for explaining the relation between the position of the finger and the second detection signal when the finger is in contact with the detection surface.
Figure 27:
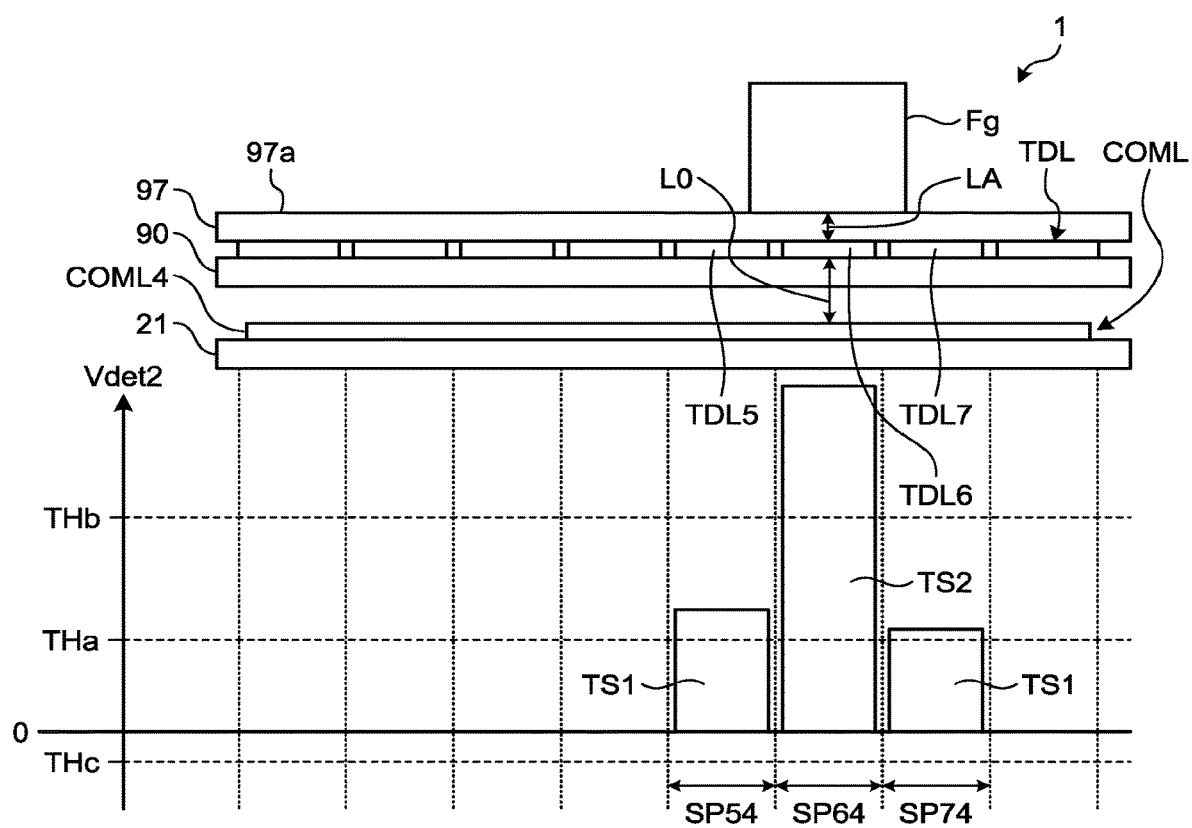
FIG. 27 is another explanatory diagram for explaining the relation between the position of the finger and the second detection signal when the finger is in contact with the detection surface.
Figure 28:
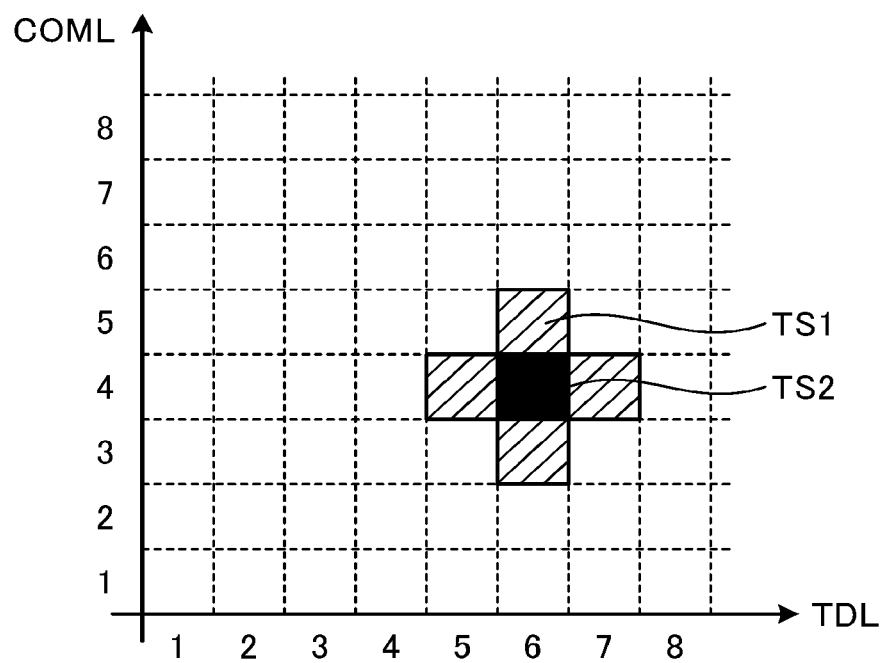
FIG. 28 is an explanatory diagram for explaining the distribution of the second detection signals in the plan view when the finger is in contact with the detection surface.
Figure 29:
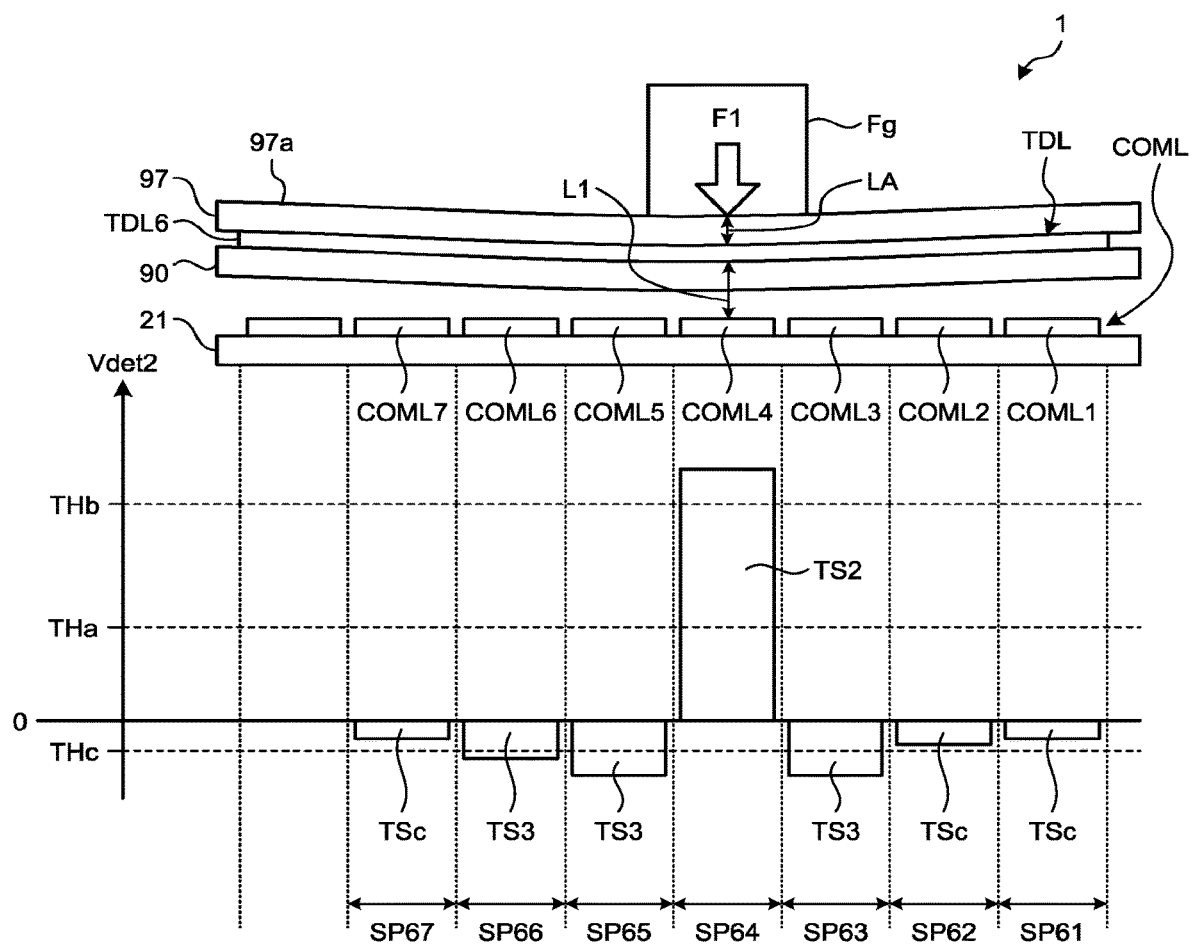
FIG. 29 is an explanatory diagram for explaining the relation between the position of the finger and the second detection signal when the finger applies a force F1 to the detection surface.
Figure 30:
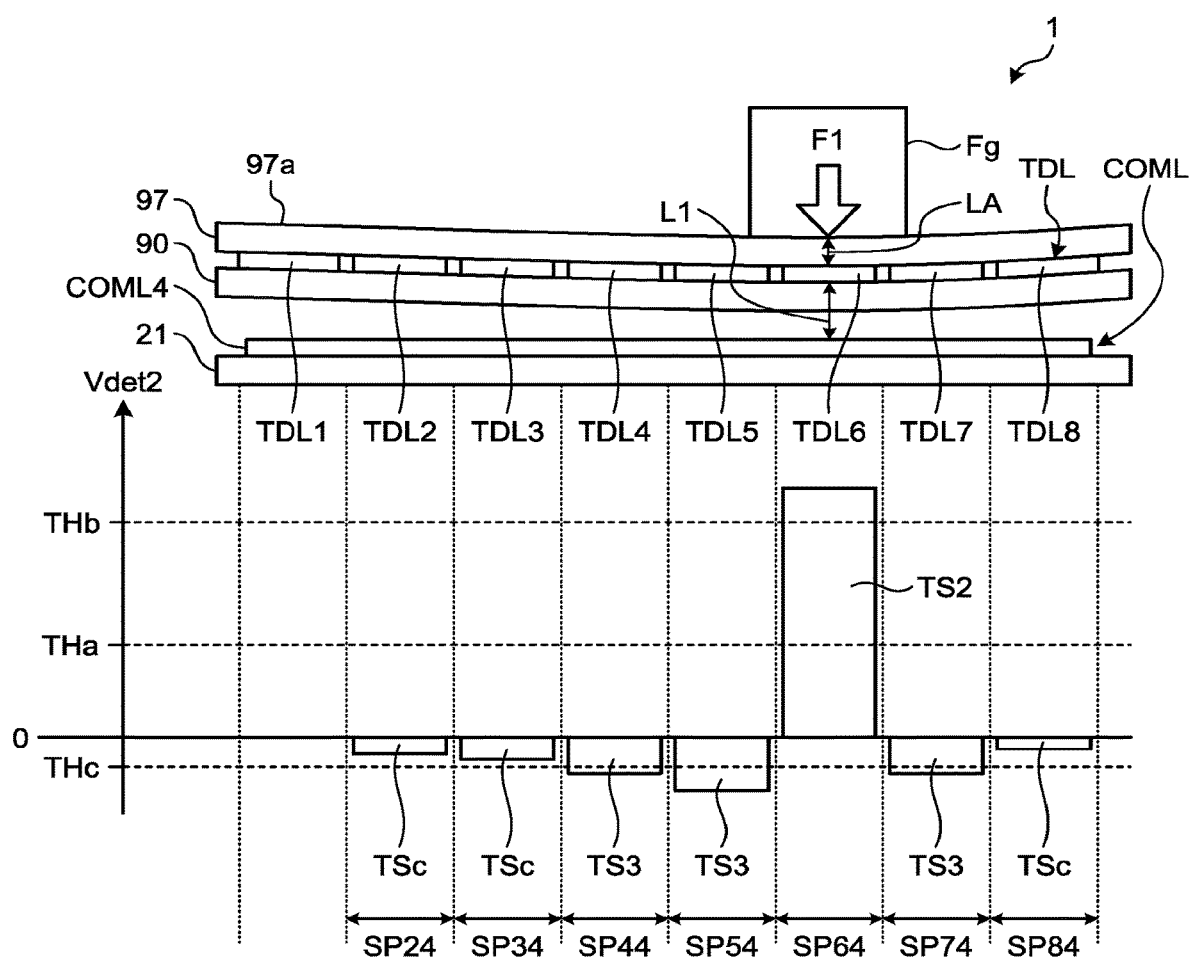
FIG. 30 is another explanatory diagram for explaining the relation between the position of the finger and the second detection signal when the finger applies the force F1 to the detection surface.
Figure 31:
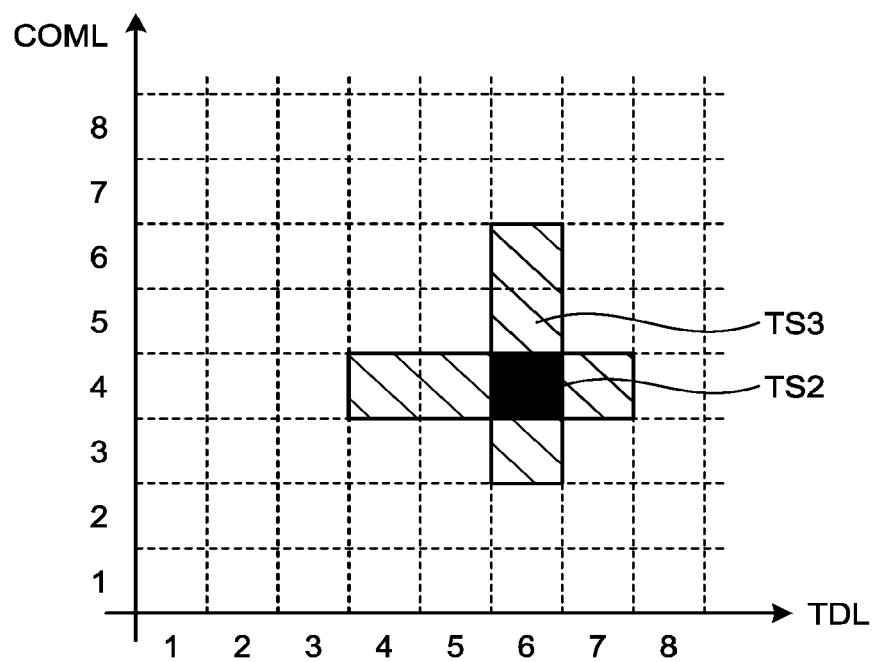
FIG. 31 is an explanatory diagram for explaining the distribution of the second detection signals in the plan view when the finger applies the force F1 to the detection surface.
Figure 32:
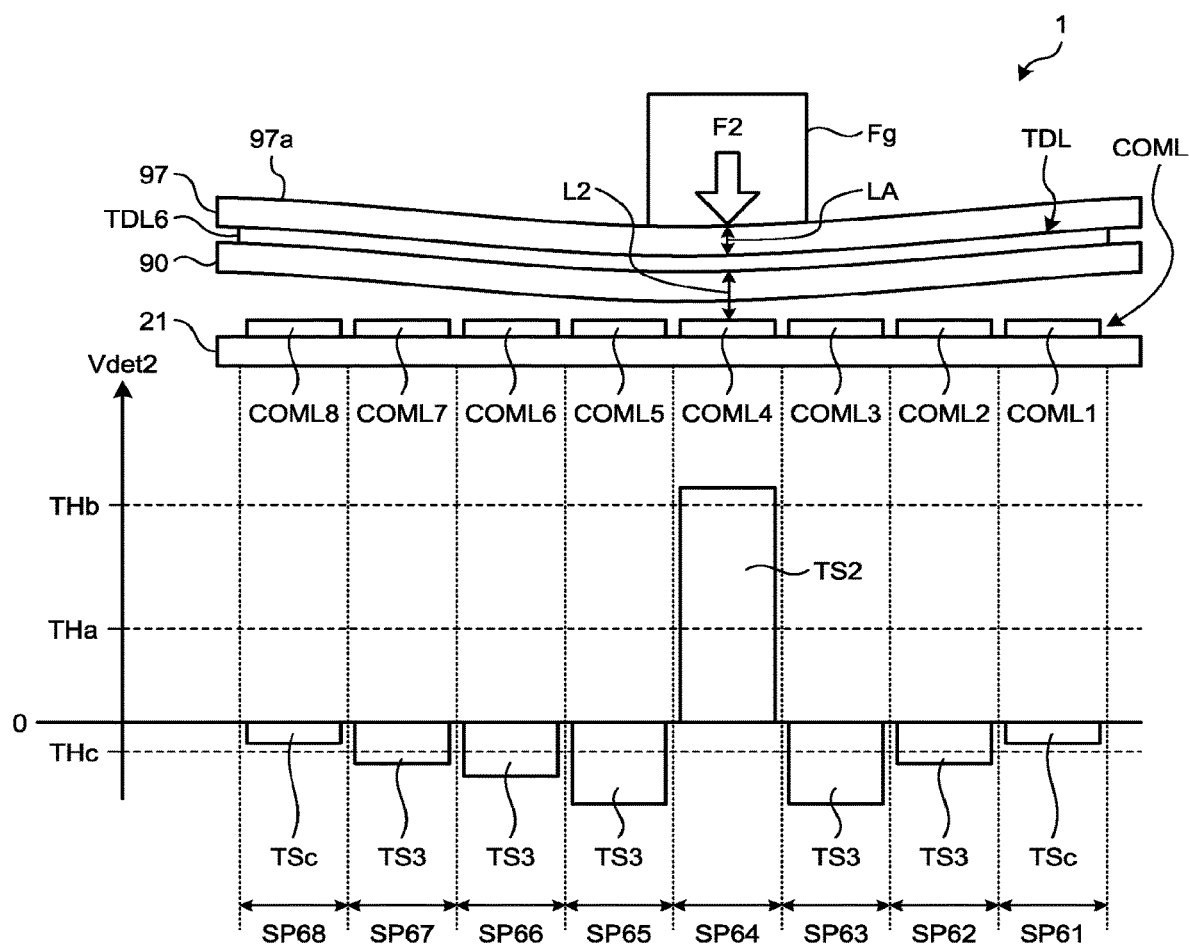
FIG. 32 is an explanatory diagram for explaining the relation between the position of the finger and the second detection signal when the finger applies a force F2 to the detection surface.
Figure 33:
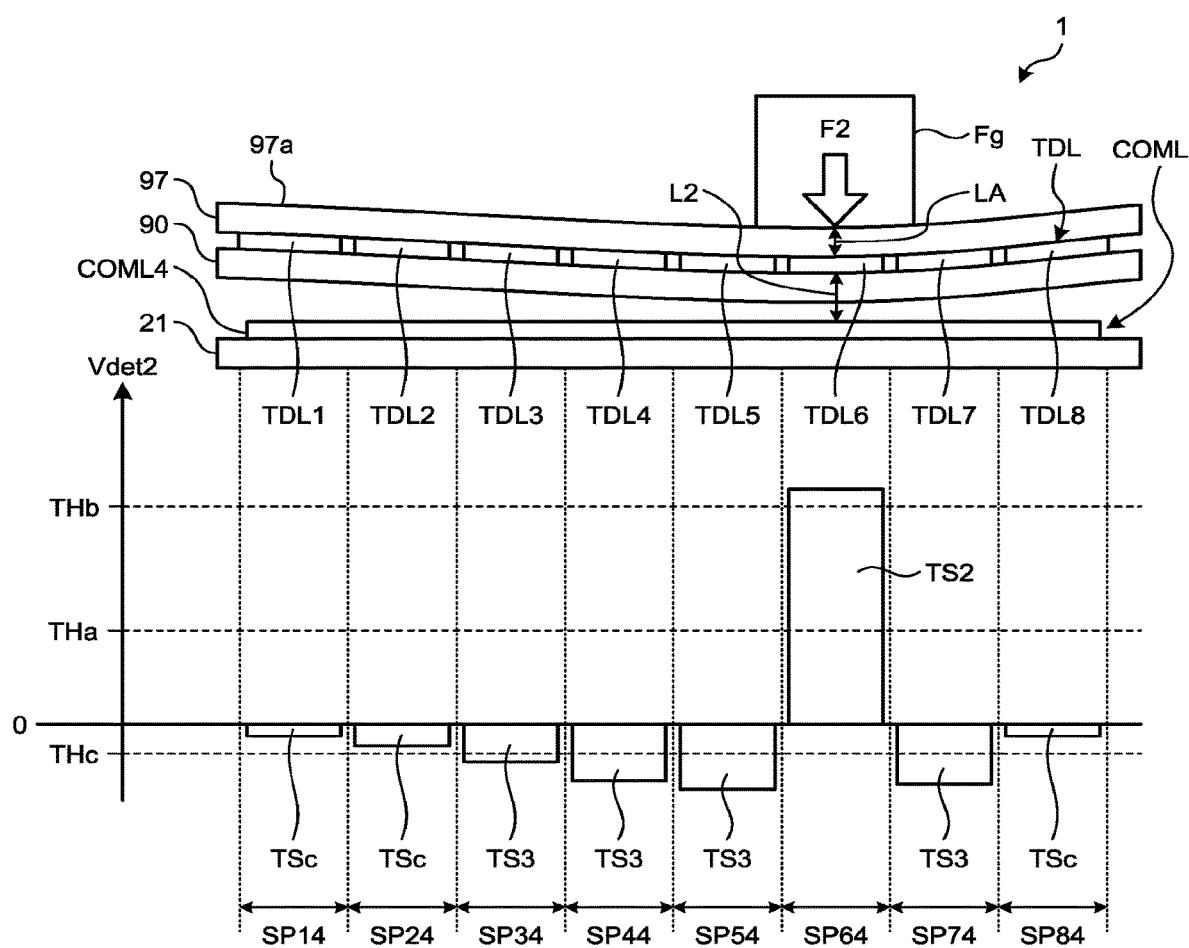
FIG. 33 is another explanatory diagram for explaining the relation between the position of the finger and the second detection signal when the finger applies the force F2 to the detection surface.
Figure 34:
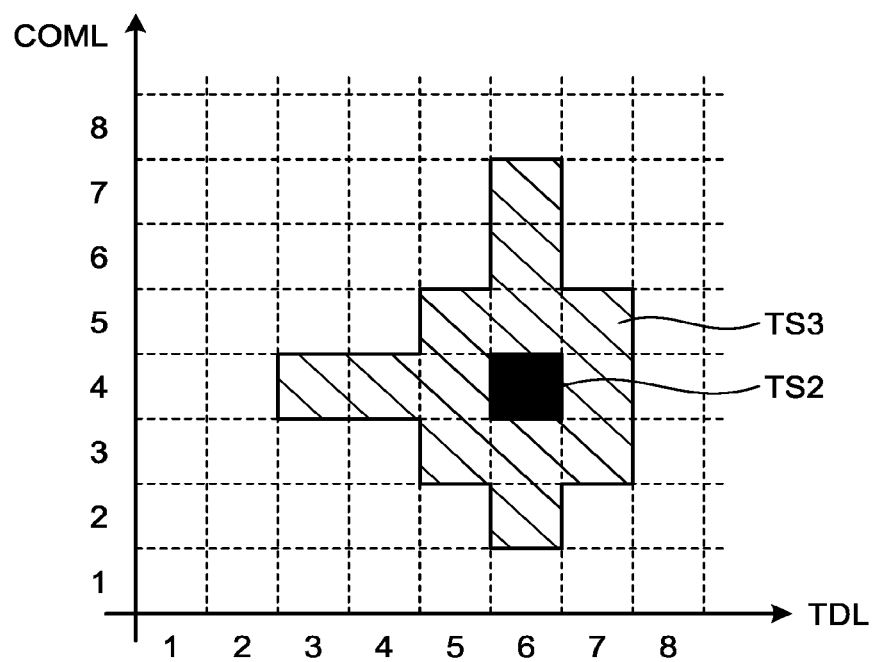
FIG. 34 is an explanatory diagram for explaining the distribution of the second detection signals in the plan view when the finger applies the force F2 to the detection surface.

FIG. 23 is an explanatory diagram for explaining a relation between the position of a finger and the second detection signal when the finger is in proximity to the detection surface. FIG. 24 is another explanatory diagram for explaining the relation between the position of the finger and the second detection signal when the finger is in proximity to the detection surface. FIG. 25 is an explanatory diagram for explaining a distribution of the second detection signals in the plan view when the finger is in proximity to the detection surface. FIG. 26 is an explanatory diagram for explaining the relation between the position of the finger and the second detection signal when the finger is in contact with the detection surface. FIG. 27 is another explanatory diagram for explaining the relation between the position of the finger and the second detection signal when the finger is in contact with the detection surface. FIG. 28 is an explanatory diagram for explaining the distribution of the second detection signals in the plan view when the finger is in contact with the detection surface. FIG. 29 is an explanatory diagram for explaining the relation between the position of the finger and the second detection signal when the finger applies a force F1 to the detection surface. FIG. 30 is another explanatory diagram for explaining the relation between the position of the finger and the second detection signal when the finger applies the force F1 to the detection surface. FIG. 31 is an explanatory diagram for explaining the distribution of the second detection signals in the plan view when the finger applies the force F1 to the detection surface. FIG. 32 is an explanatory diagram for explaining the relation between the position of the finger and the second detection signal when the finger applies a force F2 to the detection surface. FIG. 33 is another explanatory diagram for explaining the relation between the position of the finger and the second detection signal when the finger applies the force F2 to the detection surface. FIG. 34 is an explanatory diagram for explaining the distribution of the second detection signals in the plan view when the finger applies the force F2 to the detection surface.

FIG. 23 illustrates the relation between the position of a finger Fg with respect to the display device 1 and the second detection signal Vdet2 when viewed from the first direction Dx of FIG. 9. The example illustrated therein indicates the second detection signals Vdet2 output from the second electrode TDL6 when the first electrodes COML1 to COML8 are sequentially driven. FIG. 24 illustrates the relation between the position of the finger Fg with respect to the display device 1 and the second detection signal Vdet2 when viewed from the second direction Dy. The example illustrated therein indicates the second detection signals Vdet2 output from the second electrodes TDL1 to TDL8 when the first electrode COML4 is driven. FIG. 25 illustrates the distribution of the second detection signals Vdet2 when viewed from the third direction Dz in FIG. 9. The same descriptions apply to FIGS. 26 to 34.

FIGS. 23 to 34 do not illustrate the protective layer 98, and the description will be made assuming the first surface 97a of the sensor substrate 97 as the detection surface. The present disclosure is, however, not limited to this configuration. The surface of the protective layer 98 serves as the detection surface when the protective layer 98 is provided. As illustrated in FIGS. 23 to 34, a reference value is defined as a value of the second detection signal Vdet2 in an initial state where the finger Fg is neither in contact with nor in proximity to the detection surface. In FIGS. 23 to 34, the reference value is zero. A first threshold THa is defined as a positive threshold higher than the reference value. A second threshold THb is defined as a positive threshold higher than the first threshold THa. A third threshold THc is defined as a negative threshold lower than the reference value. Among the second detection signals Vdet2 having positive values equal to or higher than the reference value, a second detection signal Vdet2 equal to or higher than the first threshold THa and lower than the second threshold THb is referred to as a touch signal TS1. Among the second detection signals Vdet2 having positive values equal to or higher than the reference value, a second detection signal Vdet2 equal to or higher than the second threshold THb is referred to as a touch signal TS2. A second detection signal Vdet2 equal to or higher than the reference value and lower than the first threshold THa is referred to as a touch signal TSa. Among the second detection signals Vdet2 having negative values lower than the reference value, a second detection signal Vdet2 equal to or lower than the third threshold THc is referred to as a touch signal TS3, and a second detection signal Vdet2 lower than the reference value and higher than the third threshold THc is referred to as a touch signal TSc.

The display device 1 detects the position of the finger Fg and the force applied by the finger Fg based on the level and the position of each touch signal among the second detection signals Vdet2. Such detection of the position of the finger Fg and the force applied by the finger Fg is performed after detection of, for example, a distribution of the interelectrode capacitance between the first electrodes COML and the second electrodes TDL over one screen.

A position SPij denotes a position where an i-th second electrode TDLi of the second electrodes TDL intersects with a j-th first electrode COMLj of the first electrodes COML. For example, a position SP64 denotes a position where the second electrode TDL6 intersects with the first electrode COML4. The interelectrode capacitance at the position SPij represents capacitance generated between the first electrode COMLj and the second electrode TDLi when the second drive signal TSVcom is supplied to the first electrode COMLj.

As illustrated in FIGS. 23 and 24, the finger Fg is in proximity to the detection surface at the position SP64. The finger Fg is in proximity to the detection surface at the position SP64, at a distance LA from the second electrode TDL6. A distance L0 is defined as a distance between the first electrode COML and the second electrode TDL.

The proximity of the finger Fg reduces the interelectrode capacitance between the first electrodes COML and the second electrodes TDL at the position SP64 and at the periphery of the position SP64 to lower than the interelectrode capacitance at other positions. As a result, as illustrated in FIG. 23, the touch signal TS1 is generated at the position SP64, and the touch signals TSa are generated at a position SP63 and a position SP65. The touch signals TSa are also generated at a position SP54 and a position SP74, as illustrated in FIG. 24.

As illustrated in FIG. 25, the touch signal TS1 is represented as an area shaded with oblique lines. All of the second detection signals Vdet2 obtained in this area are positive touch signals. FIG. 25 does not illustrate the touch signal TSa lower than the first threshold THa. Since the touch signal TS1 is detected only at the position SP64, the detector 40 (refer to FIG. 1) can detect that the finger Fg is located so as to be centered on the position SP64. The detector 40 can also detect that the finger Fg is in proximity to the detection surface based on the level (signal value) of the touch signal TS1 obtained at the position SP64. The detector 40 can detect that the finger Fg is located at the distance LA from the second electrode TDL, based on such a distribution of the second detection signals Vdet2.

Then, as illustrated in FIGS. 26 and 27, the finger Fg is in contact with the detection surface at the position SP64. The distance LA between the finger Fg and the second electrode TDL is reduced to the minimum value. At this time, the interelectrode capacitance at the position SP64 is smaller than the interelectrode capacitance in FIGS. 23 and 24. The distance L0 at this time is equal to the distance L0 in FIGS. 23 and 24.

As illustrated in FIG. 26, the touch signal TS2 is generated at the position SP64, and the touch signal TS1 is generated at each of the position SP65 and the position SP63. The touch signal TS1 is also generated at each of the position SP54 and the position SP74, as illustrated in FIG. 27.

As illustrated in FIG. 28, the touch signal TS2 is represented as an area filled with black. All of the second detection signals Vdet2 obtained in this area are positive touch signals. Since the touch signal TS2 obtained at the position SP64 is the highest in the distribution of the second detection signals Vdet2, the detector 40 can detect that the finger Fg is located so as to be centered on the position SP64. The detector 40 can also detect that the finger Fg is in contact with the detection surface based on the distribution of the touch signals TS1 at the positions SP63, SP65, SP54, and SP74 on the periphery of the position SP64.

As illustrated in FIGS. 23 to 28, when the finger Fg is in proximity to or in contact with the detection surface, for example, all the values of the obtained second detection signals Vdet2 are positive. The detector 40 can detect that the finger Fg is present at a position SP where the second detection signal Vdet2 having the highest value is detected, and can also detect the extent of proximity of the finger Fg or detect whether the finger Fg is in contact with the detection surface, based on the distribution of the second detection signals Vdet2 at the periphery of the position SP.

As illustrated in FIGS. 29 and 30, the finger Fg applies the force F1 to the detection surface at the position SP64. At this time, the distance LA between the finger Fg and the second electrode TDL has the minimum value. At this time, the interelectrode capacitance at the position SP64 is larger than the interelectrode capacitance illustrated in FIGS. 26 and 27. At this time, a distance L1 between the first electrode COML and the second electrode TDL is smaller than the distance L0 illustrated in FIGS. 23 to 27. The interelectrode capacitance is obtained by adding a first amount and second amount. The first amount is an amount of reduction from initial capacitance generated because the distance LA is reduced to the minimum value. The second amount is an amount of increase from the initial capacitance generated because the distance L0 is reduced to the distance L1.

As illustrated in FIGS. 29 and 30, at the periphery of the position SP64, the distance L1 is smaller than the distance L0 at each of the positions SP61, SP62, SP63, SP65, SP66, SP67, SP24, SP34, SP44, SP54, SP74, and SP84. As a result, the interelectrode capacitance is larger than the initial capacitance.

As illustrated in FIG. 29, the contact with the detection surface by the finger Fg generates the touch signal TS2 at the position SP64. The reduction in the distance L1 caused by the force F1 generates the negative touch signal TS3 at each of the position SP63, the position SP65, and the position SP66. In the same manner, the negative touch signal TSc is generated at each of the position SP61, the position SP62, and the position SP67. As illustrated in FIG. 30, the negative touch signal TS3 is generated at each of the position SP44, the position SP54, and the position SP74. The negative touch signal TSc is generated at each of the position SP24, the position SP34, and the position SP84.

As illustrated in FIG. 31, the touch signal TS3 is represented as an area shaded with upper left to lower right oblique lines. Of all the second detection signals Vdet2 obtained in this area, only a signal at the position SP64 represents the positive touch signal TS2, and all signals at the positions SP other than the position SP64 represent the negative touch signals TS3. The negative touch signal TSc higher than the third threshold THc is not illustrated. Since the positive touch signal TS2 is detected only at the position SP64, the detector 40 can detect that the finger Fg is located so as to be centered on the position SP64. Since the negative touch signal TS3 is obtained at each of the positions SP63, SP65, SP66, SP44, SP54, and SP74 on the periphery of the position SP64, the detector 40 can detect that the finger Fg applies the force to the detection surface. In other words, the detector 40 can simultaneously detect the position SP of the finger Fg and the force F1.

As illustrated in FIGS. 32 and 33, the finger Fg applies the force F2 to the detection surface at the position SP64. The force F2 is larger than the force F1. At this time, the distance LA between the finger Fg and the second electrode TDL has the minimum value. At this time, the interelectrode capacitance at the position SP64 is larger than the interelectrode capacitance illustrated in FIGS. 29 and 30. A distance L2 at this time is smaller than the distance L1 illustrated in FIGS. 29 and 30. The interelectrode capacitance is obtained by adding a first amount and a second amount. The first amount is an amount of reduction from the initial capacitance generated because the distance LA is reduced to the minimum value. The second amount is an amount of increase from the initial capacitance generated because the distance L0 is reduced to the distance L2.

As illustrated in FIG. 32, the contact with the detection surface by the finger Fg generates the touch signal TS2 at the position SP64. The reduction in the distance L2 caused by the force F2 generates the negative touch signal TS3 at each of the position SP62, the position SP63, the position SP65, the position SP66, and the position SP67. In the same manner, the negative touch signal TSc is generated at each of the position SP61 and the position SP68. As illustrated in FIG. 33, the negative touch signal TS3 is generated at each of the position SP34, the position SP44, the position SP54, and the position SP74. The negative touch signal TSc is generated at each of the position SP14, the position SP24, and the position SP84. Since the interelectrode capacitance at each of the positions SP is larger than the interelectrode capacitance in FIGS. 29 and 30, the touch signal TS2 generated at the position SP64 is lower than the touch signal TS2 illustrated in FIGS. 29 and 30.

As illustrated in FIG. 34, the touch signal TS3 is also generated at each of the positions SP53, SP55, SP73, and SP75. Only a signal at the position SP64 represents the positive touch signal TS2, and all signals at the positions other than the position SP64 represent the negative touch signals TS3. The negative touch signal TSc higher than the third threshold THc is not illustrated. Since the positive touch signal TS2 is detected only at the position SP64, the detector 40 can detect that the finger Fg is located so as to be centered on the position SP64. The negative touch signal TS3 is obtained at the each of positions SP62, SP63, SP65, SP66, SP67, SP34, SP44, SP54, SP74, SP53, SP55, SP73, and SP75 on the periphery of the position SP64. This result allows the detector 40 to detect that the finger Fg applies the force to the detection surface. Since the force F2 is larger than the force F1, the touch signal TS3 illustrated in FIG. 34 is detected in a wider distribution than that in FIG. 31. Hence, the detector 40 can detect that the finger Fg applies the force F2 to the detection surface based on the distribution of the second detection signals Vdet2. In the same manner as in FIGS. 29 and 30, the detector 40 can simultaneously detect the position SP of the finger Fg and the magnitude of the force F2.

As described above, the display device 1 according to this embodiment includes the first electrodes COML and the second electrodes TDL that can detect the proximity or contact of the finger Fg, and the distances L between the first electrodes COML and the second electrodes TDL change with the force. Consequently, while the finger Fg applies the force, the second electrode TDL comes closer to the first electrode COML to increase the interelectrode capacitance whereas the finger Fg is in contact with the detection surface to reduce the interelectrode capacitance. In particular, in the pressed portion where the finger Fg applies the force, the amount of reduction in interelectrode capacitance caused by the contact of the finger Fg is larger than the amount of increase in interelectrode capacitance caused by the reduction of the distance L. As a result, the capacitance in the pressed portion is smaller than the initial capacitance in the initial state where the finger Fg does not apply the force. In contrast, at the periphery of the pressed portion, the interelectrode capacitance thereof is larger than the initial capacitance because the amount of increase in interelectrode capacitance is larger than the amount of reduction in interelectrode capacitance. By detecting such a change in interelectrode capacitance, the detector 40 can detect whether the finger Fg applies the force, and the position of the force.

The distance L between the first electrode COML and the second electrode TDL changes with the magnitude of the force. In this embodiment, the second electrodes TDL are provided on the side of the light guide plate 91 (refer to FIGS. 5 and 9) opposite to the side thereof facing the liquid crystal layer 6 serving as the display functional layer. This configuration causes the distance L between the first electrode COML and the second electrode TDL to be greater than that in the case where the second electrodes TDL are provided between the light guide plate 91 and the second substrate 31, such as between the second substrate 31 and the adhesive layer 35. As illustrated in FIG. 5, the adhesive layer 55 is provided between the light guide plate 91 and the polarizing plate 36, and the adhesive layer 56 is provided between the light guide plate 91 and the second electrodes TDL. A soft resin material that is deformed by the force applied by the finger Fg is used as the adhesive layers 55 and 56. For example, a silicon-based adhesive is used as the adhesive layers 55 and 56. This configuration causes the distance L between the first electrode COML and the second electrode TDL to be easily changeable with the magnitude of the force, and allows the display device 1 to well detect the force.

As described above, during the second sensing period Pes, the display device 1 can detect the position of the detection target body and the force applied to the detection surface based on the distribution of the signals (second detection signals Vdet2) corresponding to the change in the electrostatic capacitance between the first electrodes COML and the second electrodes TDL.

FIGS. 23 to 34 illustrate the case where the number of the second electrodes TDL is eight and the number of the first electrodes COML is eight. However, the numbers of them are not limited to eight. The numbers of the second electrodes TDL and the first electrodes COML may be each two or larger to seven or smaller, or nine or larger. The thresholds are not limited to the illustrated ranges. The thresholds may have narrower ranges. The thresholds are used as ranges for the level of the second detection signal Vdet2. However, the detector 40 may detect the position and the force based on increase or decrease of the second detection signal Vdet2 from the reference value, instead of by setting the thresholds. FIGS. 23 to 34 each illustrate an example in which the finger Fg is located so as to be centered on the position SP where one of the second electrodes TDL intersects with one of the first electrodes COML. However, the size of the finger Fg and the sizes of the second electrodes TDL and the first electrodes COML are not limited, and the finger Fg may simultaneously apply forces to a plurality of positions SP in some cases. In such cases, the obtained second detection signals Vdet2 have a more complicated distribution as the numbers of the second electrodes TDL and the first electrodes COML corresponding to the positions of the finger Fg increase.

Figure 35:
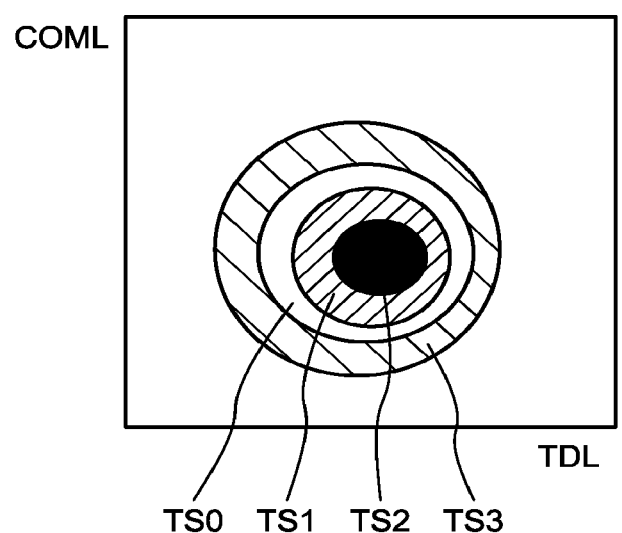
FIG. 35 is an explanatory diagram for explaining the distribution of the second detection signals in the plan view when the finger applies the force F1 to the detection surface.
Figure 36:
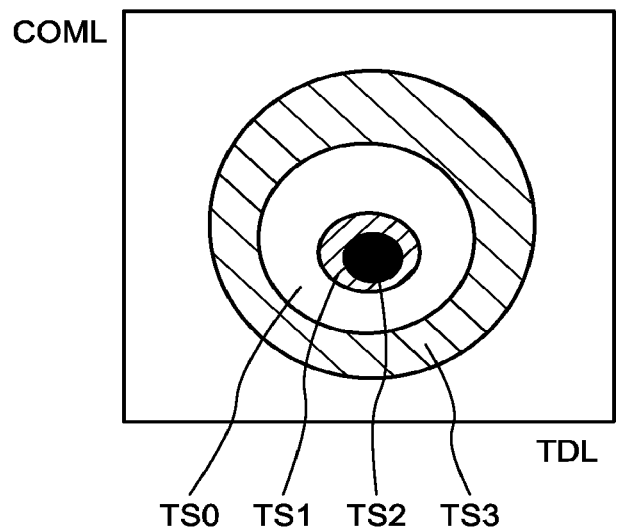
FIG. 36 is an explanatory diagram for explaining the distribution of the second detection signals in the plan view when the finger applies the force F2 to the detection surface.
Figure 37:
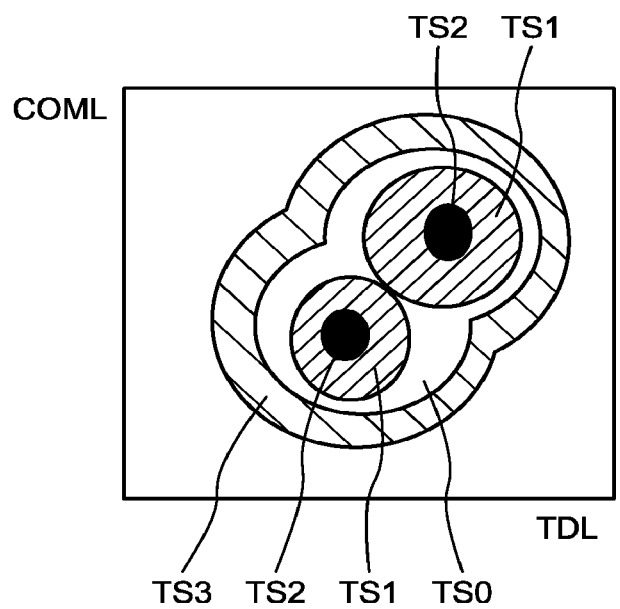
FIG. 37 is an explanatory diagram for explaining the distribution of the second detection signals in the plan view when a plurality of fingers apply the force F1 to the detection surface.

The following describes another example of the touch detection and the force detection. FIG. 35 is an explanatory diagram for explaining the distribution of the second detection signals in the plan view when the finger applies the force F1 to the sensor substrate. FIG. 36 is an explanatory diagram for explaining the distribution of the second detection signals in the plan view when the finger applies the force F2 to the sensor substrate. FIG. 37 is an explanatory diagram for explaining the distribution of the second detection signals in the plan view when a plurality of fingers apply the force F1 to the sensor substrate. In FIGS. 35 to 37, the numbers of the first electrodes COML and the second electrodes TDL are not limited, and the distribution of the obtained second detection signals Vdet2 is indicated by smooth curves. The distribution of the second detection signals Vdet2 becomes more similar to the curves illustrated in FIGS. 35 to 37 as the numbers of the first electrodes COML and the second electrodes TDL increase.

In the same manner as FIGS. 29 to 31, FIG. 35 illustrates the distribution of the second detection signals Vdet2 when the finger Fg applies the force F1 to the detection surface. As illustrated in FIG. 35, the distribution of the touch signals TS1 surrounds the distribution of the touch signals TS2. In addition, the distribution of the touch signals TS3 surrounds the distribution of the touch signals TS1, and a region TS0 is interposed between the distributions of the touch signal TS1 and the touch signal TS3. The detector 40 can detect the position of the finger Fg and also detect that the finger Fg applies the force F1 to the detection surface, by detecting the distribution of the second detection signals Vdet2 described above. In the state where the finger Fg is in proximity to or in contact with the detection surface, the distribution of the touch signal TS1 surrounds the distribution of the touch signals TS2, and the touch signal TS3 is not detected. Thus, the detector 40 can detect the position of the finger Fg, and detect that the force is not applied.

In the same manner as FIGS. 32 to 34, FIG. 36 illustrates the distribution of the second detection signals Vdet2 when the finger Fg applies the force F2 to the detection surface. As illustrated in FIG. 36, the distribution of the touch signal TS1 surrounds the distribution of the touch signals TS2. In addition, the distribution of the touch signal TS3 surrounds the distribution of the touch signals TS1, and the region TS0 is interposed between the distributions of the touch signal TS1 and the touch signal TS3. In FIG. 36, the area of each of the distributions of the touch signals TS1 and the touch signals TS2 is smaller than, and the area of each of the region TS0 and the distribution of the touch signal TS3 is larger than, those in FIG. 35. The detector 40 can detect the position of the finger Fg and also detect that the finger Fg applies the force F2 to the detection surface, by detecting the distribution of the second detection signals Vdet2 described above.

In FIG. 37, two distributions of the touch signals TS2 are detected. The distributions of the touch signals TS1 individually surrounds the two distributions of the touch signals TS2. The distribution of the touch signal TS3 surrounds the two distributions of the touch signals TS1, and the region TS0 is interposed between the distributions of the touch signals TS1 and the distribution of the touch signals TS3. The detector 40 can detect the positions and forces of the two fingers Fg by detecting the distribution of the second detection signals Vdet2 described above. The present disclosure is, however, not limited to the case where the number of the fingers Fg is two. The detector 40 can also detect the positions and forces in the case where three or more fingers Fg simultaneously apply forces.

Second Embodiment

Figure 38:
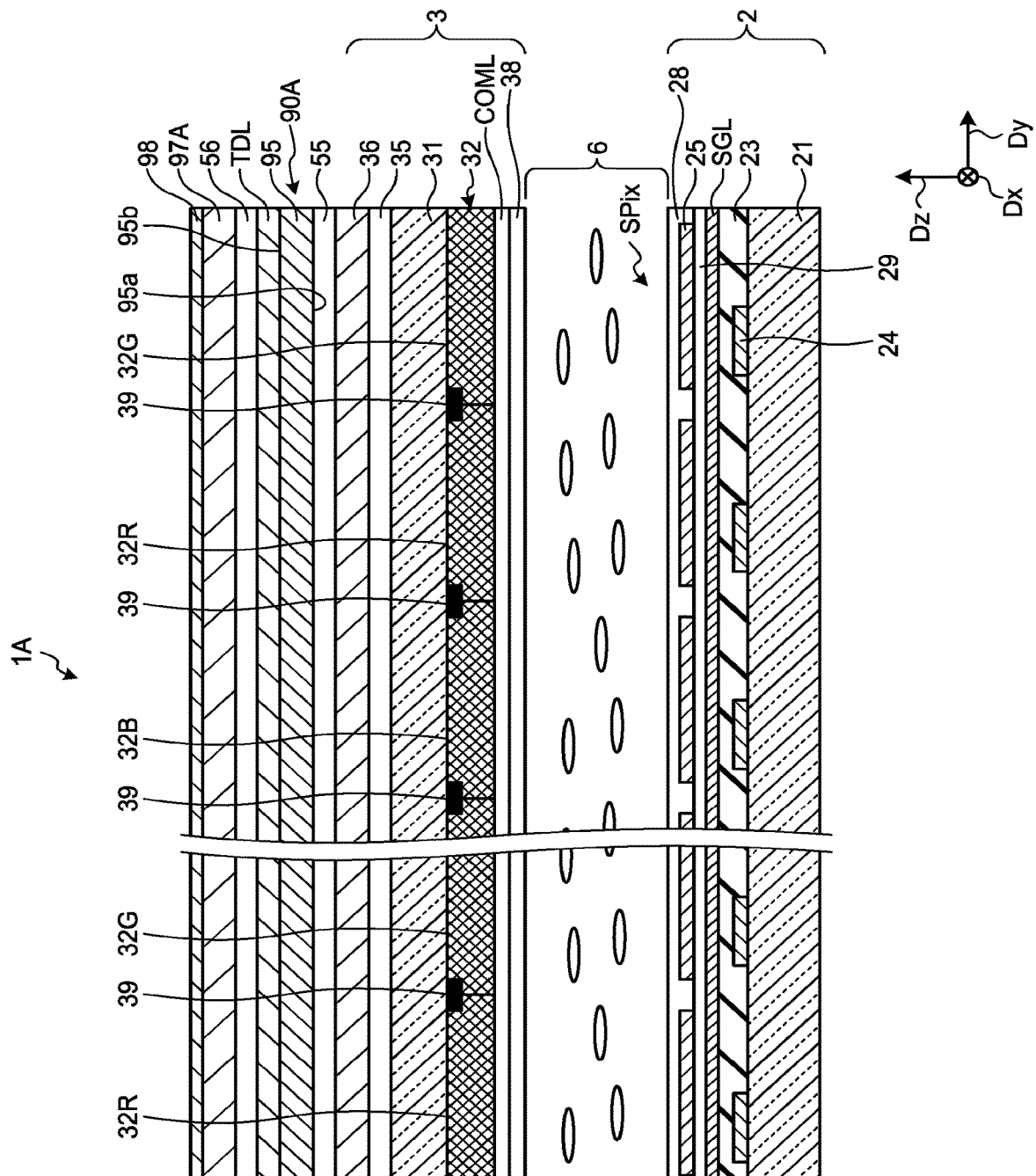
FIG. 38 is a schematic diagram illustrating a sectional structure of a display device according to a second embodiment of the present disclosure.
Figure 39:
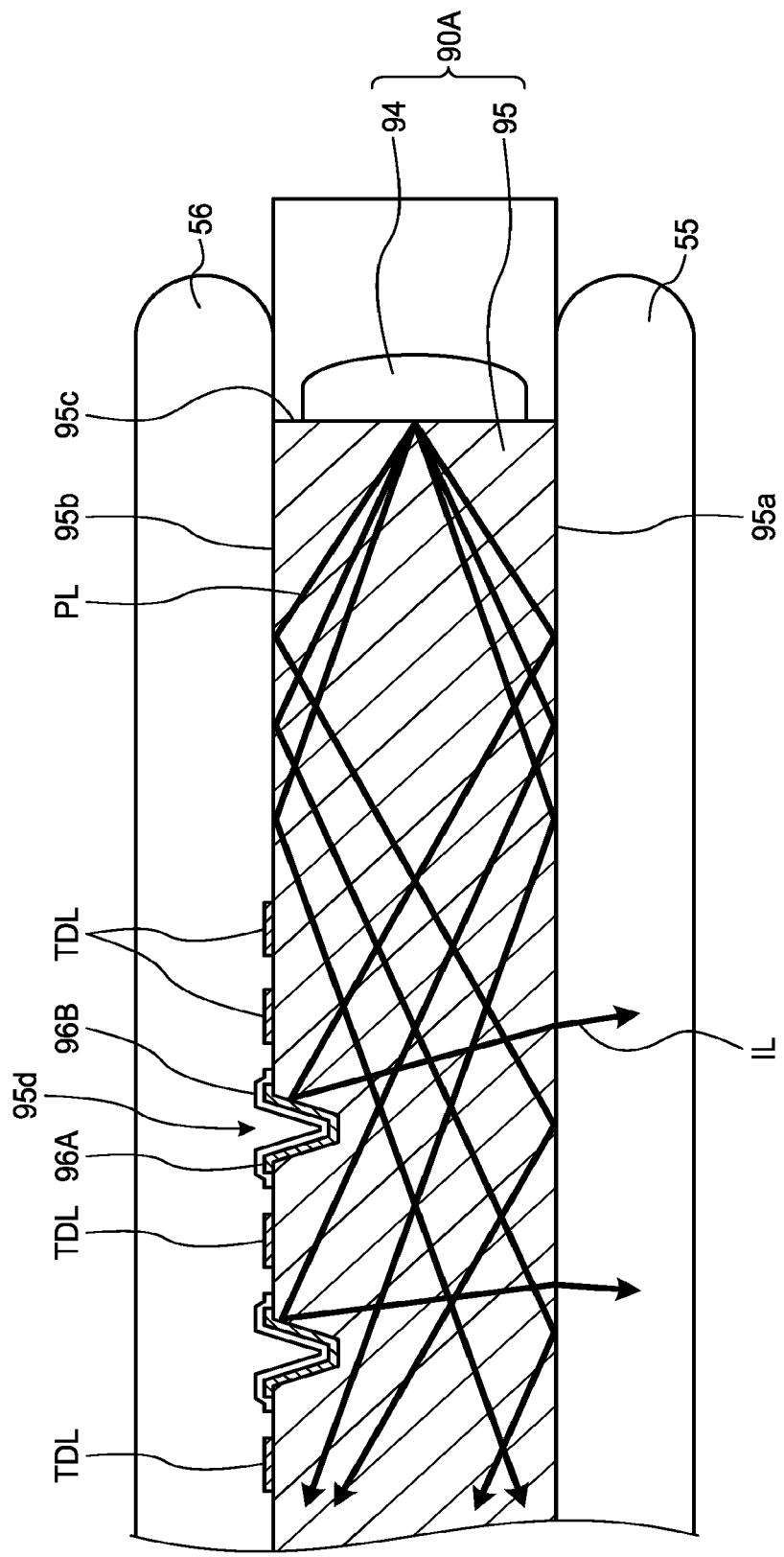
FIG. 39 is a schematic diagram illustrating a sectional structure of a frontlight according to the second embodiment.

FIG. 38 is a schematic diagram illustrating a sectional structure of a display device according to a second embodiment of the present disclosure. FIG. 39 is a schematic diagram illustrating a sectional structure of a frontlight according to the second embodiment. The same components as those described in the above-described first embodiment will be denoted by the same reference numeral, and the description thereof will not be repeated.

As illustrated in FIG. 38, in a display device 1A of this embodiment, the second electrodes TDL are provided on a light guide plate 95 of a frontlight 90A. A cover substrate 97A and the protective layer 98 are provided on the adhesive layer 56 on the second electrodes TDL. In this embodiment, the second electrodes TDL are provided directly in contact with the light guide plate 95. Also in this embodiment, the first substrate 21, the pixel electrodes 25, the liquid crystal layer 6 serving as the display functional layer, the first electrodes COML, the light guide plate 95, and the second electrodes TDL are stacked in this order.

As illustrated in FIG. 39, the frontlight 90A includes the light guide plate 95 and the light source 94. The light guide plate 95 has a first principal surface 95a and a second principal surface 95b opposite to the first principal surface 95a. The first principal surface 95a is a surface facing the first substrate 21 and the second substrate 31 (refer to FIG. 38), and is bonded to the polarizing plate 36 with the adhesive layer 55 interposed therebetween (refer to FIG. 38). The second principal surface 95b is bonded to the cover substrate 97A with the adhesive layer 56 interposed therebetween (refer to FIG. 38).

A plurality of recesses 95d are formed on the second principal surface 95b of the light guide plate 95. Each of the recesses 95d is provided with a high-reflection layer 96A and a low-reflection layer 96B. The high-reflection layer 96A is a metal material that suitably reflects the light PL propagated through the light guide plate 95. For example, silver or aluminum can be used as the high-reflection layer 96A. The low-reflection layer 96B is provided on the high-reflection layer 96A. The low-reflection layer 96B is a material having lower light reflectance than that of the high-reflection layer 96A. The low-reflection layer 96B may alternatively be a light-shielding layer. A metal or a metal oxide having relatively lower light reflectance can be used as the low-reflection layer 96B.

The second electrodes TDL are provided on the second principal surface 95b of the light guide plate 95. The second electrodes TDL may be provided in the same layer as the high-reflection layer 96A, or may be provided in a layer different from the high-reflection layer 96A.

The light source 94 is provided on a side surface 95c of the light guide plate 95. The light PL from the light source 94 travels in the light guide plate 95 while being repeatedly reflected on an interface between the light guide plate 95 and the adhesive layer 55 and on an interface between the light guide plate 95 and the adhesive layer 56. The light IL of the light PL refracted on the high-reflection layer 96A of each of the recesses 95d is transmitted from the first principal surface 95a toward the counter substrate 3.

Also in this embodiment, the second electrodes TDL are provided on the upper side of the light guide plate 95. As a result, the distance between the second electrode TDL and a detection target body, such as a finger, is smaller than that in the case where the second electrodes TDL are provided between the light guide plate 95 and the second substrate 31. In addition, the fringe component of the electric field generated between the second electrodes TDL and the first electrodes COML is more easily generated on the upper side of the cover substrate 97A. As a result, the display device 1A can be improved in touch detection sensitivity.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure naturally belong to the technical scope of the present disclosure.

For example, the display device of the present disclosure includes the following aspects:

(1) A display device comprising:
a first substrate;
a display functional layer;
a plurality of first electrodes;
a light guide plate;
a plurality of second electrodes; and
a controller configured to control the first electrodes and the second electrodes,
wherein the first substrate, the display functional layer, the first electrodes, the light guide plate, and the second electrodes are stacked in this order,
wherein the controller performs operations during a plurality of display periods to display an image, during a first sensing period, and during a second sensing period in a time-division manner,
wherein the first electrodes are supplied with a first drive signal and an electromotive force caused by electromagnetic induction is generated in the second electrodes during the first sensing period, and
wherein the first electrodes are supplied with a second drive signal to generate electrostatic capacitance between the first electrodes and the second electrodes during the second sensing period.

(2) The display device according to (1), further comprising:
a sensor substrate provided with the second electrodes,
wherein the second electrodes are disposed between the sensor substrate and the light guide plate.

(3) The display device according to (2), further comprising:
a second substrate opposed to the first substrate; and
a polarizing plate provided between the second substrate and the light guide plate,
wherein adhesive layers are respectively provided between the light guide plate and the polarizing plate, and between the light guide plate and the second electrodes.

(4) The display device according to (1),
wherein the light guide plate has a first principal surface facing the first substrate and a second principal surface opposite to the first principal surface, and
wherein the second principal surface is provided with the second electrodes.

(5) The display device according to any one of (1) to (4), further comprising:
an analog front-end circuit coupled to the second electrodes.

(6) The display device according to (5),
wherein a signal corresponding to the electromotive force caused by the electromagnetic induction is output from the second electrodes to the analog front-end circuit.

(7) The display device according to (5) or (6), further comprising:
a switching circuit provided between the second electrodes and the analog front-end circuit and configured to switch a coupling state between the second electrodes and the analog front-end circuit, and
wherein the switching circuit
couples together first ends on the same side of at least one pair of the second electrodes, and couples a second end of one of the pair of the second electrodes to the analog front-end circuit during the first sensing period, and
couples the second electrodes to the analog front-end circuit during the second sensing period.

(8) The display device according to any one of (1) to (7),
wherein a switch is provided that is configured to couple together ends on the same side of a pair of the first electrodes, and
wherein the controller couples the pair of the first electrodes to each other by operating the switch during the first sensing period, and uncouples the pair of the first electrodes from each other by operating the switch during periods different from the first sensing period.

(9) The display device according to any one of (1) to (8), further comprising:
a first voltage supply configured to supply a first voltage to the first electrodes; and
a second voltage supply configured to supply a second voltage lower than the first voltage to the first electrodes,
wherein, during the first sensing period,
the first voltage supply is coupled to one end of at least one of the first electrodes,
the second voltage supply is coupled to the other end thereof,
the second voltage supply is coupled to one end of another first electrode other than the at least one of the first electrodes, and
the first voltage supply is coupled to the other end thereof.
(10) The display device according to any one of (1) to (9),
wherein the controller detects a position of a detection target body and a force applied to a detection surface based on a distribution of signals corresponding to change in the electrostatic capacitance between the first electrodes and the second electrodes during the second sensing period.

What is claimed is:

1. A display device comprising:
a first substrate;
a display functional layer;
a plurality of first electrodes;
a light guide plate;
a plurality of second electrodes;
a plurality of voltage lines including:
a first high voltage line and a second high voltage line to supply a first voltage to the first electrodes; and
a first low voltage line and a second low voltage line to supply a second voltage lower than the first voltage to the first electrodes, and
a controller configured to control the first electrodes and the second electrodes,
wherein the first substrate, the display functional layer, the first electrodes, the light guide plate, and the second electrodes are stacked in this order,
wherein the controller performs operations during a plurality of display periods to display an image during a first sensing period, and during a second sensing period in a time-division manner,
wherein the controller performs sensing operations:
during the first sensing period, in an electromagnetic induction method such that the first electrodes serving as transmitting coils are supplied with a first drive signal and that an electromotive force caused by electromagnetic induction is generated in the second electrodes serving as receiving coils; and
during the second sensing period, in a capacitance method such that the first electrodes serving as drive electrodes are supplied with a second drive signal to generate electrostatic capacitance between the first electrodes and the second electrodes serving as detection electrodes,
wherein each of the first electrodes extends in a first direction and has a first end and a second end in the first direction,
wherein the first electrodes include a first area electrode, a middle area electrode, and a second area electrode, the middle area electrode being disposed between the first area electrode and the second area electrode in a second direction crossing the first direction, and
wherein, during the first sensing period:
in the first area electrode, the first end is coupled to the first high voltage line, and the second end is coupled to the second low voltage line, allowing to generate a first current flowing in a first current direction;
in the middle detection area electrode, the first end is disconnected with the voltage lines, and the second end is disconnected with the voltage lines; and
in the second area electrode, the first end is coupled to the first low voltage line, and the second end is coupled to the second high voltage line, allowing to generate a second current flowing in a second current direction; and
first magnetic fields generated by the first current flowing in the first direction overlap second magnetic fields generated by the second current flowing in the second direction opposite to the first direction, allowing to increase a strength of magnetic fields passing through an area overlapping the middle area electrode and allowing the first area electrode and the second area electrode to serve as the transmitting coils.

2. A display device comprising:
a first substrate;
a display functional layer;
a plurality of first electrodes;
a light guide plate;
a plurality of second electrodes; and
a plurality of voltage lines including:
a first voltage line to supply a first voltage to the first electrodes;
a second voltage line to supply a second voltage lower than the first voltage to the first electrodes; and
a plurality of third voltage lines supplied with no signal, and
a controller configured to control the first electrodes and the second electrodes,
wherein the first substrate, the display functional layer, the first electrodes, the light guide plate, and the second electrodes are stacked in this order,
wherein the controller performs operations during a plurality of display periods to display an image, during a first sensing period, and during a second sensing period in a time-division manner,
wherein the controller performs sensing operations:
during the first sensing period in an electromagnetic induction method such that the first electrodes serving as transmitting coils are supplied with a first drive signal and that an electromotive force caused by electromagnetic induction is generated in the second electrodes serving as receiving coils; and
during the second sensing period, in a capacitance method such that the first electrodes serving as drive electrodes are supplied with a second drive signal to generate electrostatic capacitance between the first electrodes and the second electrodes serving as detection electrodes,
wherein each of the first electrodes extends in a first direction and has a first end and a second end in the first direction,
wherein the first electrodes include a first area electrode, a middle area electrode, and a second area electrode, the middle area electrode being disposed between the first area electrode and the second area electrode in a second direction crossing the first direction, and
wherein, during the first sensing period:
in the first area electrode, the first end is coupled to the first voltage line, and the second end is coupled to one of the third voltage lines, allowing a first current to generate in a first current direction;

in the middle detection area electrode, the first end is disconnected with the voltage lines, and the second end is disconnected with the voltage lines;

in the second area electrode, the first end is coupled to the second voltage line, and the second end is coupled to one of the third voltage lines, allowing a second current to generate in a second current direction; and first magnetic fields generated by the first current flowing in the first direction overlap second magnetic fields generated by the second current flowing in the second direction opposite to the first direction, allowing to increase a strength of magnetic fields passing through an area overlapping the middle area electrode and allowing the first area electrode and the second area electrode to serve as the transmitting coils.

3. A display device comprising:
a first substrate;
a display functional layer;
a plurality of first electrodes;
a light guide plate;
a plurality of second electrodes;
a plurality of voltage lines including:
 a first voltage line to supply a first voltage to the first electrodes;
 a second voltage line to supply a second voltage lower than the first voltage to the first electrodes; and
 a plurality of third voltages lines supplied with a ground potential, and
a controller configured to control the first electrodes and the second electrodes,
wherein the first substrate, the display functional layer, the first electrodes, the light guide plate, and the second electrodes are stacked in this order,
wherein the controller performs operations during a plurality of display periods to display an image, during a first sensing period, and during a second sensing period in a time-division manner,
wherein the controller performs sensing operations:
 during the first sensing period, in an electromagnetic induction method such that the first electrodes serving as transmitting coils are supplied with a first drive signal and that an electromotive force caused by electromagnetic induction is generated in the second electrodes serving as receiving coils; and
 during the second sensing period, in a capacitance method such that the first electrodes serving as drive electrodes are supplied with a second drive signal to generate electrostatic capacitance between the first electrodes and the second electrodes serving as detection electrodes,
wherein each of the first electrodes extends in a first direction and has a first end and a second end in the first direction,
wherein the first electrodes include a first area electrode, a middle area electrode, and a second area electrode, the middle area electrode being disposed between the first area electrode and the second area electrode in a second direction crossing the first direction, and
wherein, during the first sensing period:
 in the first area electrode, the first end is coupled to the first voltage line, and the second end is coupled to one of the third voltage lines, allowing to generate a first current in a first current direction;

in the middle detection area electrode, the first end is disconnected with the voltage lines, and the second end is disconnected with the voltage lines;

in the second area electrode, the first end is coupled to the second voltage line, and the second end is coupled to one of the third voltage lines, allowing to generate a second current in a second current direction opposite to the first current direction; and first magnetic fields generated by the first current flowing in the first direction overlap second magnetic fields generated by the second current flowing in the second direction opposite to the first direction, allowing to increase a strength of magnetic fields passing through an area overlapping the middle area electrode and allowing the first area electrode and the second area electrode to serve as the transmitting coils.

4. A display device comprising:
a first substrate;
a display functional layer;
a plurality of first electrodes;
a light guide plate;
a plurality of second electrodes; and
a controller configured to control the first electrodes and the second electrodes,
wherein the first substrate, the display functional layer, the first electrodes, the light guide plate, and the second electrodes are stacked in this order,
wherein the controller performs operations during a plurality of display periods to display an image, during a first sensing period, and during a second sensing period in a time-division manner,
wherein the controller performs sensing operations:
 during the first sensing period, in an electromagnetic induction method such that the first electrodes serving as transmitting coils are supplied with a first drive signal and that an electromotive force caused by electromagnetic induction is generated in the second electrodes serving as receiving coils; and
 during the second sensing period, in a capacitance method such that the first electrodes serving as drive electrodes are supplied with a second drive signal to generate electrostatic capacitance between the first electrodes and the second electrodes serving as detection electrodes,
wherein the second electrodes are arranged in a first direction,
wherein each of the second electrodes has a first end and a second end in a second direction crossing the first direction,
wherein the second electrodes include:
 side second-electrodes;
 a middle second-electrode disposed between the side second-electrodes adjacent to each other in the first direction; and
 dummy detection electrodes each disposed between one of the side second-electrodes and the middle second-electrode that are adjacent to each other in the first direction, and
wherein, during the first sensing period:
the side second-electrodes adjacent to each other in the first direction are connected by a first wire at the first ends;
the first wire and the side second-electrodes are coupled forming a loop and surround the dummy electrodes and the middle second-electrode between the dummy electrodes, allowing the side second-electrodes to serve as the receiving coils.

\* \* \* \* \*